US012318926B2

(12) United States Patent
Jones et al.

(10) Patent No.: US 12,318,926 B2
(45) Date of Patent: Jun. 3, 2025

(54) PICK-AND-PLACE SYSTEM AND METHOD FOR TRANSFERRING AND INSTALLING A CONTOURED COMPOSITE STRUCTURE

(71) Applicant: The Boeing Company, Chicago, IL (US)

(72) Inventors: Darrell Darwin Jones, Mill Creek, WA (US); Raviendra S. Suriyaarachchi, Kirkland, WA (US); Antonio Martinez, Murcia (ES); Bret Rodeheaver, Lake Stevens, WA (US)

(73) Assignee: The Boeing Company, Arlington, VA (US)

( * ) Notice: Subject to any disclaimer, the term of this patent is extended or adjusted under 35 U.S.C. 154(b) by 553 days.

(21) Appl. No.: 17/583,178

(22) Filed: Jan. 24, 2022

(65) Prior Publication Data

US 2022/0242065 A1 Aug. 4, 2022

(30) Foreign Application Priority Data

Jan. 29, 2021 (EP) .................................. 21382073

(51) Int. Cl.
*B25J 9/02* (2006.01)
*B25J 9/10* (2006.01)
(Continued)

(52) U.S. Cl.
CPC ............. *B25J 9/026* (2013.01); *B25J 9/1005* (2013.01); *B25J 9/1687* (2013.01);
(Continued)

(58) Field of Classification Search
CPC .... B25J 9/026; B25J 15/0066; B25J 15/0616; B25J 15/0052; B25J 19/0008
See application file for complete search history.

(56) References Cited

U.S. PATENT DOCUMENTS 4,781,517 A * 11/1988 Pearce ..................... B25J 18/02
  104/167
6,463,644 B1 * 10/2002 Pasque ................. B62D 65/026
  269/21

(Continued)

FOREIGN PATENT DOCUMENTS

EP 2014448 A2 1/2009
EP 3162544 A1 5/2017
(Continued)

OTHER PUBLICATIONS

European Patent Office Extended European Search Report, dated Jul. 9, 2021, regarding EP Application No. 21382074.9, 10 pages.
(Continued)

Primary Examiner — Kyle A Cook

(57) ABSTRACT

There is provided a pick-and-place system for transferring and installing a contoured composite structure onto a mandrel, in a composite manufacturing system. The pick-and-place system includes a tray station having a tray assembly to hold the contoured composite structure, prior to transfer and installation onto the mandrel. The pick-and-place system further includes an installation station having the mandrel and a pick-and-place assembly. The mandrel is designed to receive the contoured composite structure, and designed to move along a moving manufacturing line, via a conveyor assembly. The pick-and-place assembly includes a gantry assembly, a main beam suspended from the gantry assembly, the main beam having a plurality of end effector assemblies and a plurality of indexing assemblies, a vacuum system coupled to the main beam, a load balancer assembly coupling the main beam to the gantry assembly, and a control system coupled to the pick-and-place assembly, to operably control the pick-and-place-assembly.

20 Claims, 31 Drawing Sheets

(51) Int. Cl.

| | |
|---|---|
| *B25J 9/16* | (2006.01) |
| *B25J 15/00* | (2006.01) |
| *B25J 15/06* | (2006.01) |
| *B25J 19/00* | (2006.01) |
| *B29C 70/38* | (2006.01) |
| *B64F 5/10* | (2017.01) |
| *G06K 7/10* | (2006.01) |
| *G06K 19/07* | (2006.01) |
| *B29L 31/30* | (2006.01) |

(52) U.S. Cl.
CPC ....... *B25J 15/0066* (2013.01); *B25J 15/0616* (2013.01); *B25J 19/0008* (2013.01); *B29C 70/388* (2013.01); *B64F 5/10* (2017.01); *G06K 7/10297* (2013.01); *G06K 19/0728* (2013.01); *B25J 9/104* (2013.01); *B29L 2031/3082* (2013.01); *B29L 2031/3085* (2013.01)

(56) References Cited

U.S. PATENT DOCUMENTS

| | | | |
|---|---|---|---|
| 6,625,866 B2 | 9/2003 | Stone et al. | |
| 6,779,272 B2* | 8/2004 | Day | B64F 5/10 |
| | | | 29/407.01 |
| 7,527,759 B2 | 5/2009 | Lee et al. | |
| 7,655,168 B2 | 2/2010 | Jones et al. | |
| 7,708,546 B2 | 5/2010 | Lee et al. | |
| 8,465,613 B2 | 6/2013 | Rotter et al. | |
| 8,557,165 B2 | 10/2013 | Jones et al. | |
| 8,601,694 B2 | 12/2013 | Brennan et al. | |
| 8,997,642 B2 | 4/2015 | Stewart et al. | |
| 9,162,380 B2 | 10/2015 | Jones et al. | |
| 9,561,602 B2 | 2/2017 | Jones et al. | |
| 10,369,693 B1* | 8/2019 | Levine | A01C 7/085 |
| 10,399,284 B2 | 9/2019 | Prause et al. | |
| 10,532,828 B2 | 1/2020 | Halbritter et al. | |
| 10,597,264 B1* | 3/2020 | Muck | B25J 9/026 |
| 11,059,235 B2 | 7/2021 | Kendall et al. | |
| 2004/0052582 A1* | 3/2004 | Becker | B66F 7/00 |
| | | | 114/44 |
| 2004/0093731 A1 | 5/2004 | Sarh | |
| 2006/0231981 A1 | 10/2006 | Lee et al. | |
| 2009/0245992 A1* | 10/2009 | Kato | B25J 9/0009 |
| | | | 414/749.6 |
| 2010/0102482 A1* | 4/2010 | Jones | B29C 43/58 |
| | | | 264/320 |
| 2013/0112641 A1* | 5/2013 | Laliberte | B66D 3/18 |
| | | | 16/400 |
| 2013/0340928 A1 | 12/2013 | Rotter et al. | |
| 2014/0203477 A1 | 7/2014 | Chapman et al. | |
| 2014/0314996 A1 | 10/2014 | Stewart | |
| 2015/0314890 A1* | 11/2015 | DesJardien | B25J 11/007 |
| | | | 212/324 |
| 2016/0339682 A1 | 11/2016 | Bahe et al. | |
| 2017/0057100 A1 | 3/2017 | Shaw et al. | |
| 2019/0291306 A1 | 9/2019 | Hannan et al. | |
| 2020/0030925 A1* | 1/2020 | Day | B23P 21/004 |
| 2020/0101677 A1 | 4/2020 | Kendall et al. | |
| 2020/0180239 A1 | 6/2020 | Prause et al. | |
| 2020/0231267 A1 | 7/2020 | Rotter et al. | |
| 2020/0398503 A1 | 12/2020 | Kendall et al. | |
| 2021/0179292 A1 | 6/2021 | Ahn et al. | |
| 2021/0260795 A1 | 8/2021 | Plummer et al. | |
| 2021/0260840 A1 | 8/2021 | Knutson et al. | |
| 2021/0276285 A1 | 9/2021 | Heath et al. | |
| 2021/0387834 A1* | 12/2021 | Olberg | B25J 9/026 |
| 2022/0212352 A1* | 7/2022 | Kendall | B65G 47/917 |

FOREIGN PATENT DOCUMENTS

| | | |
|---|---|---|
| EP | 3677397 A1 | 7/2020 |
| EP | 3683029 A2 | 7/2020 |
| EP | 3693155 A1 | 8/2020 |

OTHER PUBLICATIONS

European Patent Office Extended European Search Report, dated Dec. 1, 2021, regarding EP Application No. 21180643.5, 8 pages.
European Patent Office Extended European Search Report, dated Dec. 17, 2021, regarding EP Application No. 21183660.6, 8 pages.

* cited by examiner

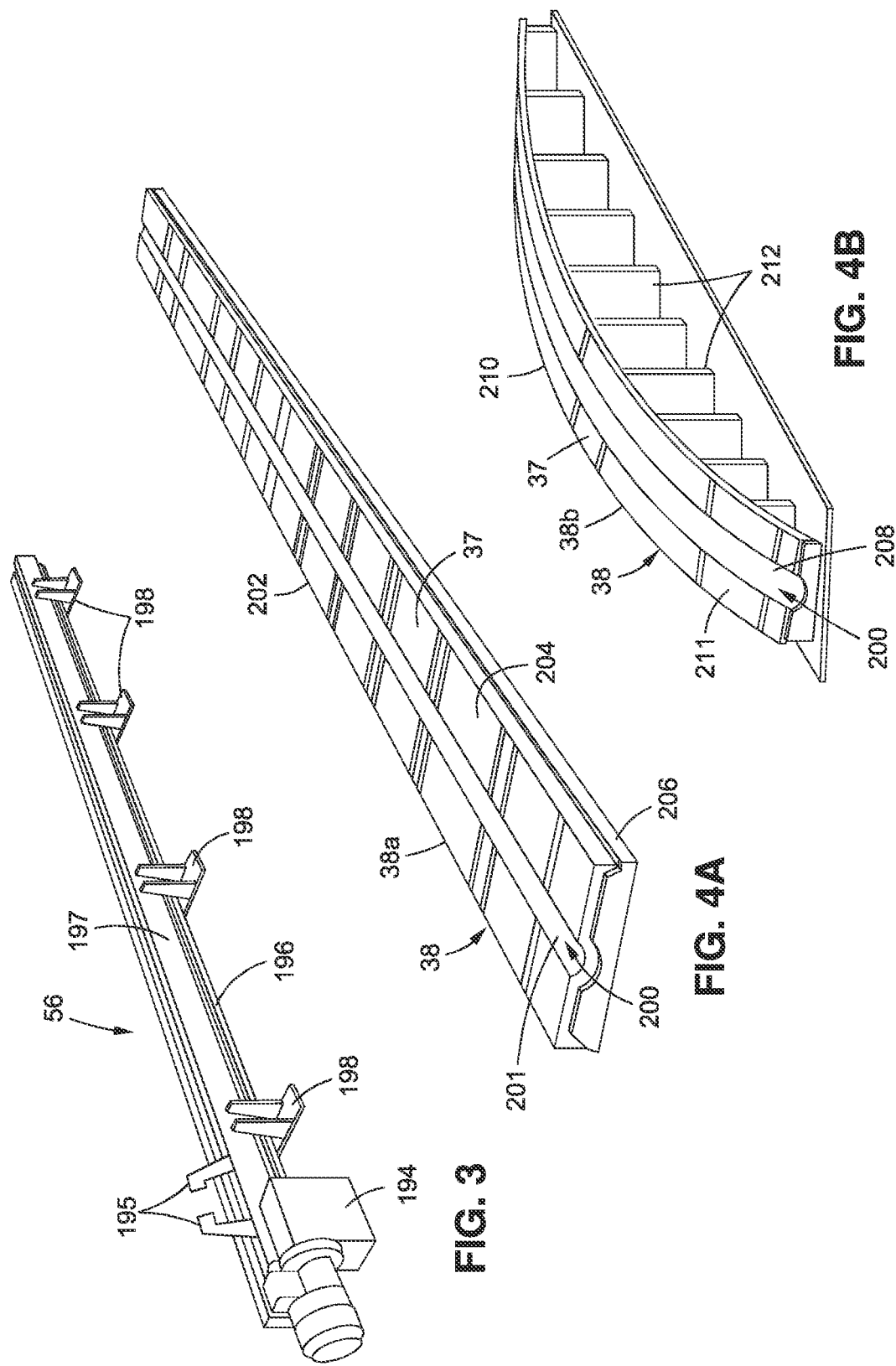

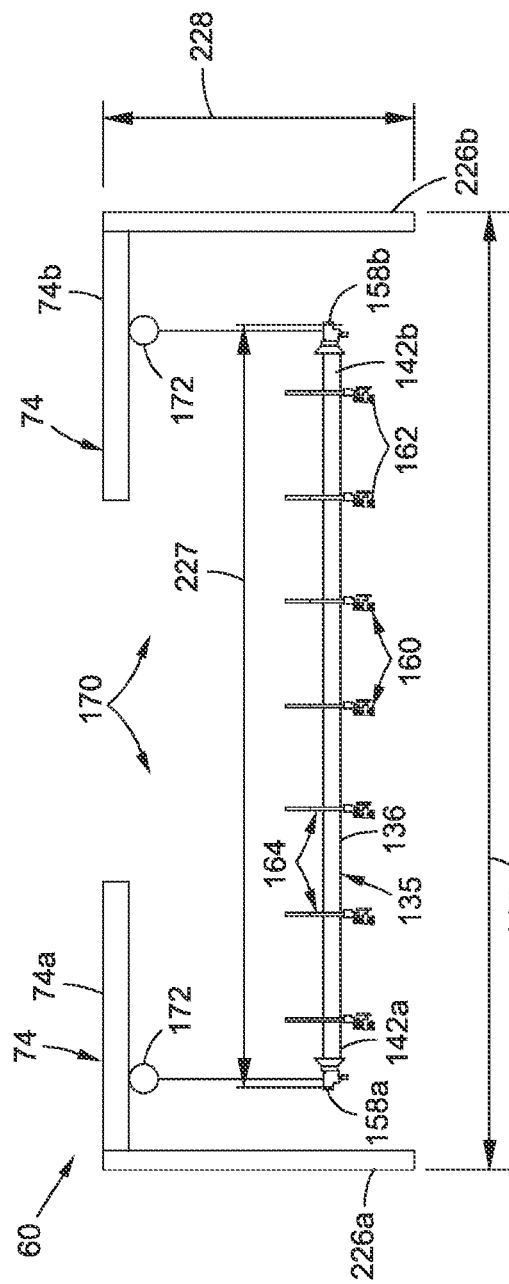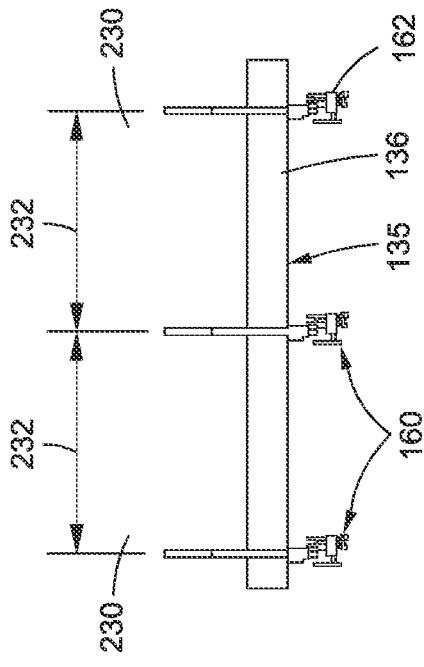
FIG. 6A
FIG. 6B

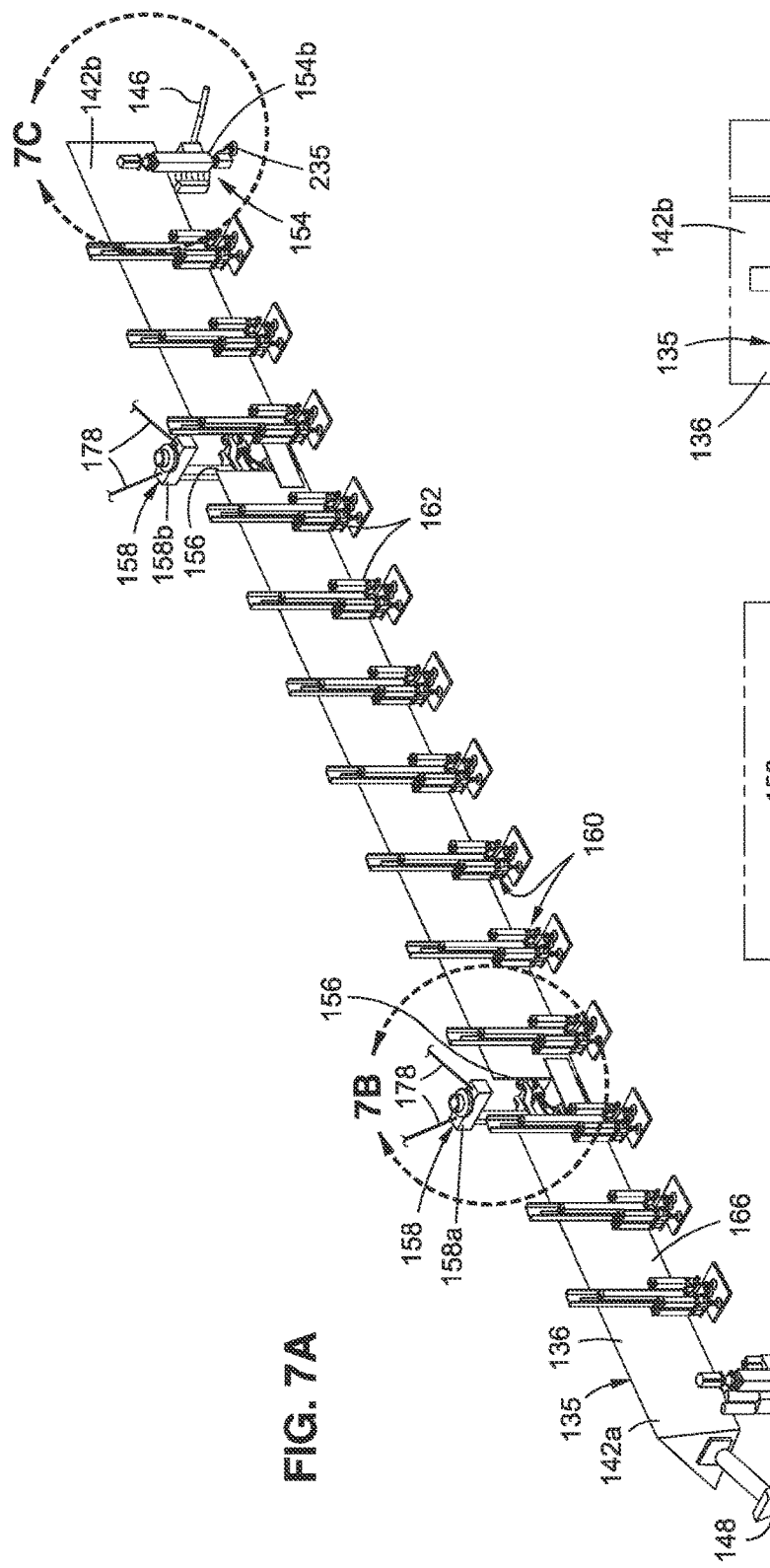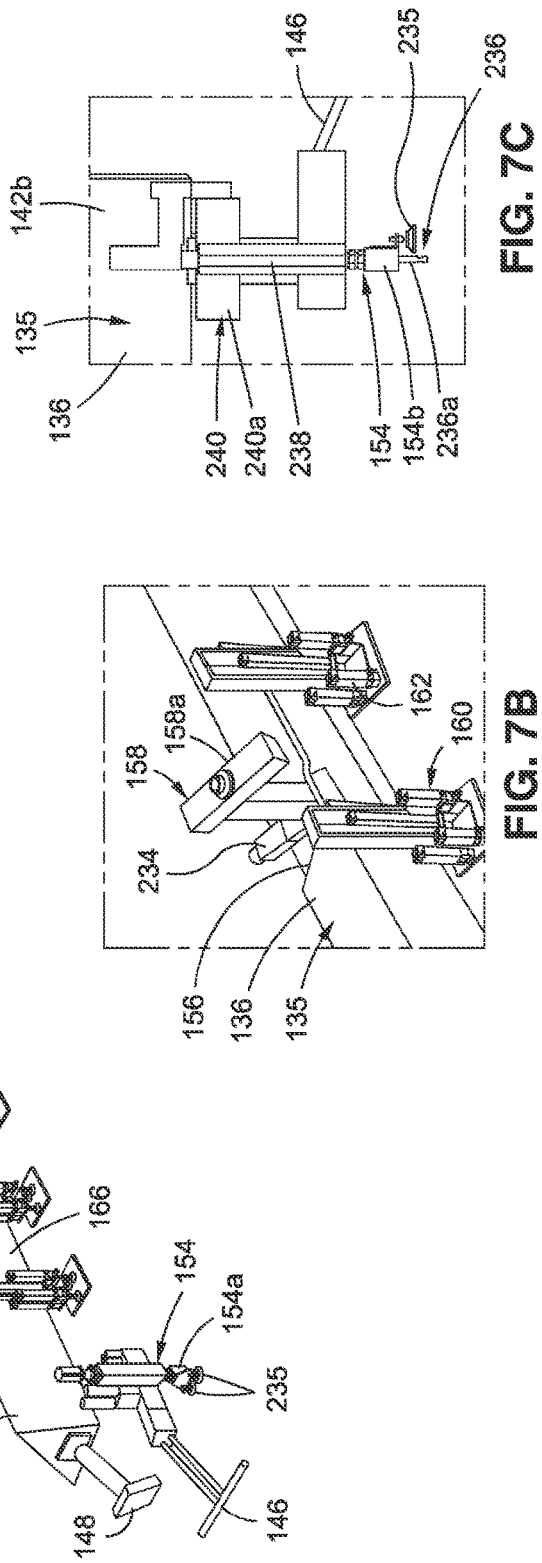

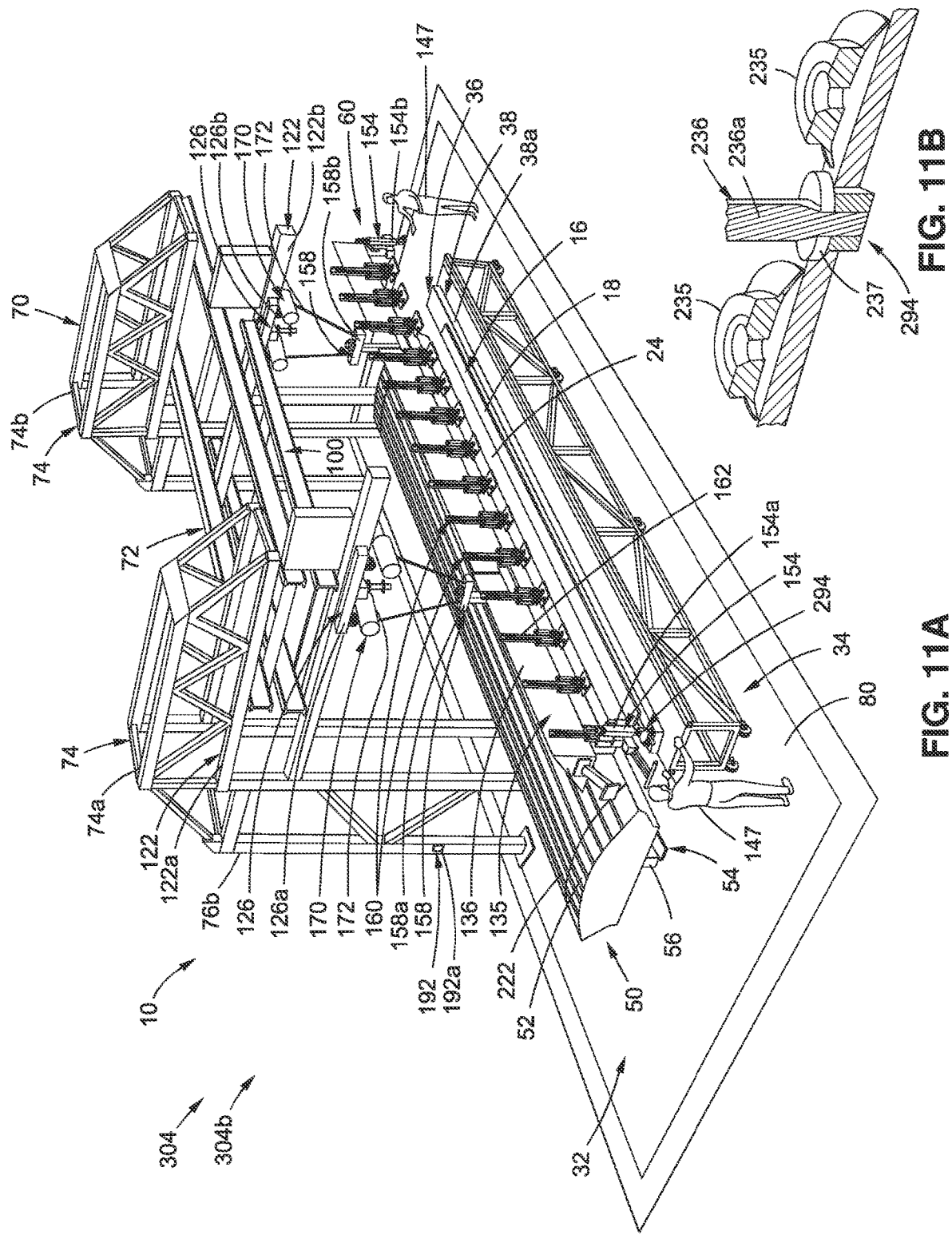

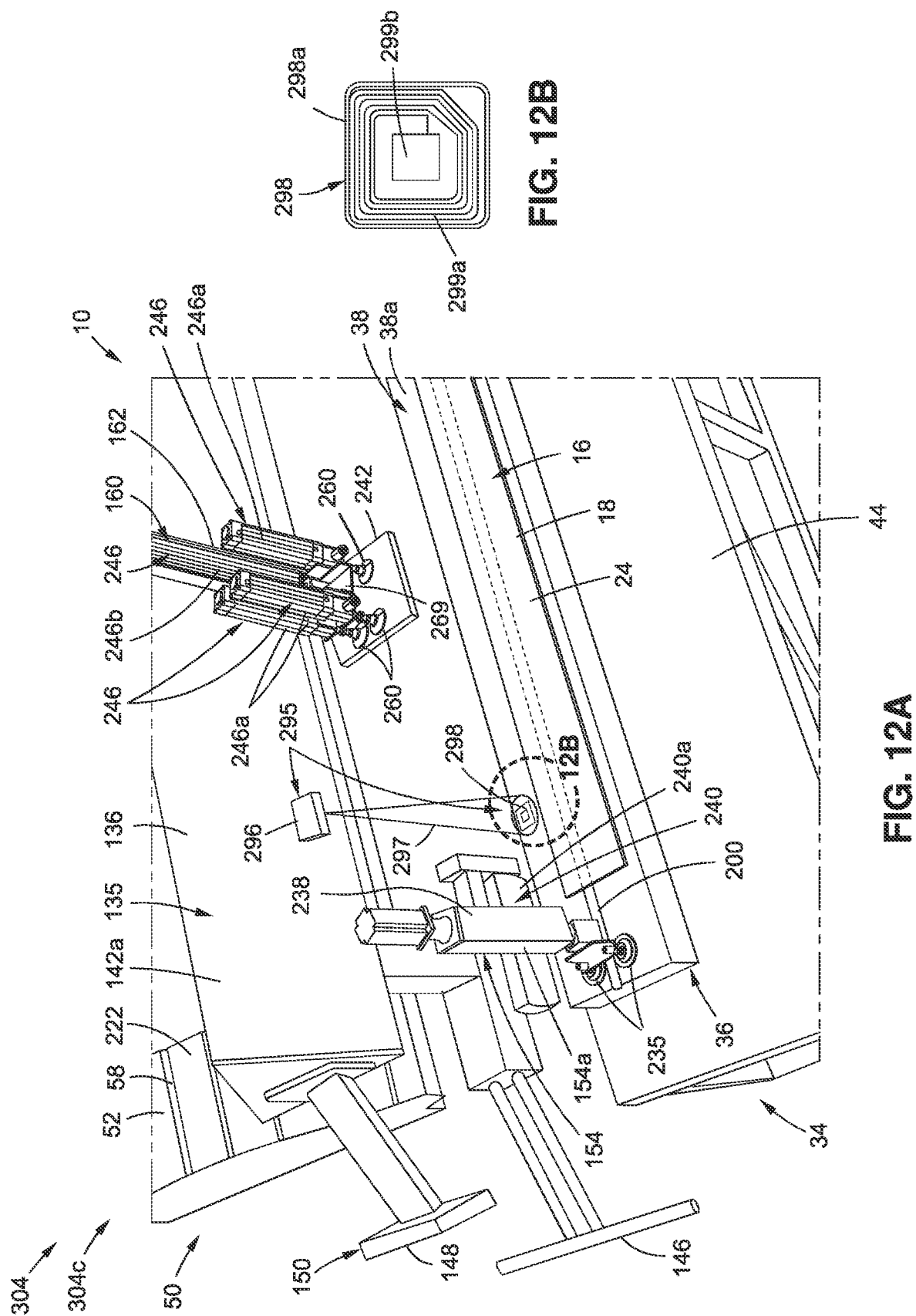

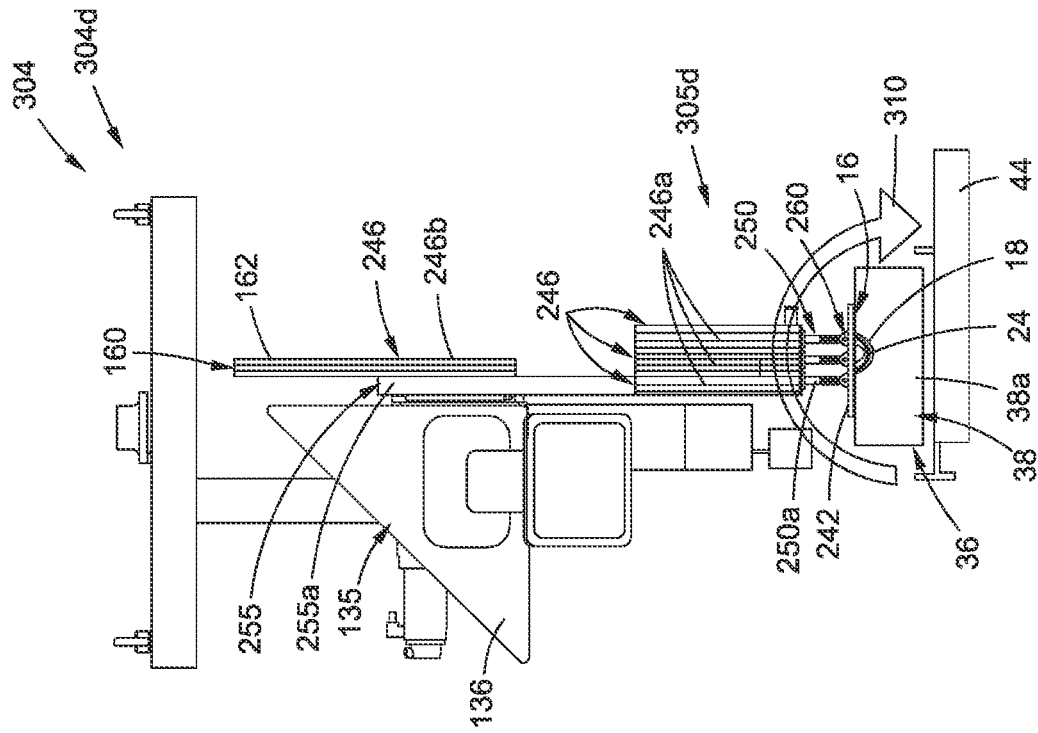
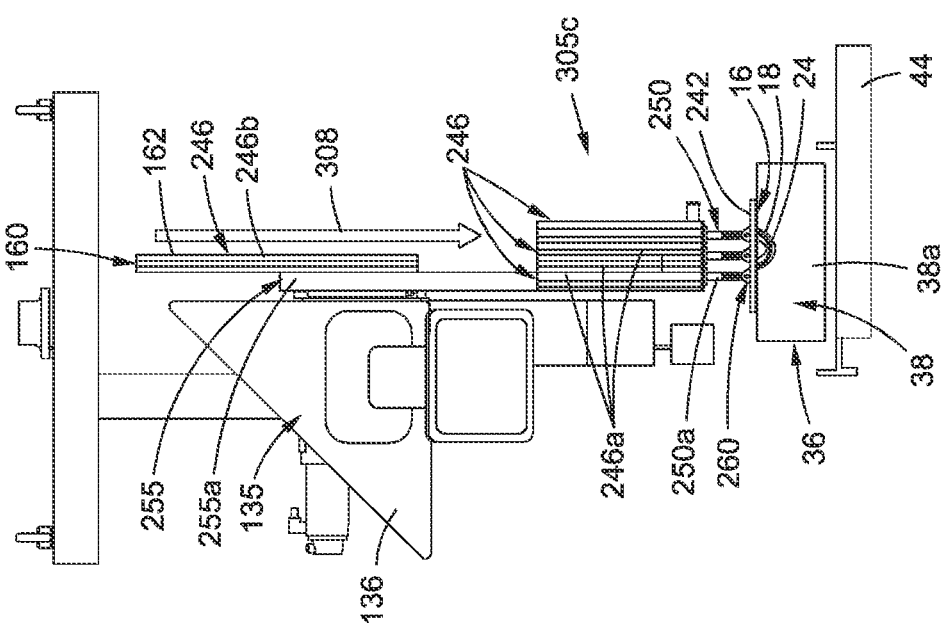
FIG. 13D
FIG. 13C

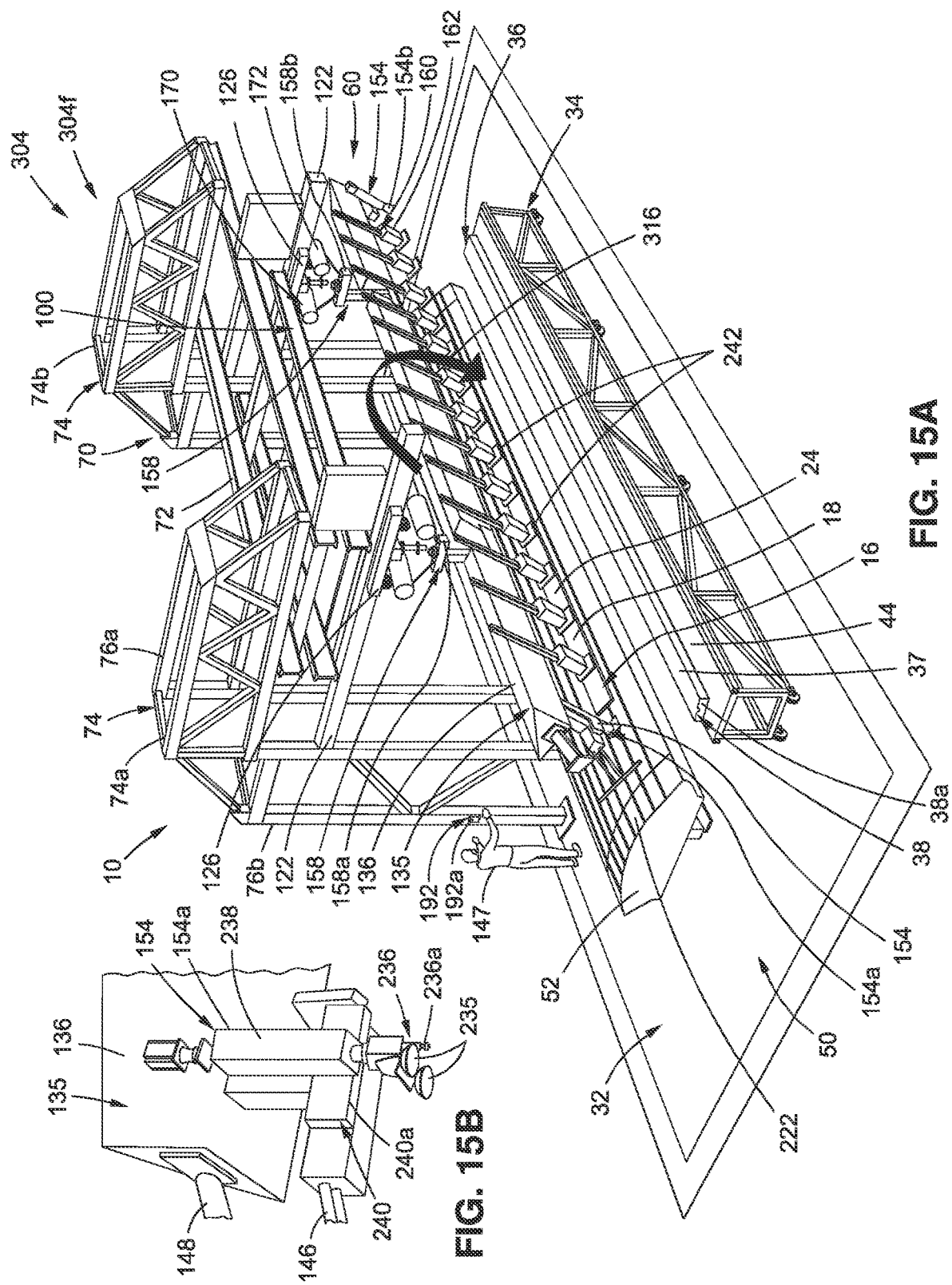

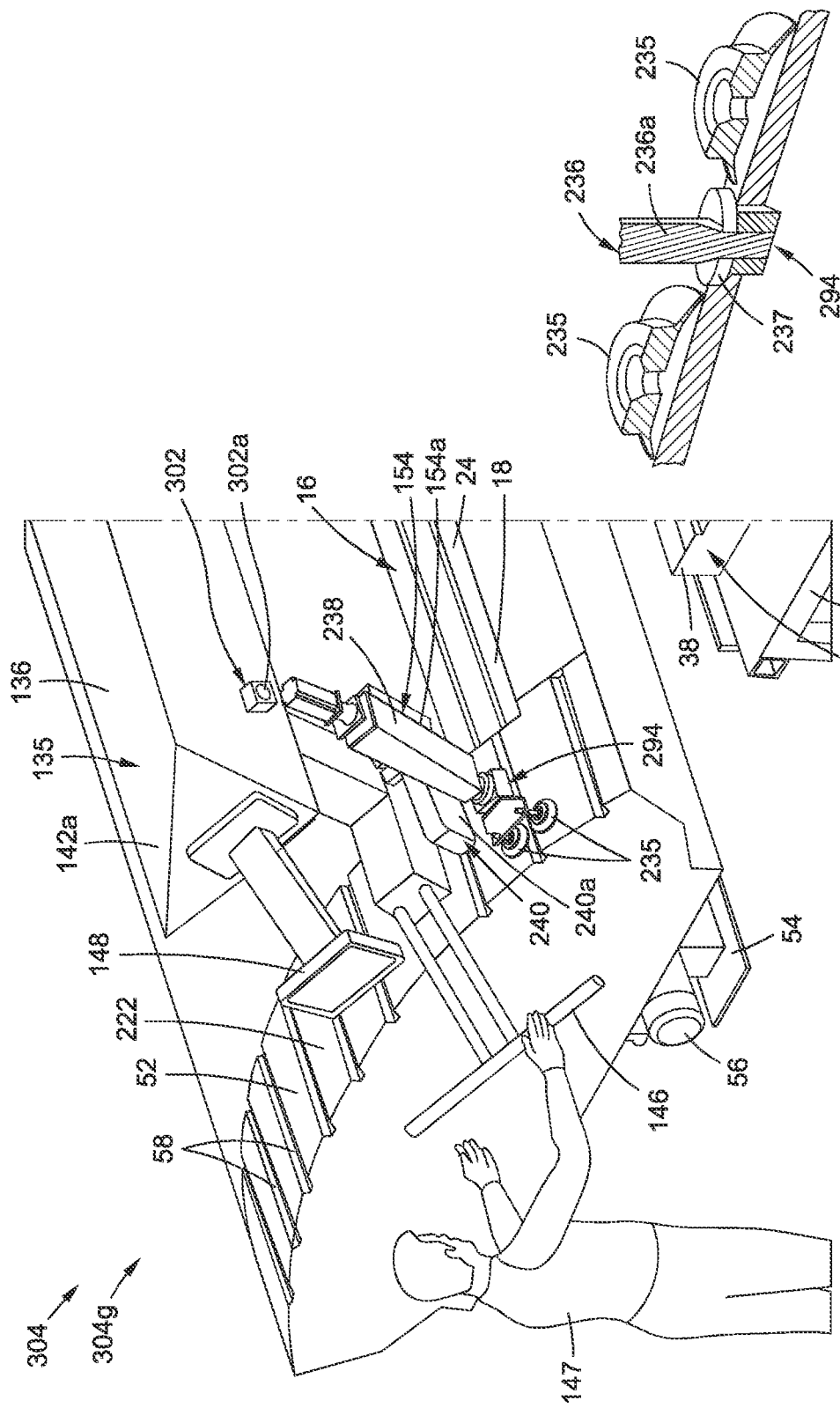

PICK-AND-PLACE SYSTEM AND METHOD FOR TRANSFERRING AND INSTALLING A CONTOURED COMPOSITE STRUCTURE

FIELD

The disclosure relates generally to the fabrication of composite structures, such as those used in the aircraft industry, and relates more particularly, to a system and method in a manufacturing system, for transferring and installing, onto a mandrel, contoured composite structures, such as stringers, for aircraft and other vehicles or structures.

BACKGROUND

Composite structures may be used in a wide variety of applications, including in the manufacture of aircraft, due to their high strength-to-weight ratios, corrosion resistance and other favorable properties. In particular, in aircraft manufacturing, composite structures may be used to form the fuselage, wings, tail sections, and other parts of the aircraft.

Composite structural members, such as stringers, stiffener members, and the like, may require complex contours tailored to particular applications. Such composite structural members may be formed from flat composite laminate charges into desired composite structures having complex curved configurations with complex contours along their lengths.

Known manufacturing systems and methods exist for manufacturing contoured composite structures, such as stringers. For example, such known manufacturing systems and methods may include serial production lines that include various stations, such as a lamination station, a trimming station, a forming station, a mandrel installation station, one or more processing stations, and other stations. With known mandrel installation stations, contoured composite structures, such as stringers, are installed on a mandrel in a stationary cell and not in a moving manufacturing line, and it may be difficult to convert the stationary cell to a moving manufacturing line. This may result in a longer manufacturing time, and may increase manufacturing costs.

In addition, with known manufacturing systems and methods that include a moving manufacturing line, as well as pick-and-place equipment, it may be difficult to maintain the curvature of the contoured composite structures, such as stringers, throughout movement and installation onto a mandrel at a mandrel installation station.

Accordingly, there is a need for a system and method for transferring and installing contoured composite structures, such as stringers, having complex curvatures, and the like, that provide a pick-and-place system for transferring and installing such contoured composite structures from a forming station to an installation station, and onto a moving mandrel in a moving manufacturing line, while maintaining the complex curvatures of the contoured composite structures, such as the stringers, throughout transfer and installation onto the mandrel.

SUMMARY

Example implementations of the present disclosure provide an improved pick-and-place system and method for transferring and installing contoured composite structures, such as stringers, having complex curvatures, onto a mandrel. As discussed in the below detailed description, versions of the improved pick-and-place system and method may provide significant advantages over known systems and methods.

In a version of the disclosure, there is provided a pick-and-place system for transferring and installing a contoured composite structure onto a mandrel, in a composite manufacturing system. The pick-and-place system comprises a tray station having a tray assembly designed to hold the contoured composite structure, prior to transfer and installation onto the mandrel.

The pick-and-place system further comprises an installation station. The installation station comprises the mandrel designed to receive the contoured composite structure, and designed to move along a moving manufacturing line, via a conveyor assembly.

The installation station further comprises a pick-and-place assembly. The pick-and-place assembly comprises a gantry assembly. The pick-and-place assembly further comprises a main beam suspended from the gantry assembly. The main beam has a plurality of end effector assemblies and a pair of indexing assemblies, coupled to the main beam.

The pick-and-place assembly further comprises a vacuum system coupled to the main beam and coupled to the plurality of end effector assemblies. The pick-and-place assembly further comprises a load balancer assembly coupling the main beam to the gantry assembly. The pick-and-place assembly further comprises a control system coupled to the pick-and-place assembly, to operably control the pick-and-place assembly.

In another version of the disclosure, there is provided a method for transferring and installing a contoured composite structure onto a mandrel, in a composite manufacturing system. The method comprises providing a pick-and-place system.

The pick-and-place system comprises a tray station having a tray assembly with the contoured composite structure disposed on the tray assembly. The pick-and-place system further comprises an installation station. The installation station comprises the mandrel moving along a moving manufacturing line, via a conveyor assembly. The installation station further comprises a pick-and-place assembly.

The pick-and-place assembly comprises a gantry assembly. The pick-and-place assembly further comprises a main beam suspended from the gantry assembly. The main beam has a plurality of end effector assemblies and a pair of indexing assemblies, coupled to the main beam.

The pick-and-place assembly further comprises a vacuum system coupled to the main beam and coupled to the plurality of end effector assemblies. The pick-and-place assembly further comprises a load balancer assembly coupling the main beam to the gantry assembly. The pick-and-place assembly further comprises a control system coupled to the pick-and-place assembly.

The method further comprises positioning the main beam above the contoured composite structure disposed on the tray assembly. The method further comprises indexing the plurality of end effector assemblies to the tray assembly, using one or both of the pair of indexing assemblies coupled to the main beam. The method further comprises contacting the contoured composite structure with one or more of the plurality of end effector assemblies, and using the one or more plurality of end effector assemblies to copy a geometry of a top surface of the contoured composite structure.

The method further comprises securing the contoured composite structure to the one or more plurality of end effector assemblies, by activating the vacuum system. The method further comprises transferring, from the tray assembly to the mandrel, the contoured composite structure secured to the one or more plurality of end effector assemblies, by moving the main beam away from the tray assembly and to above the mandrel. The method further comprises using the load balancer assembly to align the main beam and the contoured composite structure onto the mandrel.

The method further comprises indexing the main beam to the mandrel, using one or both of the pair of indexing assemblies. The method further comprises installing the contoured composite structure into the mandrel, using the one or more plurality of end effector assemblies to push the contoured composite structure into the mandrel. The method further comprises releasing the contoured composite structure from the one or more plurality of end effector assemblies, by deactivating the vacuum system. The method further comprises retracting the main beam from the mandrel.

In another version of the disclosure, there is provided a pick-and-place system for transferring and installing an aircraft stringer having a complex curved configuration, onto a mandrel, in a composite manufacturing system. The pick-and-place system comprises a tray station having a kitting tray designed to hold the aircraft stringer, prior to transfer and installation onto the mandrel. The aircraft stringer is received from a forming apparatus at a forming station in the composite manufacturing system.

The pick-and-place system further comprises an installation station. The installation station comprises a mandrel designed to receive the aircraft stringer, and designed to move along a moving manufacturing line, via a conveyor assembly.

The installation station further comprise a pick-and-place assembly. The pick-and-place assembly comprises a gantry assembly. The pick-and-place assembly further comprises a main beam suspended from the gantry assembly. The main beam has a plurality of end effector assemblies and a pair of indexing assemblies, coupled to the main beam.

The pick-and-place assembly further comprises a vacuum system coupled to the main beam and coupled to the plurality of end effector assemblies. The pick-and-place assembly further comprises a load balancer assembly coupling the main beam to the gantry assembly. The load balancer assembly is designed to orient and stabilize the main beam and the aircraft stringer, during transfer and installation of the aircraft stringer from the kitting tray onto the mandrel.

The pick-and-place assembly further comprises a radio-frequency identification (RFID) system comprising a radio-frequency identification (RFID) reader coupled to the main beam, and a radio-frequency identification (RFID) tag coupled to the kitting tray. The pick-and-place assembly further comprises a control system coupled to the pick-and-place assembly. The control system is designed to operably control the pick-and-place assembly, including during transfer and installation of the aircraft stringer onto the mandrel.

The features, functions, and advantages that have been discussed can be achieved independently in various versions of the disclosure or may be combined in yet other versions further details of which can be seen with reference to the following description and drawings.

Further, the disclosure comprises embodiments according to the following examples:

Example 1. A pick-and-place system (10) for transferring and installing an aircraft stringer (28) having a complex curved configuration (22a), onto a mandrel (52), in a composite manufacturing system (12a), the pick-and-place system (10) comprising: a tray station (34) having a kitting tray (38) designed to hold the aircraft stringer (28), prior to transfer and installation onto the mandrel (52), the aircraft stringer (28) received from a forming apparatus (48) at a forming station (46) in the composite manufacturing system (12a); and an installation station (50) comprising: the mandrel (52) designed to receive the aircraft stringer (28), and designed to move along a moving manufacturing line (54), via a conveyor assembly (56); and a pick-and-place assembly (60) comprising: a gantry assembly (70); a main beam (135) suspended from the gantry assembly (70), the main beam (135) having a plurality of end effector assemblies (160) and a pair of indexing assemblies (154), coupled to the main beam (135); a vacuum system (168) coupled to the main beam (135) and coupled to the plurality of end effector assemblies (160); a load balancer assembly (170) coupling the main beam (135) to the gantry assembly (70), the load balancer assembly (170) designed to orient and stabilize the main beam (135) and the aircraft stringer (28), during transfer and installation of the aircraft stringer (28) from the kitting tray (38) onto the mandrel (52); a radio-frequency identification (RFID) system (295) comprising a radio-frequency identification (RFID) reader (296) coupled to the main beam (135), and a radio-frequency identification (RFID) tag (298) coupled to the kitting tray (38), and a control system (150) coupled to the pick-and-place assembly (60), the control system (150) designed to operably control the pick-and-place assembly (60), including during transfer and installation of the aircraft stringer (28) onto the mandrel (52).

Example 2. The pick-and-place system (10) of example 1, wherein the gantry assembly (70) comprises: an overhead gantry (72) coupled to a pair of side supports (74); a main trolley (100) movably coupled to, and positioned under, the overhead gantry (72), the main trolley (100) designed to ride, via an x-axis motion system (116), within a pair of main tracks (96) formed along a pair of longitudinal beams (86) of the overhead gantry (72); and a pair of side trolleys (126), each designed to ride, via a y-axis motion system (130), within one of a pair of side tracks (124) formed along each of a pair of side beams (122) of the main trolley (100).

Example 3. The pick-and-place system (10) of examples 1-2, wherein the load balancer assembly (170) comprises: a pair of load balancer devices (174) coupling the main beam (135) to the pair of side trolleys (126) of the gantry assembly (70), each load balancer device (174) comprising: a pair of pulleys (176) coupled to one of the pair of side trolleys (126); an attachment member (158) coupled to the main beam (135); and a pair of cables (178) movably coupled between the pair of pulleys (176) and the attachment member (158), wherein for each load balancer device (174), the pair of pulleys (176) is oriented on the one of the pair of side trolleys (126), so that the pair of cables (178) defines a trapezoidal configuration (182), when coupled to the attachment member (158), to minimize unwanted motion of the mandrel (52).

Example 4. The pick-and-place system (10) of examples 1-3, wherein the plurality of end effector assemblies (160) each comprises: a vacuum plate (242) having a plurality of vacuum cups (245) on a bottom side (244b) of the vacuum plate (242), the vacuum plate (242) designed to contact and secure the aircraft stringer (28) to each of the plurality of end effector assemblies (160), during transfer and installation of the aircraft stringer (28); a plurality of linear actuators (246) comprising a plurality of first linear actuators (246a) coupled to a top side (244a) of the vacuum plate (242), via a plurality of swivel devices (260), and comprising a second linear actuator (246b) positioned between the plurality of first linear actuators (246a); a stop device (268) coupled to each of the plurality of first linear actuators (246a); and a main support structure (269) coupled to the plurality of linear actuators (246).

Example 5. The pick-and-place system (10) of examples 1-4, wherein the pair of indexing assemblies (154) each comprises: a pair of suction cups (235) designed to contact the kitting tray (38) during transfer of the aircraft stringer (28), and designed to contact the mandrel (52) during installation of the aircraft stringer (28) onto the mandrel (52); an indexing linear actuator (236) designed for insertion into a cup-and-cone element (237) during transfer and installation of the aircraft stringer (28); and a drive mechanism (240) for driving the indexing linear actuator (236) during transfer and installation of the aircraft stringer (28), wherein the pair of indexing assemblies (154) act as locating features, to allow the main beam (135) to push the aircraft stringer (28) into place on the mandrel (52), without lifting off of the mandrel (52).

BRIEF DESCRIPTION OF THE DRAWINGS

The disclosure can be better understood with reference to the following detailed description taken in conjunction with the accompanying drawings which illustrate preferred and exemplary versions, but which are not necessarily drawn to scale. The drawings are examples and not meant as limitations on the description or claims.

FIG. 3 is an illustration of a front perspective view of a version of a conveyor assembly for a mandrel of a pick-and-place system of the disclosure;

FIG. 4A is an illustration of a front perspective view of a version of a kitting tray in the form of a straight flat kitting tray;

FIG. 4B is an illustration of a front perspective view of another version of a kitting tray in the form of a high-contour kitting tray;

FIG. 6A is a schematic illustration of a front view of a version of a pick-and-place assembly showing various dimensions;

FIG. 6B is a schematic illustration of a front view of end effector assemblies showing a gap distance between adjacent end effector assemblies;

FIG. 7A is an illustration of front perspective view of a version of a main beam with a plurality of end effector assemblies and a pair of indexing assemblies;

FIG. 7B is an illustration of an enlarged view of an attachment member of the circle 7B of FIG. 7A;

FIG. 7C is an illustration of an enlarged side view of an indexing assembly of the circle 7C of FIG. 7A;

FIG. 11A is an illustration of a left front perspective view of a main beam indexed to a tray assembly with an indexing assembly, of a version of a pick-and-place system of the disclosure;

FIG. 11B is an illustration of an enlarged cross-sectional view of a cup-and-cone locating feature;

FIG. 12A is an illustration of an enlarged front perspective view of a radio-frequency identification (RFID) system connected to a main beam and a tray assembly of a pick-and-place system of the disclosure;

FIG. 12B is an illustration of an enlarged front view of a radio-frequency identification (RFID) tag of the RFID system of FIG. 12A;

FIG. 13C is an illustration of a left side view of the end effector assembly, the main beam, and the tray assembly of FIG. 13A, where the end effector assembly is in a third position;

FIG. 13D is an illustration of a left side view of the end effector assembly, the main beam, and the tray assembly of FIG. 13A, where the end effector assembly is in a fourth position;

FIG. 15A is an illustration of a left front perspective view of a version of a pick-and-place system of the disclosure showing an operator automatically rotating a main beam to match an angle of a mandrel;

FIG. 15B is an illustration of an enlarged view of an indexing assembly coupled to the main beam of FIG. 15A;

FIG. 16A is an illustration of a left side close-up perspective view of an operator rough indexing a main beam to a mandrel, with an indexing assembly, of a pick-and-place system of the disclosure;

FIG. 16B is an illustration of an enlarged cross-sectional view of a cup-and-cone locating feature of the indexing assembly of FIG. 16A;

The figures shown in this disclosure represent various aspects of the versions presented, and only differences will be discussed in detail.

DETAILED DESCRIPTION

Disclosed versions or embodiments will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "in one version" or "in a version" do not necessarily refer to the same version. Particular features, structures, or characteristics may be combined in any suitable manner consistent with this disclosure.

As used herein, "comprising" is an open-ended term, and as used in the claims, this term does not foreclose additional structures or steps.

As used herein, "designed to" or "configured to" means various parts or components may be described or claimed as "designed to" or "configured to" perform a task or tasks. In such contexts, "designed to" or "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps.

Figure 1:
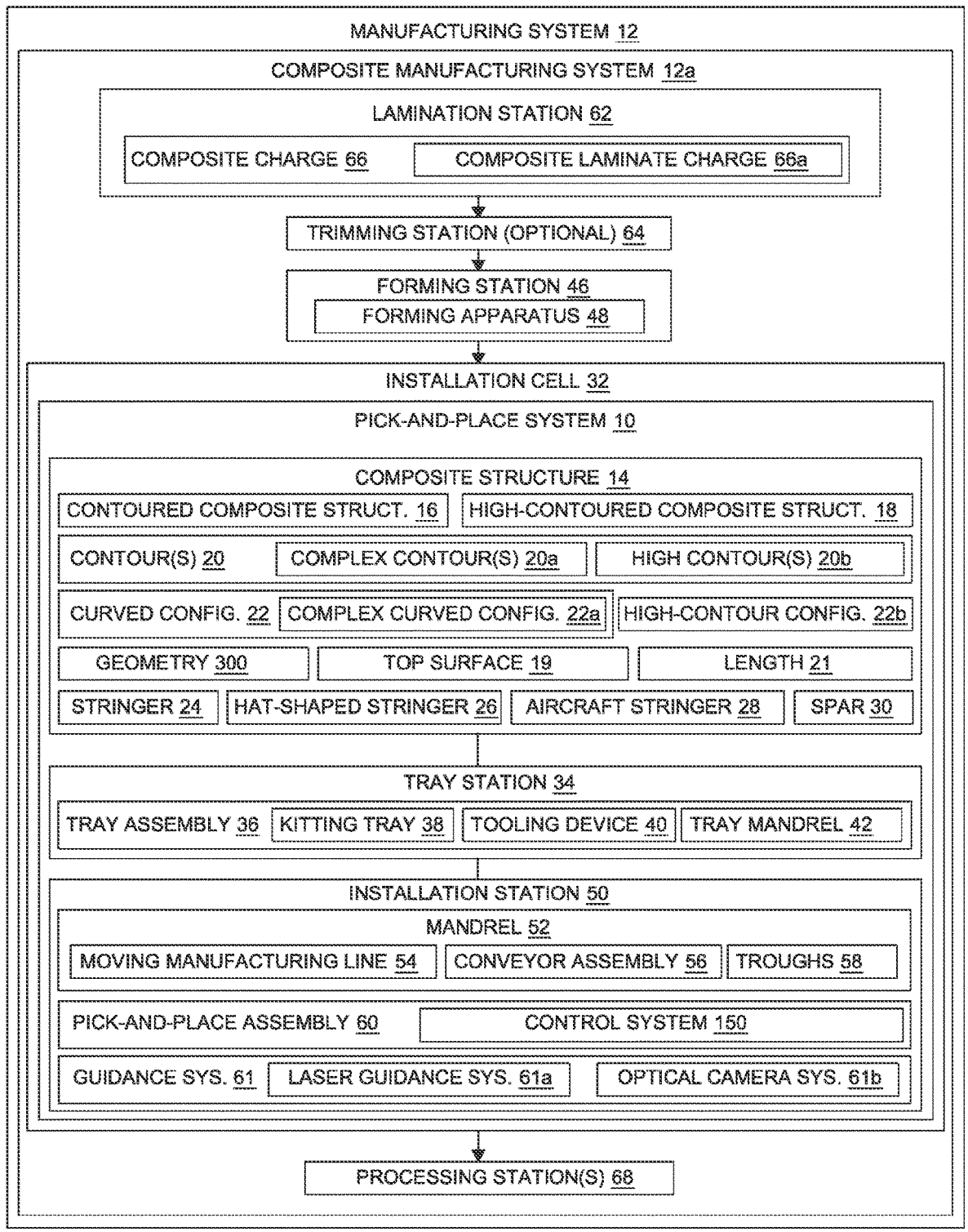
FIG. 1 is an illustration of a functional block diagram showing an exemplary version of a pick-and-place system of the disclosure, for a manufacturing system.

Now referring to the Figures, FIG. 1 is an illustration of a functional block diagram showing an exemplary version of a pick-and-place system 10 of the disclosure, as part of a manufacturing system 12, such as a composite manufacturing system 12a, for manufacturing composite structures 14, such as contoured composite structures 16, for example, high-contoured composite structures 18. The pick-and-place system 10 may be semi-automated or fully automated. The blocks in FIG. 1 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein.

As shown in FIG. 1, the pick-and-place system 10 is designed to transfer and install the composite structure 14, such as the contoured composite structure 16, for example, the high-contoured composite structure 18. The contoured composite structure 16 has one or more contours 20 (see FIG. 1), such as one or more complex contours 20a (see FIG. 1), or one or more high contours 20b (see FIG. 1), along its length 21 (see FIG. 1). The one or more contours 20, such as the one or more complex contours 20a, or one or more high contours 20b, may include curves, angles, flanges, high contours, and the like. The contoured composite structure 16 has a curved configuration 22 (see FIG. 1), such as a complex curved configuration 22a (see FIG. 1), or a high-contour configuration 23 (see FIG. 1). The contoured composite structure 16 can be used in a variety of industries and applications including, but not limited to, the manufacture of aircraft 350a (see FIG. 19) and other aerospace structures and vehicles.

As shown in FIG. 1, the composite structure 14, such as the contoured composite structure 16, may comprise one or more of, a stringer 24, including a hat-shaped stringer 26, an aircraft stringer 28, or another suitable stringer, a spar 30, or another suitable contoured composite structure. The aircraft stringer 28 may comprise a fuselage stringer for fuselage 352 (see FIG. 19), a keel stringer, a wing stringer for wings 354 (see FIG. 19), a stabilizer stringer for a vertical stabilizer 360 (see FIG. 19) or horizontal stabilizers 362 (see FIG. 19) of the empennage 358 (see FIG. 19), or another suitable stringer or stiffener member. A pick-and-place assembly 60 (see FIGS. 1, 2A-2F) is used to transfer and install exemplary contoured composite structures 16, such as high-contoured composite structures 18, for example, stringers 24, having lengths of 3 meters (10 feet), 6 meters (20 feet), 12 meters (40 feet), or another suitable length. In one exemplary version, the pick-and-place assembly 60 accommodates a stringer 24 having a length of 12.2 meters (40 feet), a width of 6.1 meters (20 feet), and a height of 1.2 meters (4 feet).

As used herein, "contoured composite structures" and "high-contoured composite structures" mean a wide variety of complex contoured and highly contoured composite structures and parts having steep or severe contours, such as complex contours, along their length and having a final three-dimensional geometry. As used herein, "contours" and "complex contours" mean a constant or varying contour, or curvature, in the direction of the length of the composite charge that is steep or severe, and having a three-dimensional geometry.

Figure 2A:
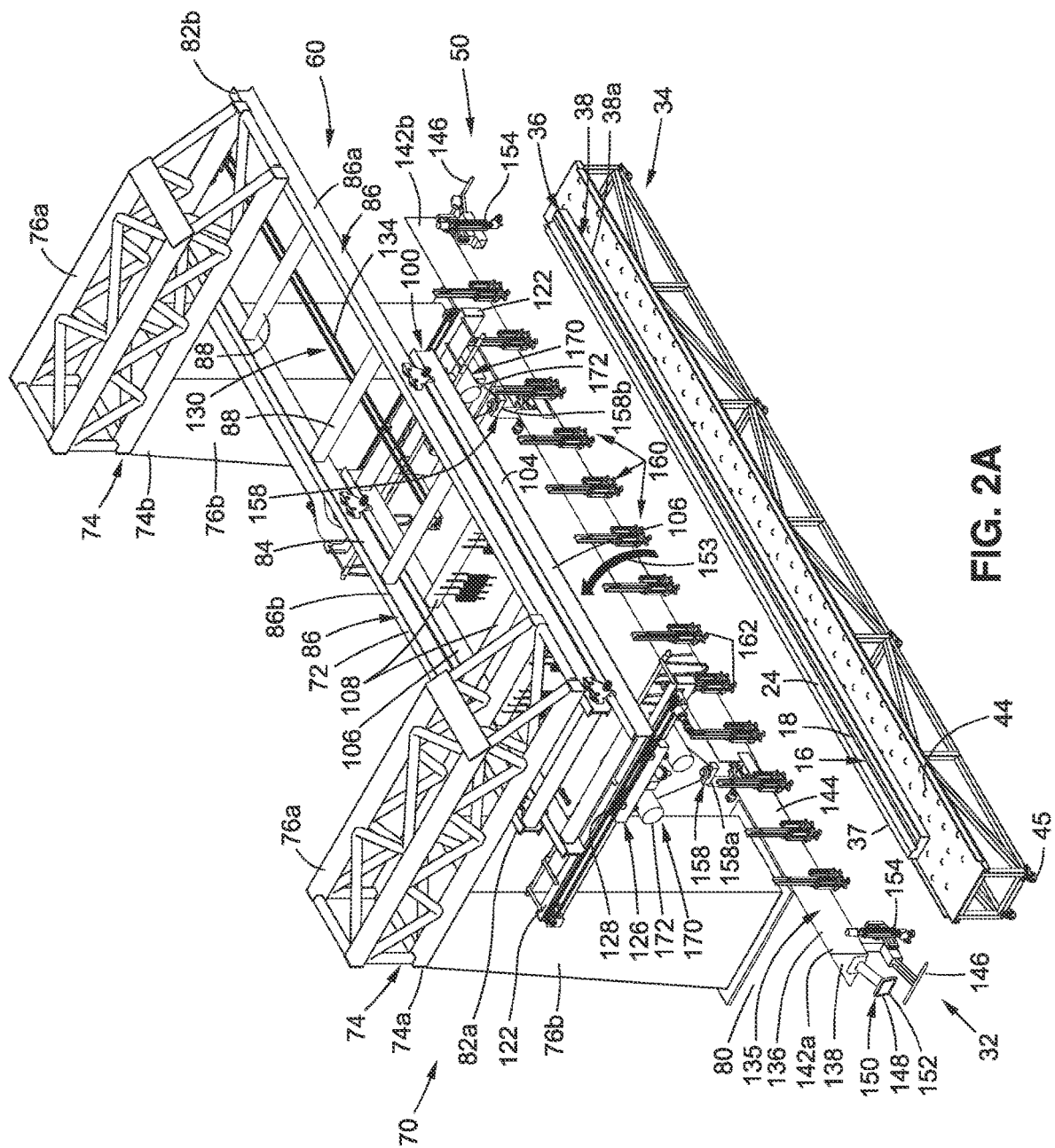
FIG. 2A is an illustration of a top front perspective view of a version of a pick-and-place assembly and a tray assembly of the pick-and-place system of the disclosure.

As shown in FIG. 1, the pick-and-place system 10 is used in an installation cell 32 of the manufacturing system 12. As further shown in FIG. 1, the pick-and-place system 10 comprises a tray station 34 having a tray assembly 36. The tray assembly 36 comprises one of, a kitting tray 38, including a straight flat kitting tray 38a (see FIGS. 2A, 4A), and a high-contour kitting tray 38b (see FIG. 4B), a tooling device 40 (see FIG. 1), a tray mandrel 42 (see FIG. 1), or another suitable tray assembly. As shown in FIG. 2A, the tray assembly 36 comprises a kitting tray 38, such as a straight flat kitting tray 38a, positioned on a movable table 44. The tray assembly 36, such as the kitting tray 38, of the tray station 34, is designed to receive, and receives, the contoured composite structure 16, such as the high-contoured composite structure 18, from a forming station 46 (see FIG. 1) of the manufacturing system 12, such as the composite manufacturing system 12a, and in particular, from a forming apparatus 48 (see FIG. 1) at the forming station 46. The contoured composite structure 16, such as the high-contoured composite structure 18, is preferably formed in the forming apparatus 48, with a cold forming process with pressure, at the forming station 46, and is transferred, and held, on the tray assembly 36, from the forming station 46 to the installation cell 32.

As shown in FIG. 1, the pick-and-place system 10 further comprises an installation station 50 in the installation cell 32. The installation station 50 includes a mandrel 52 (see FIG. 1) designed to receive the contoured composite structure 16, such as the high-contoured composite structure 18, from the tray assembly 36. The tray assembly 36 is designed to hold the contoured composite structure 16, such as the high-contoured composite structure 18, prior to transfer and installation onto the mandrel 52. As shown in FIG. 1, the mandrel 52 is designed to move along a moving manufacturing line 54, via a conveyor assembly 56 (see also FIGS. 3, 2F). In one exemplary version, the mandrel 52 is on the moving manufacturing line 54 having a speed of no more than 12.7 centimeters (5 inches) per minute. A top surface 222 (see FIG. 5A) of the mandrel 52 has a plurality of troughs 58 (see FIGS. 1, 2F), or cavities, shaped to hold the contoured composite structure 16, for example, the high-contoured composite structure 18, when it is transferred from the tray assembly 36 to the mandrel 52.

As shown in FIG. 1, the installation station 50 further comprises a pick-and-place assembly 60, discussed in detail below, having a control system 150. As shown in FIG. 1, the installation station 50 may further comprise a guidance system 61, such as a laser guidance system 61a, an optical camera system 61b, or another suitable guidance system, discussed in further detail below with respect to FIG. 10.

As further shown in FIG. 1, the manufacturing system 12 comprises a lamination station 62 and may optionally comprise a trimming station 64, where a composite charge 66, such as a composite laminate charge 66a, may be created or laid-up at the lamination station 62, and may be trimmed at the trimming station 64 before being formed into the contoured composite structure 16, such as the high-contoured composite structure 18, at the forming station 46. As further shown in FIG. 1, the manufacturing system 12 comprises one or more processing stations 68 configured for processing the contoured composite structures 16, such as the high-contoured composite structures 18, installed onto and into the mandrel 52.

Figure 2B:
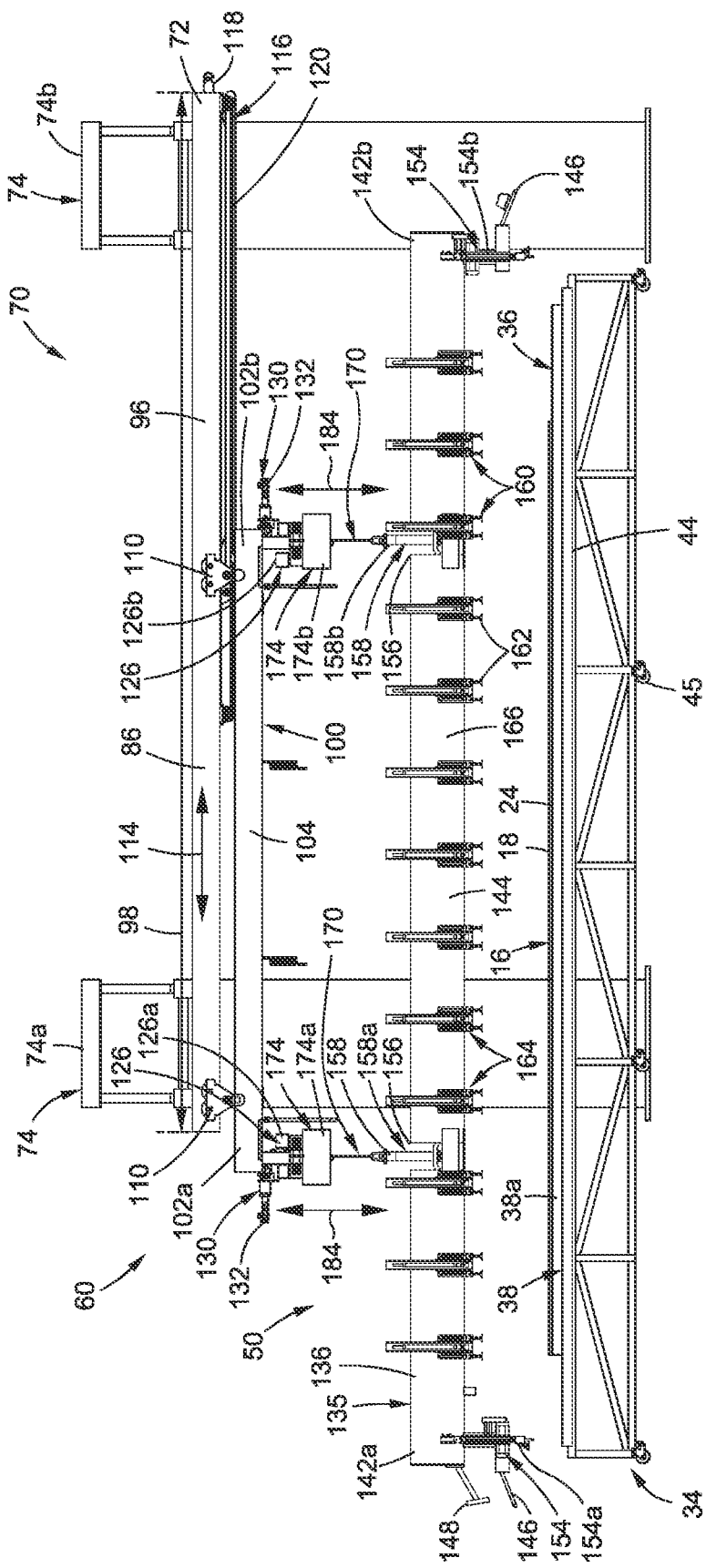
FIG. 2B is an illustration of a front view of the pick-and-place assembly and the tray assembly of FIG. 2A.
Figure 2C:
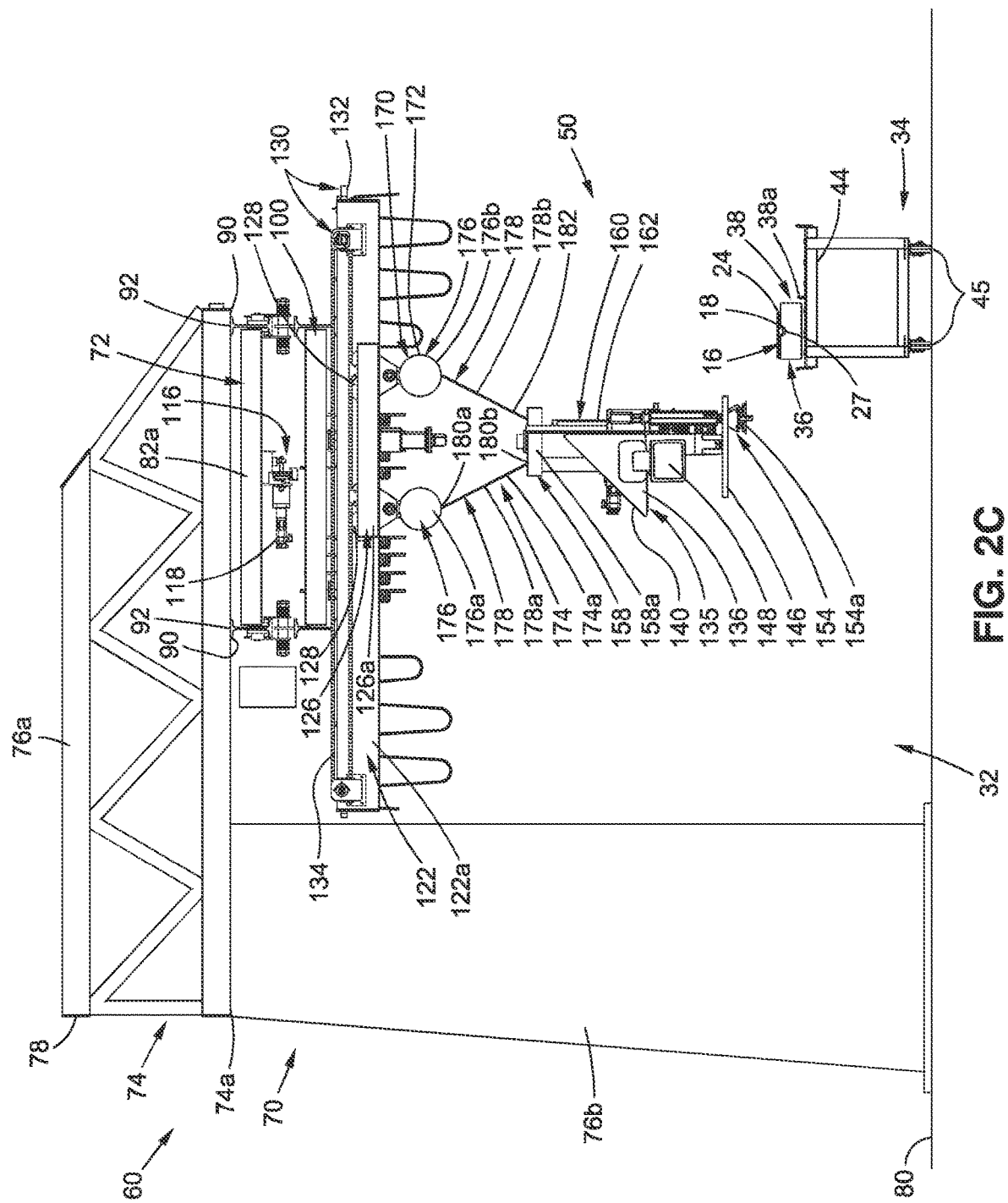
FIG. 2C is an illustration of a left side view of the pick-and-place assembly and the tray assembly of FIG. 2A.
Figure 2D:
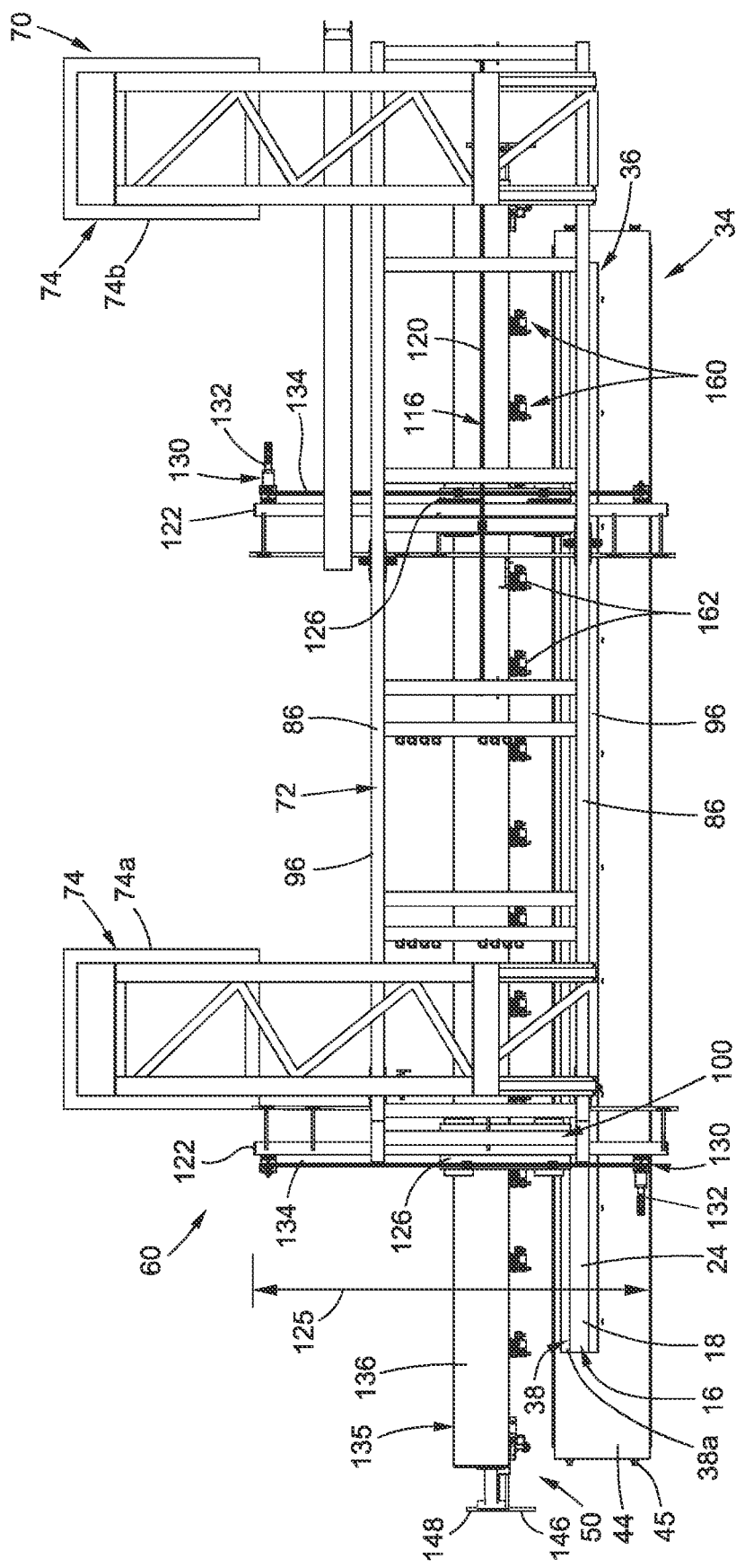
FIG. 2D is an illustration of a top view of the pick-and-place assembly and the tray assembly of FIG. 2A.
Figure 2E:
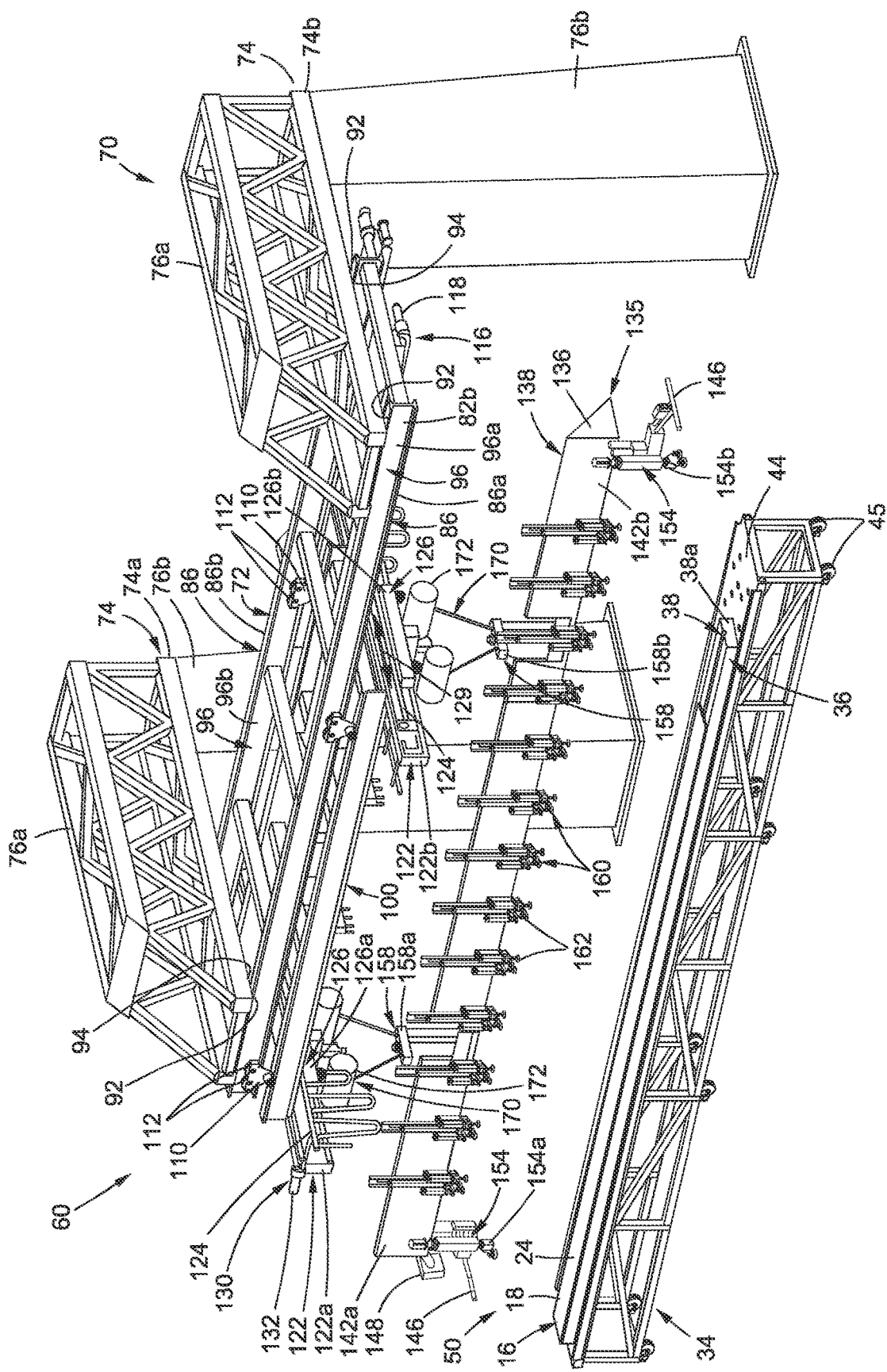
FIG. 2E is an illustration of right front perspective view of the pick-and-place assembly and the tray assembly of FIG. 2A.
Figure 2F:
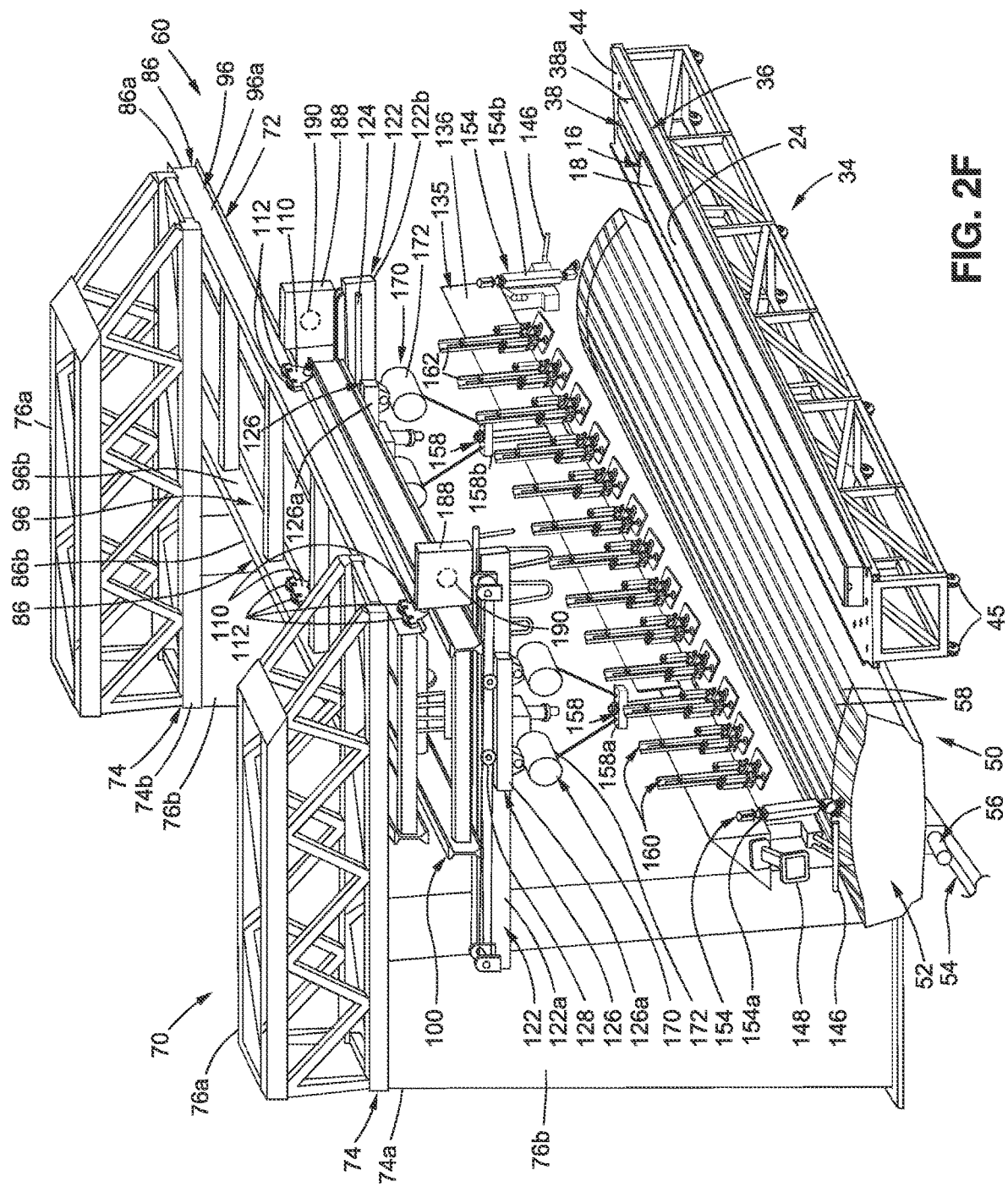
FIG. 2F is an illustration of a left front perspective view of the pick-and-place assembly and the tray assembly of FIG. 2A, and showing a mandrel positioned under the pick-and-place assembly.

Now referring to FIGS. 2A-2F, FIGS. 2A-2F show various versions of the pick-and-place assembly 60 of the installation station 50. FIG. 2A is an illustration of a top front perspective view of a version of a pick-and-place assembly 60 and a tray assembly 36 of the pick-and-place system 10 (see FIG. 1) of the disclosure. FIG. 2B is an illustration of a front view of the pick-and-place assembly 60 and the tray assembly 36 of FIG. 2A. FIG. 2C is an illustration of a left side view of the pick-and-place assembly 60 and the tray assembly 36 of FIG. 2A. FIG. 2D is an illustration of a top view of the pick-and-place assembly 60 and the tray assembly 36 of FIG. 2A. FIG. 2E is an illustration of right front perspective view of the pick-and-place assembly 60 and the tray assembly 36 of FIG. 2A. FIG. 2F is an illustration of a left front view perspective view of the pick-and-place assembly 60 and the tray assembly 36 of FIG. 2A, and also showing a mandrel 52 positioned under the pick-and-place assembly 60.

As shown in FIGS. 2A-2F, the pick-and-place assembly 60 comprises a gantry assembly 70. As shown in FIGS. 2A-2F, the gantry assembly 70 comprises an overhead gantry 72 coupled, or attached, to a pair of side supports 74, including a first side support 74a and a second side support 74b. Each side support 74 comprises a first portion 76a (see FIGS. 2A, 2C, 2E, 2F) attached to, or integrated with, a second portion 76b (see FIGS. 2A, 2C, 2E, 2F). The first portion 76a is in the form of a horizontally oriented overhang, and the second portion 76b is in the form of a vertically oriented column or support. The first portion 76a is generally perpendicularly oriented to the second portion 76b, and together, the first portion 76a and the second portion 76b form an L-shaped configuration 78 (see FIG. 2C). The side supports 74, such as the first side support 74a and the second side support 74b, are fixed in place to a floor 80 (see FIGS. 2A, 2C) of the installation cell 32 (see FIGS. 2A, 2C).

As shown in FIG. 2A, the overhead gantry 72 has a first end portion 82a, a second end portion 82b, and a structural body 84. The structural body 84 is comprised of a pair of longitudinal beams 86 (see FIGS. 2A, 2D, 2E, 2F), including a front longitudinal beam 86a (see FIGS. 2A, 2E, 2F) and a back longitudinal beam 86b (see FIGS. 2A, 2E, 2F). As shown in FIG. 2A, a plurality of crossbeams 88 are attached between the pair of longitudinal beams 86 to form a bridge-like structure. As shown in FIG. 2C, the first end portion 82a of the overhead gantry 72 is attached to bottom portions 90 of the first portion 76a the first side support 74a, via attachment points 92. As shown in FIG. 2E, the second end portion 82b of the overhead gantry 72 is attached to bottom portions 94 of the first portion 76a of the second side support 74b, via attachment points 92. The longitudinal beams 86 each have a main track 96 (see FIGS. 2B, 2D, 2E, 2F). As further shown in FIGS. 2E, 2F, the front longitudinal beam 86a has a front main track 96a, and the back longitudinal beam 86b has a back main track 96b. As shown in FIG. 2B, the main tracks 96 are formed along a length 98 of the longitudinal beams 86.

As shown in FIGS. 2A-2F, the gantry assembly 70 further comprises a main trolley 100, or movable carriage, movably coupled to, and positioned under, the overhead gantry 72. As shown in FIG. 2B, the main trolley 100 has a first end portion 102a, a second end portion 102b, and a structural body 104. As shown in FIG. 2A, the structural body 104 is comprised of a pair of main trolley longitudinal beams 106 and a plurality of main trolley crossbeams 108 attached between the pair of main trolley longitudinal beams 106. The first end portion 102a and the second end portion 102b of the main trolley 100 are attached to the overhead gantry 72, via a plurality of bracket members 110 (see FIGS. 2B, 2E, 2F). The main trolley 100 is coupled to rollers 112 (see FIGS. 2E, 2F), via the bracket members 110 (see FIGS. 2E, 2F). As shown in FIGS. 2E, 2F the rollers 112 of the main trolley 100 are configured to roll, and do roll, along the main tracks 96 along the length 98 (see FIG. 2B) of the longitudinal beams 86 of the overhead gantry 72. As shown in FIG. 2E, the rollers 112 of the main trolley 100 are configured to roll, and roll, along the front main track 96a in the front longitudinal beam 86a, and along the back main track 96b in the back longitudinal beam 86b. The main trolley 100 is designed to ride, or move, in a back-and-forth direction 114 (see FIG. 2B) within the main tracks 96, via the rollers 112, rolling the main trolley 100 along the main tracks 96. The main trolley 100 is moved, or driven, back and forth with an x-axis motion system 116 (see FIGS. 2B, 2C, 2D, 2E) coupled to the overhead gantry 72. The x-axis motion system 116 comprises a drive motor device 118 (see FIGS. 2B, 2C, 2E) and a drive belt 120 (see FIGS. 2B, 2D), or a drive chain, or another suitable drive element.

As shown in FIGS. 2A, 2C, 2D, 2E, 2F, the main trolley 100 further comprises a pair of side beams 122, including a first side beam 122a (see FIGS. 2A, 2E, 2F) and a second side beam 122b (see FIGS. 2E, 2F). Each side beam 122 has a side track 124 (see FIGS. 2E, 2F) formed along a length 125 (see FIG. 2D) of the side beam 122.

As shown in FIGS. 2A-2F, the gantry assembly 70 further comprises a pair of side trolleys 126, or movable carriages, coupled to the pair of side beams 122, respectively, of the main trolley 100. As shown in FIGS. 2B, 2C, 2E, 2F, the pair of side trolleys 126 comprise a first side trolley 126a and a second side trolley 126b. Each side trolley 126 is designed to ride within the side track 124 formed along the side beam 122 of the main trolley 100. As shown in FIG. 2E, the first side trolley 126a is designed to ride, and rides, within, and along, the side track 124 of the first side beam 122a, and the second side trolley 126b is designed to ride, and rides, within and along the side track 124 of the second side beam 122b.

Each side trolley 126 may be coupled to rollers 128 (see FIGS. 2A, 2C, 2F), or other suitable movable devices, that are configured to roll, or move, along the side tracks 124 along the length 125 (see FIG. 2D) of each side beam 122 of the main trolley 100. The side trolleys 126 are designed to ride, or move, in a back-and-forth direction 129 (see FIG. 2E) within the side track 124. Each side trolley 126 is moved, or driven, back and forth with a y-axis motion system 130 (see FIGS. 2A-2E) coupled to each side beam 122 of the main trolley 100. Each y-axis motion system 130 (see FIGS. 2A-2D) comprises a drive motor device 132 (see FIGS. 2B, 2C, 2D) and a drive belt 134 (see FIGS. 2A, 2C, 2D), or a drive chain, or another suitable drive element. As shown in FIG. 2B, the gantry assembly 70 of the pick-and-place assembly 60 comprises one x-axis motion system 116 and two y-axis motion systems 130.

As shown in FIGS. 2A-2D, 2F, the pick-and-place assembly 60 further comprises a main beam 135 suspended from the gantry assembly 70. Preferably, the main beam 135 comprises a strongback 136 (see FIGS. 2A-2F). As used herein, "strongback" means a beam or girder acting as a support member and designed to handle a strain. The main beam 135, such as the strongback 136, may be made of a metal material, such as steel, stainless steel, or another suitably strong metal, a wood material, or another strong and sturdy material. The main beam 135, such as the strongback 136, preferably has a triangle shape 138 (see FIGS. 2A, 2E) and has a triangle shaped cross-section 140 (see FIG. 2C).

The triangle shape 138 of the main beam 135, such as the strongback 136, provides an optimum stiffness and freedom of movement. Although the triangle shape 138 is shown in FIG. 2A, the main beam 135, such as the strongback 136, may have another suitable shape.

Preferably, the contoured composite structure 16 (see FIGS. 2A-2F), such as the high-contoured composite structure 18 (see FIGS. 2A-2F), for example, the stringer 24 (see FIGS. 2A-2F), maintains its shape throughout transfer from the tray assembly 36 to the main beam 135, such as the strongback 136, and throughout transfer from the main beam 135, such as the strongback 136, to the mandrel 52. Deflection of the contoured composite structure 16, such as the high-contoured composite structure 18, for example, the stringer 24, preferably does not exceed 2.54 centimeters (1 inch).

As shown in FIGS. 2A, 2B, the main beam 135, such as the strongback 136, has a first end 142a, a second end 142b, and an elongated body 144 formed between the first end 142a and the second end 142b. As shown in FIGS. 2A-2F, the main beam 135, such as the strongback 136, includes handles 146 attached to the first end 142a and attached to the second end 142b. The handles 146 may be used to lift and move the main beam 135, such as the strongback 136, by one or more operators 147 (see FIG. 11A) during the transfer and installation of the contoured composite structure 16, such as the stringer 24, onto and into the mandrel 52.

As shown in FIGS. 2A-2F, the main beam 135, such as the strongback 136, further includes a human machine interface (HMI) device 148 attached to the first end 142a (see FIG. 2A). The HMI device 148 is part of a control system 150 (see FIG. 2A) of the pick-and-place assembly 60 and the HMI device 148 includes a control panel 152 (see FIG. 2A). An operator 147 (see FIG. 11A) interfaces with the control panel 152 of the HMI device 148 to operably control various operations of the pick-and-place assembly 60 during the transfer and installation of the contoured composite structure 16, such as the stringer 24, onto and into the mandrel 52. For example, as shown in FIG. 2A, the main beam 135, such as the strongback 136, may be configured to rotate in a rotation direction 153 using the control system 150, and/or by manual use by the operators 147.

As shown in FIGS. 2A-2C, 2E, 2F, the main beam 135, such as the strongback 136, has a pair of indexing assemblies 154, coupled to the main beam 135, such as the strongback 136. The pair of indexing assemblies 154 comprise a first indexing assembly 154a (see FIGS. 2B, 2C, 2E, 2F) coupled, or attached, to the first end 142a of the main beam 135, such as the strongback 136, and comprises a second indexing assembly 154b (see FIGS. 2B, 2E, 2F) coupled, or attached, to the second end 142b of the main beam 135, such as the strongback 136. The pair of indexing assemblies 154 are discussed in further detail below with respect to FIGS. 11A-11B.

Figure 5A:
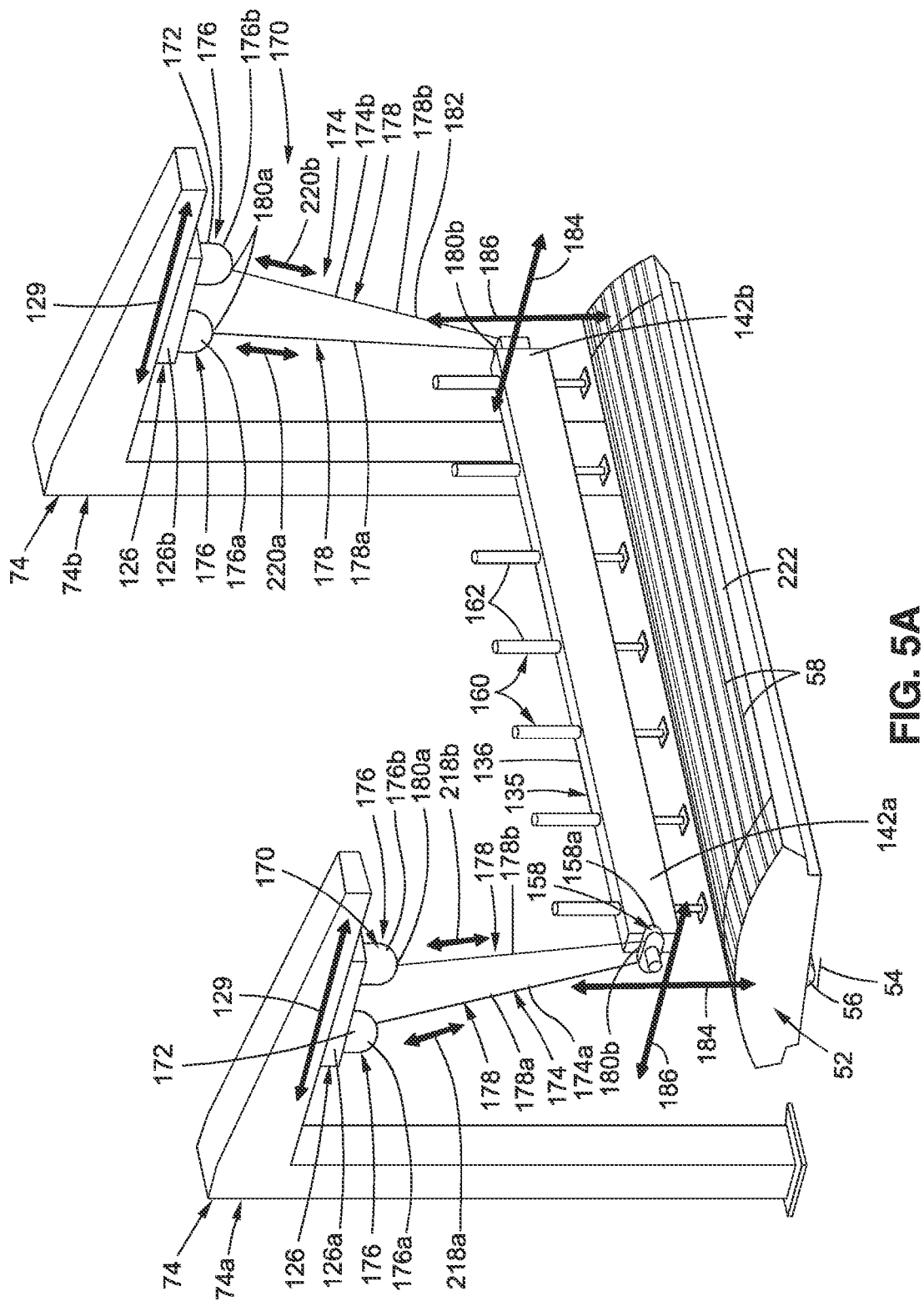
FIG. 5A is a schematic illustration of a front perspective view of a version of a load balancer assembly, a main beam, and a mandrel of a pick-and-place system of the disclosure.

In one version, the main beam 135, such as the strongback 136, has notched portions 156 (see FIG. 2B) with attachment members 158 (see FIGS. 2A-2C, 2E, 2F), such as in the form of a first bearing member 158a (see FIGS. 2A-2C, 2E, 2F) and a second bearing member 158b (see FIGS. 2A-2B, 2E, 2F), or another suitable attachment member, discussed in further detail below with respect to FIG. 7B. As shown in FIG. 2B, in this version, the attachment members 158, such as the first bearing member 158a and the second bearing member 158b, are located at the notched portions 156 formed within the elongated body 144. In another version, as shown in FIG. 5A, the attachment members 158, such as the first bearing member 158a and the second bearing member 158b, are located at the first end 142a and the second end 142b, respectively, of the main beam 135, such as the strongback 136.

As shown in FIGS. 2A-2F, the main beam 135, such as the strongback 136, further has a plurality of end effector assemblies 160, or pogo assemblies 162, coupled, or attached, to the main beam 135, such as the strongback 136. The plurality of end effector assemblies 160, or pogo assemblies 162, are designed to pick up, hold, and transfer the contoured composite structure 16, such as the high-contoured composite structure 18, when it is transferred from the tray assembly 36 to the mandrel 52. One of the purposes of the main beam 135, such as the strongback 136, is to hold the plurality of end effector assemblies 160, or pogo assemblies 162. Within the main beam 135, such as the strongback 136, is a mechanism that manipulates and moves the contoured composite structure 16, such as the high-contoured composite structure 18, for example, the stringer 24, into an orientation needed to drop it into one of the troughs 58 (see FIG. 2F), or cavities, formed on the surface of the mandrel 52, to hold the contoured composite structure 16, such as the high-contoured composite structure 18, for example, the stringer 24, on the mandrel 52.

As shown in FIG. 2B, the plurality of end effector assemblies 160, or pogo assemblies 162, are in a spaced configuration 164 equal distance apart between adjacent end effector assemblies 160, or pogo assemblies 162, and are coupled, or attached, to a front side 166 (see FIG. 7A) of the main beam 135, such as the strongback 136. Although FIG. 2B shows thirteen end effector assemblies 160, or pogo assemblies 162, and FIG. 5A shows seven end effector assemblies 160, or pogo assemblies 162, the number of end effector assemblies 160, or pogo assemblies 162, may be less than seven, between eight and twelve, and greater than thirteen, and is dependent on the length and size of the contoured composite structure 16, such as the high-contoured composite structure 18, for example, the stringer 24, that is to be transferred and installed onto and into the mandrel 52. The plurality of end effector assemblies 160, or pogo assemblies 162, are discussed in further detail below with respect to FIGS. 8A-8B.

The pick-and-place assembly 60 further comprises a vacuum system 168 (see FIG. 14) coupled to, or within, the main beam 135, such as the strongback 136, and coupled to the plurality of end effector assemblies 160. The vacuum system 168 is discussed in further detail below with respect to FIG. 14.

As shown in FIGS. 2A-2C, 2E-2F, the pick-and-place assembly 60 further comprises a load balancer assembly 170, such as a pulley assembly 172, coupling the main beam 135, such as the strongback 136, to the pair of side trolleys 126 of the gantry assembly 70. The load balancer assembly 170, such as the pulley assembly 172, comprises a pair of load balancer devices 174 (see FIGS. 2B, 2C), such as a first load balancer device 174a (see FIGS. 2B, 2C) and a second load balancer device 174b (see FIG. 2B), coupling the main beam 135, such as the strongback 136, to the pair of side trolleys 126 of the gantry assembly 70. As shown in FIG. 2C, the load balancer device 174, such as the first load balancer device 174a, comprises a pair of pulleys 176, or spools, or yo-yos, coupled to one of the pair of side trolleys 126, such as the first side trolley 126a. As shown in FIG. 2C, the pulleys 176 comprise a first pulley 176a and a second pulley 176b. The pulleys 176 are made of a metal material such as steel, stainless steel, or plated carbon steel, a ceramic material, an industrial plastic material, or another suitable material.

Each load balancer device 174 further comprises a pair of cables 178 (see FIGS. 2C, 5A), or belts. As shown in FIGS. 2C, 5A, the load balancer device 174, such as the first load balancer device 174a, comprises the pair of cables 178, such as a first cable 178a and a second cable 178b. As shown in FIG. 5C, the load balancer device 174, such as the second load balancer device 174b, comprises the pair of cables 178, such as the first cable 178a and the second cable 178b. Each cable 178 has a first end 180a (see FIGS. 2C, 5A) coupled to one pulley 176, and each cable 178 has a second end 180b (see FIGS. 2C, 5A) coupled to the attachment member 158. Each load balancer device 174 has the pair of cables 178 movably coupled between the pair of pulleys 176 and the attachment member 158. The cables 178 may be made of a metal material, such as steel, stainless steel, plated carbon steel, or another suitable metal material, or may be made of an industrial plastic material, such as an acetal plastic, for example, polyoxymethylene, or an industrial plastic material such as nylon, polyether ether ketone (PEEK), polytetrafluoroethylene, or another suitable hard and durable thermoplastic. The pulleys 176, or spools, or yo-yos, may each comprise a wheel on an axle or shaft that is designed to support movement and change of direction of the cable 178, or belt, or transfer of power between the shaft and the cable 178, or belt.

As shown in FIG. 2C, the pair of pulleys 176 is oriented on the side trolley 126, so that the pair of cables 178 for each load balancer device 174 defines a trapezoidal configuration 182 when coupled to the attachment member 158, such as the first bearing member 158a, to minimize unwanted motion of the mandrel 52 and of the main beam 135, while still allowing the mandrel 52 and/or the main beam 135, to be rotated to a desired position and to be aligned for installation of the contoured composite structure 16, or stringer 24, onto the mandrel 52. When coupled to the contoured composite structure 16, such as the stringer 24, the pair of cables 178 from the load balancer devices 174 define the trapezoidal configuration 182, to minimize, or prevent, unwanted motion such as swinging, rocking, and other unwanted motion of the contoured composite structure 16, such as the stringer 24. The cables 178 of each load balancer device 174 are preferably in a predetermined angle that creates the trapezoidal configuration 182 to orient the contoured composite structures 16, such as the stringers 24, during installation.

The pair of pulleys 176, or spools, or yo-yos, are coupled to each of the side trolleys 126, and the pair of pulleys 176, or spools, or yo-yos, on each side trolley 126 are synchronized to one another, so as to supply the same amount of cable 178 from each of the pair of pulleys 176, or spools, or yo-yos. However, the pair of pulleys 176, or spools, or yo-yos, on different side trolleys 126 and side beams 122 are not synchronized. The pair of pulleys 176, or spools, or yo-yos, on one side trolley 126 and side beam 122 are independent from the pair of pulleys 176, or spools, or yo-yos, on the other side trolley 126 and side beam 122.

The pair of load balancer devices 174 of the load balancer assembly 170, or pulley assembly 172, helps stabilize the end effector assemblies 160, or pogo assemblies 162, and the main beam 135, and movement. The pair of load balancer devices 174 are configured to move in an up-and-down direction 184 (see FIGS. 2B, 5A) and in a back-and-forth direction 186 (see FIG. 5A), to orient the main beam 135, such as the strongback 136, to a desired orientation for insertion of the contoured composite structure 16, such as the stringer 24, into a trough 58, or cavity, on the mandrel 52.

FIGS. 2A-2C, 2E, 2F show one version of the load balancer assembly 170, such as a pulley assembly 172, where the pair of load balancer devices 174 are attached to the attachment members 158, such as the first bearing member 158a and the second bearing member 158b, at the notched portions 156 (see FIG. 2B) on the main beam 135, such as the strongback 136. In another version, as shown in FIGS. 5A-5D, and discussed in further detail below, the pair of load balancer devices 174 are attached to the attachment members 158, such as the first bearing member 158a and the second bearing member 158b, at the first end 142a and the second end 142b, respectively, of the main beam 135, such as the strongback 136.

As shown in FIG. 2A, the pick-and-place assembly 60 further comprises the control system 150 coupled to the pick-and-place assembly 60, to operably control the pick-and-place assembly 60, including during transfer and installation of the contoured composite structure 16, such as the high-contoured composite structure 18, for example, the stringer 24, onto the mandrel 52. The control system 150 may include one or more control cabinets 188 (see FIG. 2F) coupled to each side beam 122 of the main trolley 100 of the gantry assembly 70. Each control cabinet 188 may include one or more controllers 190 (see FIG. 2F), such as an electrical controller, a pneumatic controller, or another suitable controller, for operably controlling various components of the pick-and-place assembly 60. As shown in FIG. 2A, the control system 150 further comprises the human machine interface (HMI) device 148 coupled to the first end 142a of the main beam 135, such as the strongback 136, where an operator 147 (see FIG. 11A) interfaces with the control panel 152 of the HMI device 148. The control system 150 further comprises a control element 192 (see FIG. 15A), such as a control button 192a (see FIG. 15A), or validation button, coupled to a second portion 76b of the side support 74.

The control system 150 may further comprise one or more computers (not shown), such as a portable computer (PC), or a programmable logic controller (PLC), that controls operations of the pick-and-place system 10. In one version, the one or more computers use a control program which may include a software program, or an algorithm, that determines how the pick-and-place assembly 60 should progress and the sequential operation of the pick-and-place assembly 60. A set of operator input controls allows the operator 147 to input or change the control program, or other suitable data sets, with operator defined values.

FIGS. 2A-2F further show the tray station 34 comprising the tray assembly 36, such as in the form of the kitting tray 38, for example, a straight flat kitting tray 38a. FIGS. 2A-2C, 2E-2F further show the tray assembly 36, such as the kitting tray 38, positioned on a movable table 44, or cart, having wheels 45. As shown in FIGS. 2A-2F, the contoured composite structure 16, such as the high-contoured composite structure 18, for example, the stringer 24, is positioned or disposed, on a top side 37 (see FIG. 2A) of the tray assembly 36, such as the kitting tray 38. The top side 37 of the tray assembly 36, such as the kitting tray 38, preferably matches the final inside, or interior, surface shape of the contoured composite structure 16, such as the high-contoured composite structure 18, for example, the stringer 24.

FIG. 2F shows the mandrel 52 positioned under the main beam 135, such as the strongback 136, and positioned next to the tray assembly 36 on the movable table 44. FIG. 2F shows the tray assembly 36 at the tray station 34 and shows the mandrel 52 and the pick-and-place assembly 60 at the installation station 50. As shown in FIG. 2F, the mandrel 52 is positioned on top of the conveyor assembly 56 of the moving manufacturing line 54. As shown in FIG. 2F, the mandrel 52 has a plurality of troughs 58, or cavities, formed on the top surface 222 (see FIG. 5A) and along the length of the mandrel 52, and shaped to hold the contoured composite structure 16, for example, the high-contoured composite structure 18, when it is transferred from the tray assembly 36 to the mandrel 52. Each trough 58 is designed to hold a separate contoured composite structure 16, such as a stringer 24, transferred from the tray assembly 36, such as the kitting tray 38. Each trough 58 is designed to receive a cap portion 27 (see FIG. 2C), or hat-shaped section, of the composite structure 14, such as a stringer 24.

Now referring to FIG. 3, FIG. 3 is an illustration of a front perspective view of a version of a conveyor assembly 56 for a mandrel 52 (see FIG. 2F) of the pick-and-place system 10 (see FIG. 1) of the disclosure. As shown in FIG. 3, in one version, the conveyor assembly 56 comprises an engine 194, a mandrel push/pull system 195, a rolling chain 196, or belt, coupled to the engine 194, a support system 197 for the rolling chain 196, or belt, and support leveling devices 198. The mandrel 52 (see FIG. 2F) is attached to the conveyor assembly 56 (see FIGS. 1, 2F) and is designed to move along the moving manufacturing line 54 (see FIGS. 1, 2F) to and from the installation station 50 (see FIG. 2F).

Now referring to FIG. 4A, FIG. 4A is an illustration of a front perspective view of a version of a kitting tray 38, such as in the form of a straight flat kitting tray 38a. FIG. 4A shows the kitting tray 38, such as the straight flat kitting tray 38a, with a trough 200, such as a straight trough 201, formed in a top side 37 of the kitting tray 38 and through the center of the top side 37 of the kitting tray 38. The trough 200 has a curved or contoured interior bottom portion designed to receive a cap portion 27 (see FIG. 2C), or hat-shaped section, of the composite structure 14, such as a stringer 24. The kitting tray 38, such as the straight flat kitting tray 38a, has a straight profile 202 (see FIG. 4A) and a generally flat shape 204 (see FIG. 4A), with the exception of the trough 200. FIG. 4A further shows a support structure 206 holding, or securing, the kitting tray 38, such as the straight flat kitting tray 38a. The support structure 206 may comprise a metal plate or another suitable structure to protect the kitting tray 38 during transport.

Now referring to FIG. 4B, FIG. 4B is an illustration of a front perspective view of another version of the kitting tray 38, such as in the form of a high-contour kitting tray 38b. FIG. 4B shows the kitting tray 38, such as the high-contour kitting tray 38b, with a trough 200, such as a curved trough 208, formed in the top side 37 of the kitting tray 38 and through the center of the top side 37 of the kitting tray 38. The trough 208 has a curved or contoured interior bottom portion designed to receive the cap portion 27 (see FIG. 2C), or hat-shaped section, of the contoured composite structure 16, such as a stringer 24. The kitting tray 38, such as the high-contour kitting tray 38b, has a curved profile 210 (see FIG. 4B) and a curved shape 211 (see FIG. 4B). FIG. 4B further shows a raised support structure 212 holding, or securing, the kitting tray 38, such as the high-contour kitting tray 38b.

The tray assembly 36, such as the kitting tray 38, for example, the straight flat kitting tray 38a and the high-contour kitting tray 38b, may also include a vacuum system (not shown) within the tray assembly 36, such as the kitting tray 38. The vacuum system may comprise one or more of vacuum lines or vacuum tubes, a vacuum, a vacuum source, a vacuum power supply, and other suitable vacuum system components. In one version, the tray assembly 36, such as the kitting tray 38, for example, the straight flat kitting tray 38a and the high-contour kitting tray 38b, may have an integrated vacuum system with ports (not shown) on each side, and vacuum lines (not shown) are connected through a single port on one end. Tack ports may be placed along the length of the trough 200 (see FIGS. 4A, 4B) connected to a separate vacuum system to help hold the contoured composite structure 16, such as the high-contoured composite structure 18, for example, the stringer 24, on, and/or in, the tray assembly 36. The spacing on the ports is adjusted, as needed, depending on the shape of the contoured composite structure 16, such as the high-contoured composite structure 18, for example, the stringer 24.

Figure 5B:
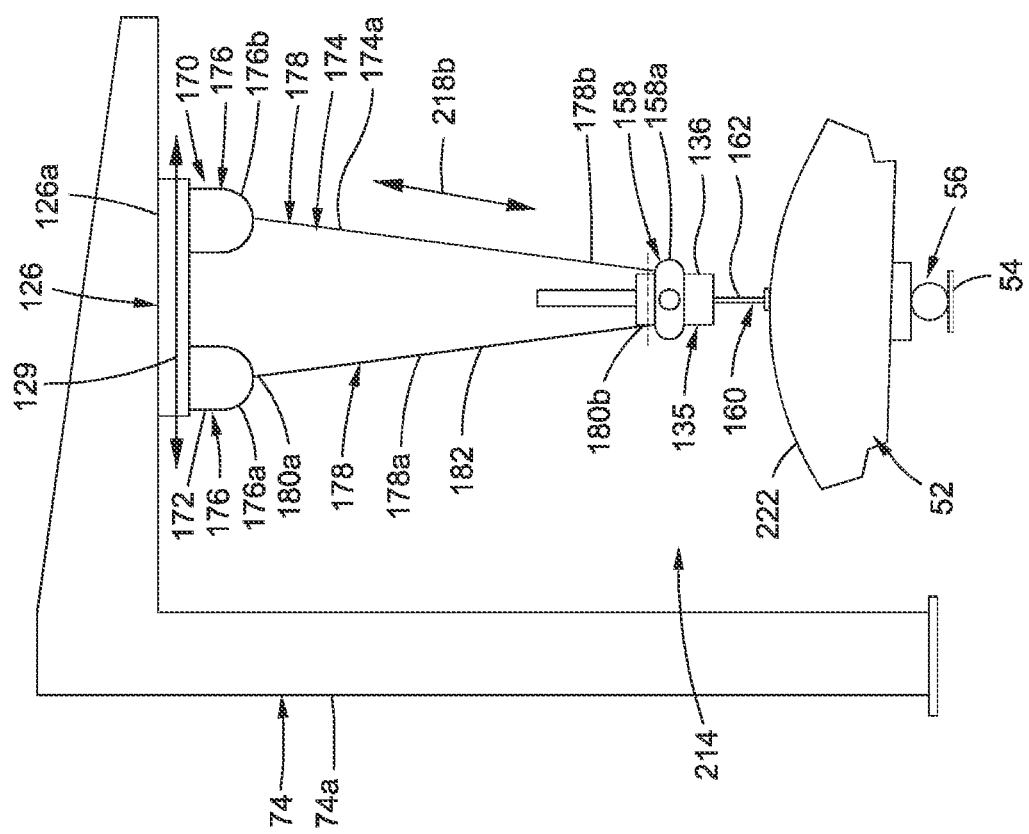
FIG. 5B is a schematic illustration of a left side view of the load balancer assembly, the main beam, and the mandrel of FIG. 5A, with the main beam in a first position.
Figure 5C:
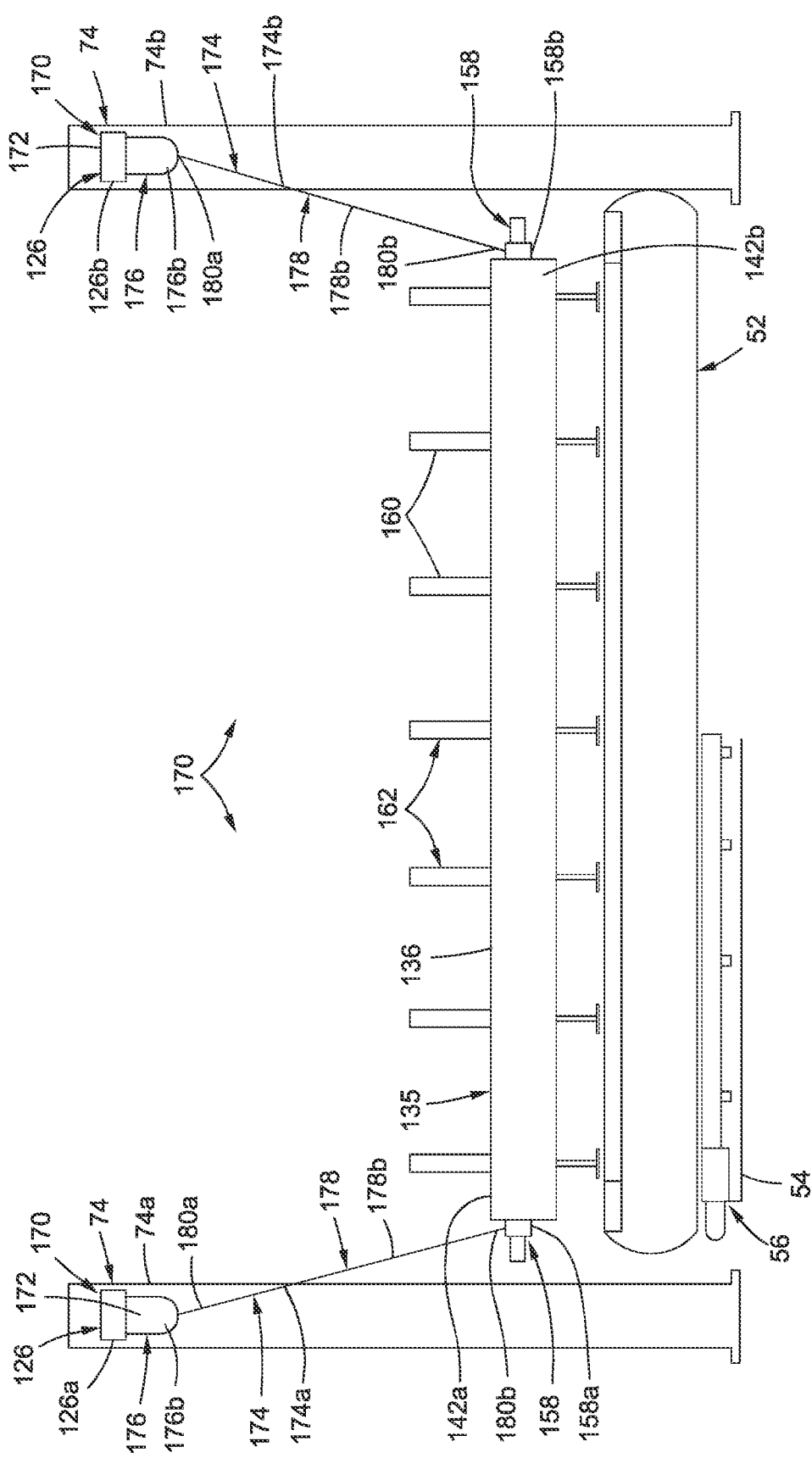
FIG. 5C is a schematic illustration of a front view of the load balancer assembly, the main beam, and the mandrel of FIG. 5A.
Figure 5D:
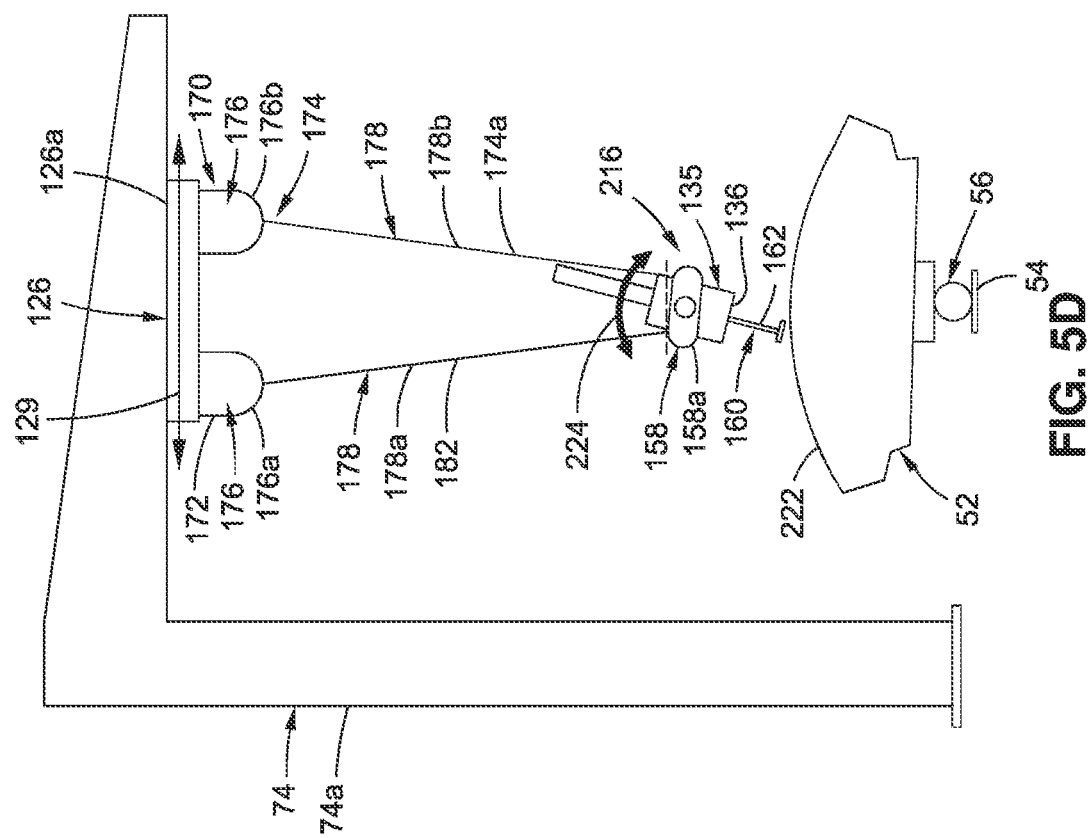
FIG. 5D is a schematic illustration of a left side view of the load balancer assembly, the main beam, and the mandrel of FIG. 5A, with the main beam in a second position.

Now referring to FIGS. 5A-5D, FIGS. 5A-5D show various views of a version of the load balancer assembly 170, such as the pulley assembly 172, attached to the main beam 135, such as the strongback 136, positioned above a mandrel 52 of a pick-and-place system 10 (see FIG. 1) of the disclosure. FIG. 5A is a schematic illustration of a front perspective view of a version of the load balancer assembly 170, such as the pulley assembly 172, the main beam 135, such as the strongback 136, and the mandrel 52 of the pick-and-place system 10 (see FIG. 1) of the disclosure. FIG. 5B is a schematic illustration of a left side view of the load balancer assembly 170, such as the pulley assembly 172, the main beam 135, such as the strongback 136, and the mandrel 52, of FIG. 5A, with the main beam 135, such as the strongback 136, in a first position 214. FIG. 5C is a schematic illustration of a front view of the load balancer assembly 170, such as the pulley assembly 172, the main beam 135, such as the strongback 136, and the mandrel 52, of FIG. 5A. FIG. 5D is a schematic illustration of a left side view of the load balancer assembly 170, such as the pulley assembly 172, the main beam 135, such as the strongback 136, and the mandrel 52, of FIG. 5A, with the main beam 135 in a second position 216.

FIGS. 5A-5D show the load balancer assembly 170, such as the pulley assembly 172, coupling the main beam 135, such as the strongback 136, to the pair of side supports 74, such as the first side support 74a and the second side support 74b, of the gantry assembly 70 (see FIGS. 2A-2F). As shown in FIGS. 5A-5D, the load balancer assembly 170, such as the pulley assembly 172, comprises the pair of load balancer devices 174, such as the first load balancer device 174a and the second load balancer device 174b. As shown in FIGS. 5A-5D, each load balancer device 174 comprises the pair of pulleys 176, or spools, or yo-yos, coupled to the side trolley 126, such as the first side trolley 126a and the second side trolley 126b. As shown in FIGS. 5A-5D, each load balancer device 174 further comprises the pair of cables 178, such as the first cable 178a and the second cable 178b. Each cable 178 has a first end 180a (see FIGS. 5A-5C) coupled to one pulley 176, and each cable 178 has a second end 180b (see FIGS. 5A-5C) coupled to the attachment member 158, such as the first bearing member 158a or the second bearing member 158b.

As shown in FIGS. 5A, 5B, 5D, the pair of pulleys 176 are oriented on each side trolley 126, so that the pair of cables 178 for each load balancer device 174 defines the trapezoidal configuration 182, when coupled to the attachment member 158, to minimize unwanted motion of the mandrel 52 and of the main beam 135, while still allowing the mandrel 52 and/or the main beam 135, to be rotated to a desired position and to be aligned for installation of the contoured composite structure 16 (see FIG. 2A), or stringer 24 (see FIG. 2A), onto the mandrel 52.

As discussed above, and as shown in FIGS. 5A-5D, the pair of pulleys 176, or spools, or yo-yos, are coupled to each of the side trolleys 126, and the pair of pulleys 176, or spools, or yo-yos, on each side trolley 126 are synchronized to one another, so as to supply the same amount of cable 178 from each of the pair of pulleys 176, or spools. For example, in FIG. 5A, the first cable 178a of the first load balancer device 174a extends and retracts in an up-and-down direction 218a, and the second cable 178b of the first load balancer device 174a extends and retracts in an up-and-down direction 218b, and the first cable 178a and the second cable 178b of the first load balancer device 174a extend and retract at a same rate. Further, in FIG. 5A, the first cable 178a of the second load balancer device 174b extends and retracts in an up-and-down direction 220a, and the second cable 178b of the second load balancer device 174b extends and retracts in an up-and-down direction 220b, and the first cable 178a and the second cable 178b of the second load balancer device 174b extend and retract at a same rate. However, the first cable 178a and the second cable 178b of the first load balancer device 174a work independently from the first cable 178a and the second cable 178b of the second load balancer device 174b. That is, the pair of pulleys 176, or spools, or yo-yos, on different side trolleys 126 are not synchronized. The pair of pulleys 176, or spools, or yo-yos, on one side trolley 126 are independent from the pair of pulleys 176, or spools, or yo-yos, on the other side trolley 126.

As shown in FIG. 5A, the pair of load balancer devices 174, such as the first load balancer device 174a and the second load balancer device 174b, are each configured to move in an up-and-down direction 184 and in a back-and-forth direction 186. Each of the first end 142a (see FIGS. 5A, 5C) and the second end 142b (see FIGS. 5A, 5C) of the main beam 135 (see FIGS. 5A-5D), such as the strongback 136 (see FIGS. 5A-5D), has independent control for alignment of the contoured composite structure 16 (see FIG. 2A), such as the stringer 24 (see FIG. 2A), to the mandrel 52 (see FIGS. 5A-5D). As further shown in FIGS. 5A, 5B, 5D, each side trolley 126 moves back and forth in a back-and-forth direction 129.

In this version, as shown in FIGS. 5A, 5C, the pair of load balancer devices 174 are attached to the attachment members 158 at each of the first end 142a and the second end 142b of the main beam 135, such as the strongback 136. In particular, as shown in FIGS. 5A, 5C, the first load balancer device 174a is attached to the first bearing member 158a at the first end 142a of the main beam 135, such as the strongback 136, and the second load balancer device 174b is attached to the second bearing member 158b at the second end 142b of the main beam 135, such as the strongback 136.

FIGS. 5A-5D further show the main beam 135, such as the strongback 136, with the end effector assemblies 160, such as the pogo assemblies 162, configured for attachment to the contoured composite structure 16 (see FIG. 2A), for transfer and installation of the contoured composite structure 16 from the tray assembly 36 to the mandrel 52. The pair of load balancer devices 174 of the load balancer assembly 170, or pulley assembly 172, help stabilize the end effector assemblies 160, such as the pogo assemblies 162, and the main beam 135, such as the strongback 136, and their movement. As shown in FIG. 5B, the main beam 135, such as the strongback 136, is held by the load balancer assembly 170 in a first position 214, where the end effector assemblies 160, such as the pogo assemblies 162, are directly in contact with a top surface 222 of the mandrel 52. As shown in FIG. 5D, the main beam 135, such as the strongback 136, is rotated in a rotation direction 224 by the load balancer assembly 170, and the main beam 135, such as the strongback 136 is rotated to a second position 216, where the end effector assemblies 160, such as the pogo assemblies 162, are tilted at an angle with respect to the top surface 222 of the mandrel 52. To aid in the installation of the contoured composite structure 16, such as the stringer 24, the main beam 135, such as the strongback 136, is configured to rotate, and rotates, to the angle that best helps with installing the contoured composite structure 16, such as the stringer 24, onto, and into, the troughs 58 (see FIG. 5A) of the mandrel 52.

FIGS. 5A-5D further show the mandrel 52 positioned under the main beam 135, such as the strongback 136. As shown in FIGS. 5A-5D, the mandrel 52 is positioned on top of the conveyor assembly 56 of the moving manufacturing line 54. As shown in FIG. 5A, the top surface 222 of the mandrel 52 has a plurality of troughs 58, or cavities, formed along the length of the mandrel 52 and shaped to hold the contoured composite structure 16 (see FIG. 2A), for example, the high-contoured composite structure 18 (see FIG. 2A), when it is transferred from the tray assembly 36 (see FIG. 2A) to the mandrel 52. Each trough 58 is designed to hold a separate contoured composite structure 16, such as a stringer 24, transferred from the tray assembly 36, such as the kitting tray 38.

Now referring to FIG. 6A, FIG. 6A is a schematic illustration of a front view of a version of the pick-and-place assembly 60 showing various dimensions. FIG. 6A shows the load balancer assembly 170, such as the pulley assembly 172, coupling the first end 142a and the second end 142b of the main beam 135, such as the strongback 136, to the pair of side supports 74, such as the first side support 74a and the second side support 74b, respectively. FIG. 6A further shows the spaced configuration 164 between adjacent end effector assemblies 160, such as adjacent pogo assemblies 162.

FIG. 6A further shows a length 225 between an outer side 226a of the first side support 74a and an outer side 226b of the second side support 74b. In one exemplary version, the length 225 is 20.4 meters (67 feet). However, the length 225 may be another suitable length. FIG. 6A further shows a length 227 spanning the main beam 135, such as the strongback 136, between the first bearing member 158a attached at the first end 142a of the main beam 135 and the second bearing member 158b attached at the second end 142b of the main beam 135. In one exemplary version, the length 227 is 15 meters (49 feet). However, the length 227 may be another suitable length. FIG. 6A further shows a height 228 of the side supports 74. In one exemplary version, the height 228 is 6.4 meters (21 feet). However, the height 228 may be another suitable length.

Now referring to FIG. 6B, FIG. 6B is a schematic illustration of a front view of end effector assemblies 160, such as pogo assemblies 162, attached to the main beam 135, such as the strongback 136, of FIG. 6A, showing a gap 230 between adjacent end effector assemblies 160, such as adjacent pogo assemblies 162. As shown in FIG. 6B, each gap 230 has a gap distance 232. The gap distance 232 between each of two adjacent end effector assemblies 160, or pogo assemblies 162, is preferably an equal distance. In one exemplary version, the gap distance 232 is 1.8 meters (6 feet) between each of two adjacent end effector assemblies 160, or pogo assemblies 162. However, the gap distance 232 may be another suitable gap distance.

Now referring to FIG. 7A, FIG. 7A is an illustration of front perspective view of a version of the main beam 135 with a plurality of end effector assemblies 160 and a pair of indexing assemblies 154 of the pick-and-place assembly 60 (see FIGS. 2A-2F) of the disclosure. FIG. 7A shows the main beam 135, such as the strongback 136, with the end effector assemblies 160, such as the pogo assemblies 162, attached to the front side 166 of the main beam 135, such as the strongback 136. FIG. 7A further shows the pair of indexing assemblies 154, such as the first indexing assembly 154a attached at the first end 142a of the main beam 135, such as the strongback 136, and the second indexing assembly 154b attached at the second end 142b of the main beam 135, such as the strongback 136. Each indexing assembly 154 has a pair of suction cups 235 (see FIG. 7A). FIG. 7A further shows the attachment members 158, such as the first bearing member 158a and the second bearing member 158b, attached at the notched portions 156 of the main beam 135, such as the strongback 136, and attached to the pair of cables 178. FIG. 7A further shows the handles 146 attached at the first end 142a and the second end 142b, respectively, of the main beam 135, such as the strongback 136. FIG. 7A further shows the human machine interface (HMI) device 148 attached at the first end 142a of the main beam 135, such as the strongback 136.

Now referring to FIG. 7B, FIG. 7B is an illustration of an enlarged view of the attachment member 158, such as the first bearing member 158a, of the circle 7B, of FIG. 7A. In this version, the attachment member 158, such as the first bearing member 158a, is attached at the notched portion 156 of the main beam 135, such as the strongback 136. In this version, the attachment member 158, such as the first bearing member 158a, is attached to a rotating mechanism 234 (see FIG. 7B) that allows the attachment member 158, such as the first bearing member 158a, to rotate. This, in turn, allows rotation of the load balancer devices 174 (see FIG. 2B), such as the first load balancer device 174a (see FIG. 2B) and the second load balancer device 174b (see FIG. 2B), attached to the first bearing member 158a and the second bearing member 158b, respectively. Alternatively, in another version, shown in FIG. 5A, the attachment members 158, such as the first bearing member 158a and the second bearing member 158b, are attached at the first end 142a and the second end 142b, respectively, of the main beam 135, such as the strongback 136, instead of attached at the notched portions 156 of the main beam 135. FIG. 7B further shows end effector assemblies 160, such as pogo assemblies 162 attached to the main beam 135.

Now referring to FIG. 7C, FIG. 7C is an illustration of an enlarged side view of an indexing assembly 154, such as the second indexing assembly 154b, of the circle 7C, of FIG. 7A. As shown in FIG. 7C, the indexing assembly 154, such as the second indexing assembly 154b, is coupled, or attached, to the second end 142b of the main beam 135, such as the strongback 136.

As shown in FIGS. 7A, 7C, each indexing assembly 154 comprises a pair of suction cups 235 designed to contact the tray assembly 36 (see FIG. 2A) during indexing and transfer of the contoured composite structure 16 (see FIG. 2A), such as the stringer 24 (see FIG. 2A), and designed to contact the mandrel 52 (see FIG. 2F) during indexing and installation of the contoured composite structure 16, such as the stringer 24, onto, and into, the mandrel 52. As shown in FIG. 7C, each indexing assembly 154 further comprises an indexing linear actuator 236, such as in the form of a pogo pin 236a. The indexing linear actuator 236, such as the pogo pin 236a, is designed for insertion into a cup-and-cone element 237 (see FIG. 11B) coupled to the indexing linear actuator 236, and is designed for insertion into the trough 200 (see FIGS. 4A-4B) of the tray assembly 36, such as the kitting tray 38, during indexing and transfer of the contoured composite structure 16 (see FIG. 2A), such as the stringer 24 (see FIG.

2A). Further, the indexing linear actuator 236, such as the pogo pin 236a, is designed for insertion into the cup-and-cone element (see FIG. 16B), and is designed for insertion into each trough 58 (see FIGS. 2F, 5A) of the mandrel 52 during indexing and installation of the contoured composite structure 16, such as the stringer 24, onto, and into, the mandrel 52.

As shown in FIG. 7C, the indexing linear actuator 236, such as the pogo pin 236a, is substantially housed within a housing 238. As further shown in FIG. 7C, the indexing linear actuator 236, such as the pogo pin 236a, is actuated, or driven, with a drive mechanism 240, such as an electric motor 240a, for example, a fine X adjustment motor, coupled to the indexing linear actuator 236, such as the pogo pin 236a. Alternatively, the drive mechanism 240 may comprise a pneumatic drive mechanism, a hydraulic drive mechanism, or another suitable drive mechanism. The drive mechanism 240, such as the electric motor 240a, for example, the fine X adjustment motor, moves the main beam 135, such as the strongback 136, into the proper position and orientation during transfer and installation of the contoured composite structure 16 (see FIG. 2A), such as the stringer 24 (see FIG. 2A). FIG. 7C further shows the handle 146.

The pair of indexing assemblies 154 act, or function, as locating features, to allow the main beam 135, such as the strongback 136, to push the contoured composite structure 16, such as the stringer 24, into place on the mandrel 52, without lifting off of the mandrel 52. The main beam 135, such as the strongback 136, is rough indexed to the mandrel 52 by using the suction cups 235 (see FIGS. 7A, 7C) and the indexing linear actuator 236, or pogo pin 236a, that function as a cup-and-cone style locating feature. The main beam 135, such as the strongback 136, fine indexes itself to the mandrel 52 using the drive mechanism 240, such as the electric motor 240a, for example, the fine X adjustment motor, of the one or more indexing assemblies 154.

The relationship or contact between the main beam 135, such as the strongback 136, and the contoured composite structure 16, such as the stringer 24, is established through the tray assembly 36, such as the kitting tray 38. The index between the main beam 135, such as the strongback 136, and the tray assembly 36, such as the kitting tray 38, uses the same positions as the index between the main beam 135, such as the strongback 136, and the mandrel 52.

Figure 8A:
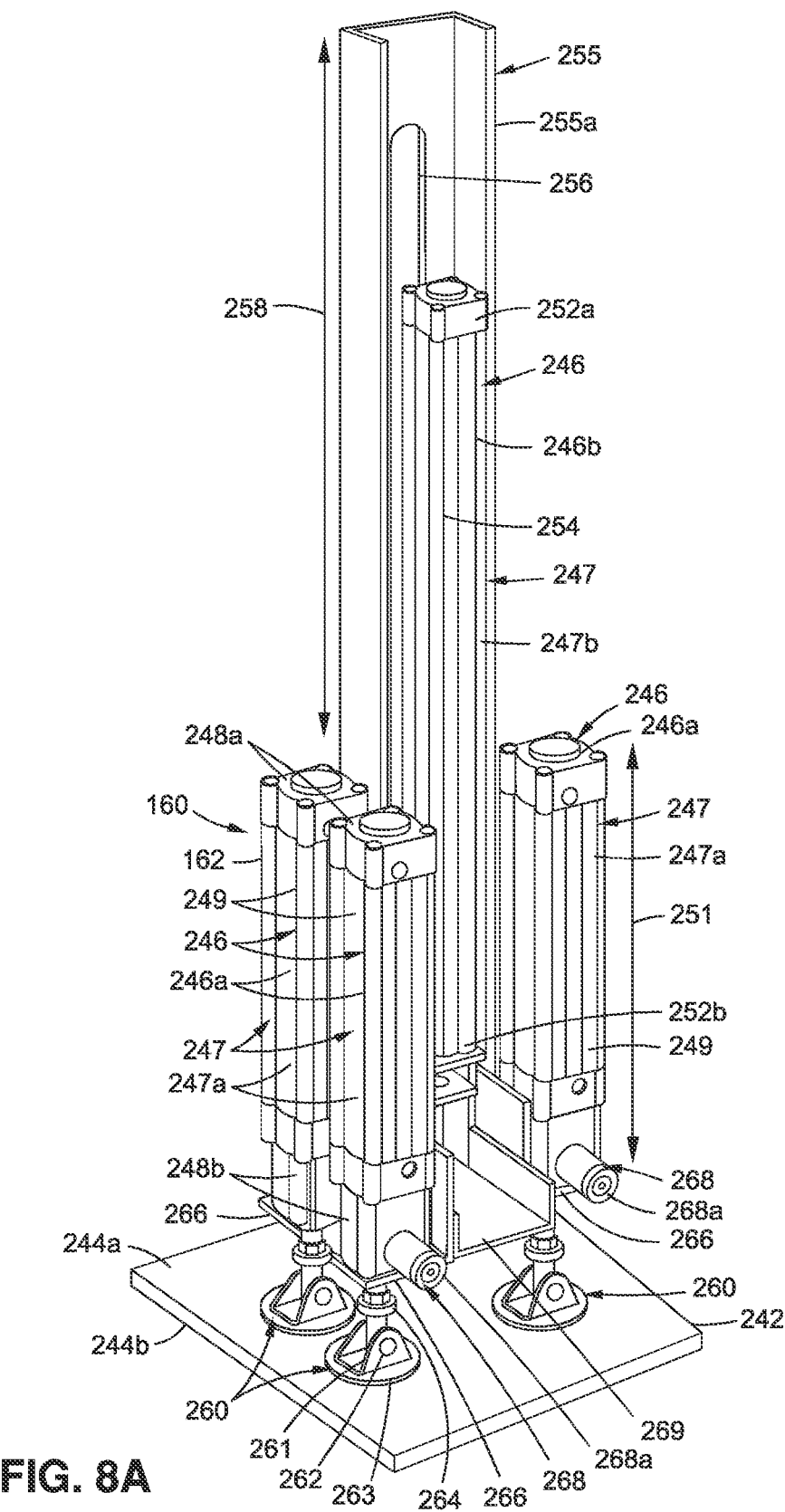
FIG. 8A is an illustration of a front perspective view of a version of an end effector assembly of a pick-and-place assembly of the disclosure.
Figure 8B:
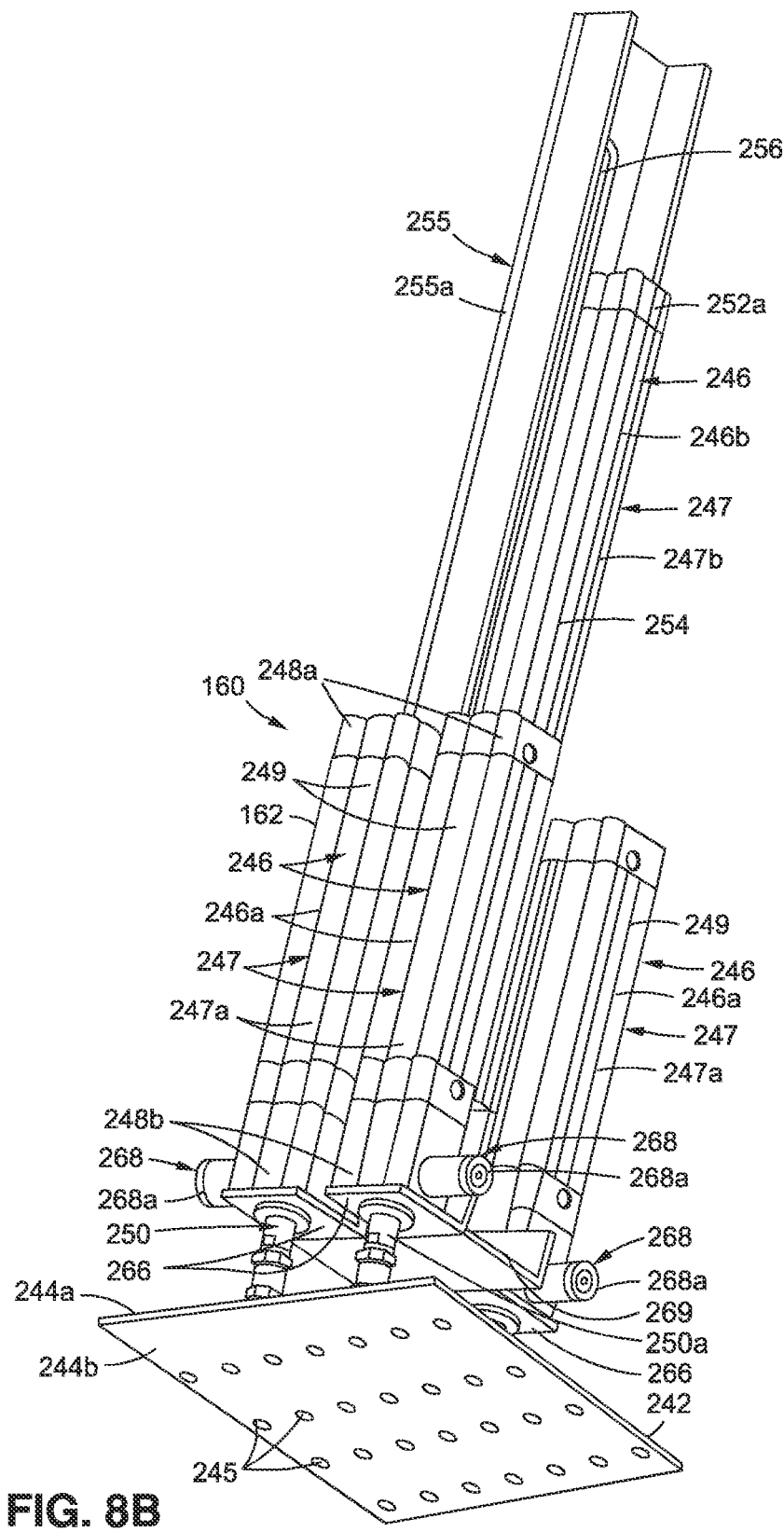
FIG. 8B is an illustration of a bottom perspective view of the end effector assembly of FIG. 8A.

Now referring to FIGS. 8A-8B, FIG. 8A is an illustration of a front perspective view of a version of an end effector assembly 160, such as a pogo assembly 162, of a pick-and-place assembly 60 (see FIG. 2A) of the disclosure. FIG. 8B is an illustration of a bottom perspective view of the end effector assembly 160, such as the pogo assembly 162, of FIG. 8A.

As shown in FIGS. 8A-8B, the end effector assembly 160, such as the pogo assembly 162, comprises a vacuum plate 242 having a top side 244a and a bottom side 244b. As shown in FIG. 8B, the bottom side 244b has a plurality of vacuum cups 245 spaced apart on the bottom side 244b of the vacuum plate 242. The vacuum plates 242 of the end effector assemblies 160, such as the pogo assemblies 162, are designed to contact and secure the contoured composite structure 16 (see FIG. 2A), such as the stringer 24 (see FIG. 2A), to the end effector assemblies 160, such as the pogo assemblies 162, during transfer and installation of the contoured composite structure 16, such as the stringer 24, with use of the vacuum system 168 (see FIG. 14).

As shown in FIGS. 8A-8B, the end effector assembly 160, such as the pogo assembly 162, further comprises a plurality of linear actuators 246, such as in the form of pneumatic cylinders 247. The plurality of linear actuators 246 may also be referred to as pogos. As shown in FIGS. 8A-8B, the plurality of linear actuators 246, include three first linear actuators 246a, such as three first pneumatic cylinders 247a, and include one second linear actuator 246b, such as one second pneumatic cylinder 247b. However, the plurality of linear actuators 246 may comprise another suitable amount of first linear actuators and second linear actuators.

As shown in FIGS. 8A-8B, the 3 first linear actuators 246a are short and are preferably of an equal length. However, the first linear actuators 246a may also be of different lengths. As shown in FIGS. 8A-8B, the second linear actuator 246b is tall and has a greater length, e.g., approximately twice the length, than the length of each of the three first linear actuators 246a. However, the length of the second linear actuator 246b may have a greater length in another suitable amount, as compared to the first linear actuator 246a. As shown in FIGS. 8A-8B, each first linear actuator 246a has a first end 248a, a second end 248b, a housing 249, and an actuating element 250 (see also FIG. 13B), such as a piston rod 250a (see also FIG. 13B) partially housed within the housing 249, and extending from the second end 248b, and designed to extend further downwardly from the second end 248b, when the end effector assemblies 160 copy a geometry 300 (see FIG. 13A) of a top surface 19 (see FIG. 13A) of the contoured composite structure 16 (see FIG. 13A), such as the high-contoured composite structure 18 (see FIG. 13A), for example, the stringer 24 (see FIG. 13A), as discussed in further detail below. The actuating element 250 (see FIG. 8B), such as the piston rod 250a (see FIG. 8B), of each first linear actuator 246a, is designed to move in and up-and-down direction 251 (see FIG. 8A).

As shown in FIGS. 8A-8B, the second linear actuator 246b has a first end 252a, a second end 252b (see FIG. 8A), a housing 254, and an actuating element 255, such as a slotted actuating element 255a, having an elongated slot 256, coupled to the second linear actuator 246b. The actuating element 255, such as the slotted actuating element 255a, coupled to the second linear actuator 246b, is designed to move in and up-and-down direction 258 (see FIG. 8A).

As shown in FIGS. 8A-8B, the plurality of linear actuators 246 are in the form of pneumatic cylinders 247. However, the plurality of linear actuators 246 may comprise hydraulic cylinders, or another suitable type of cylinder. Each end effector assembly 160, or pogo assembly 162, has individual controls (not shown) for activation of the linear actuators 246, such as the pneumatic cylinders 247.

As shown in FIG. 8A, each first linear actuator 246a is coupled to the top side 244a of the vacuum plate 242, via a swivel device 260, and in particular, the actuating element 250 of each first linear actuator 246a is coupled to the top side 244a of the vacuum plate 242, via the swivel device 260. As shown in FIG. 8A, each swivel device 260 comprises a swivel element 261, a pin element 262 coupled to the swivel element 261, a mounting element 263 mounted, or attached, to the top side 244a of the vacuum plate 242, and a connector portion 264 coupling the swivel element 261 to the actuating element 250. As shown in FIGS. 8A-8B, the second end 248b of each first linear actuator 246a is attached to a bracket 266. The swivel device 260 may be made of a metal material, such as steel, stainless steel, carbon steel, an industrial plastic, or another suitable material. FIG. 8A shows three swivel devices 260. Preferably, the number of swivel devices 260 correspond to the number of first linear actuators 246a. The swivel devices 260 enable the end effector assembly 160, or pogo assembly 162, to rock back and forth, and pivot, which gives the end effector assembly 160, or pogo assembly 162, greater flexibility.

As shown in FIGS. 8A-8B, the end effector assembly 160, such as the pogo assembly 162, further comprises a stop device 268 attached at the second end 248b of each first linear actuator 246a. FIG. 8B shows three stop devices 268. Preferably, the number of stop devices 268 correspond to the number of first linear actuators 246a. Each stop device 268 is designed to limit the distance the first linear actuator 246a and the actuating element 250, such as the piston rod 250a, can move, and the stop device 268 functions as an alignment device. The stop device 268 may comprise a piston rod lock 268a (see FIGS. 8A-8B) engaged to the first linear actuators 246a, to hold the position of the vacuum plate 242.

As shown in FIGS. 8A-8B, the end effector assembly 160, such as the pogo assembly 162, further comprises a main support structure 269 attached to the brackets 266, which are attached to the 3 first linear actuators 246a. The main support structure 269 (see FIGS. 8A-8B) is also attached to the second linear actuator 246b.

Preferably, each end effector assembly 160 maintains a vacuum force using the vacuum system 168 (see FIG. 14) during the entire process of transfer and installation onto and into the mandrel 52. Each end effector assembly 160 has a sufficient stroke in a z-axis direction, to accommodate any localized twist or pitch of the contoured composite structure 16, or stringer 24, during transfer and installation.

Figure 9:
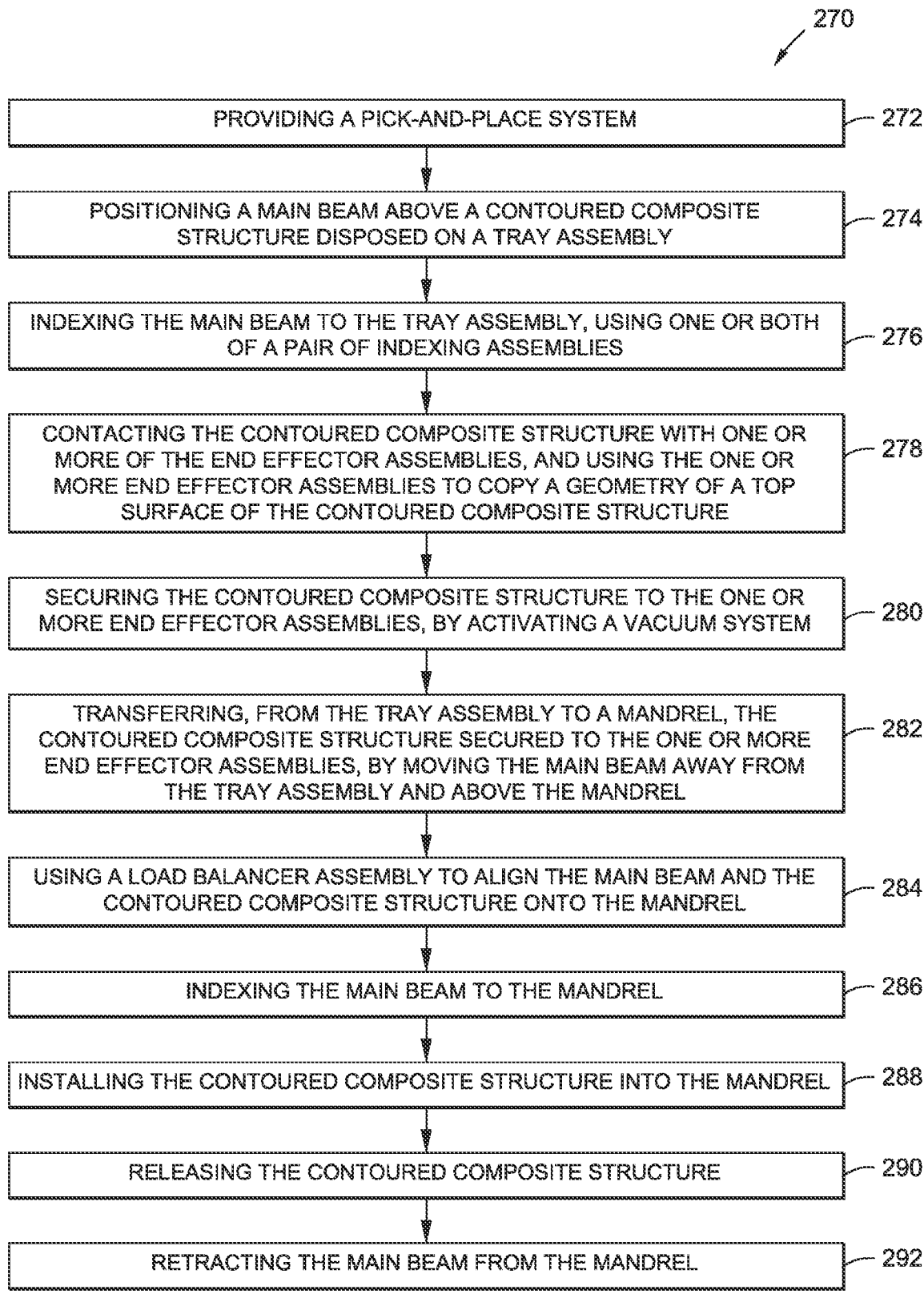
FIG. 9 is an illustration of a flow diagram of a version of a method of the disclosure.

Now referring to FIG. 9, FIG. 9 is an illustration of a flow diagram of a version of a method 270 of the disclosure. As shown in FIG. 9, there is provided a method 270 for transferring and installing a contoured composite structure 16 (see FIG. 1, 2A), such as a high-contoured composite structure 18 (see FIGS. 1, 2A), for example, a stringer 24 (see FIGS. 1, 2A), onto a mandrel 52 (see FIGS. 1, 2A), in a manufacturing system 12 (see FIG. 1), such as a composite manufacturing system 12a (see FIG. 1). The method 270 may be a semi-automated method or a fully automated method.

The blocks in FIG. 9 represent operations and/or portions thereof, or elements, and lines connecting the various blocks do not imply any particular order or dependency of the operations or portions thereof, or elements. FIG. 9 and the disclosure of the steps of the method 270 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 9, the method 270 comprises the step of providing 272 a pick-and-place system 10 (see FIG. 1), as discussed in detail above. The pick-and-place system 10 comprises a tray station 34 (see FIGS. 1, 2F) having a tray assembly 36 (see FIG. 2F), comprising one of, a kitting tray 38 (see FIG. 1), a tooling device 40 (see FIG. 1), a tray mandrel 42 (see FIG. 1), or another suitable tray assembly. The contoured composite structure 16, such as the high-contoured composite structure 18, for example, the stringer 24, is disposed on a top side 37 (see FIGS. 2A, 10) of the tray assembly 36, such as the kitting tray 38.

The pick-and-place system 10 further comprises an installation station 50 (see FIGS. 1, 2A) comprising the mandrel 52 moving along a moving manufacturing line 54 (see FIGS. 1, 2F, 5A), via a conveyor assembly 56 (see FIG. 1, 2F, 5A. The installation station 50 further comprises a pick-and-place assembly 60 (see FIGS. 1, 2A-2F), as discussed in detail above.

The pick-and-place assembly 60 comprises a gantry assembly 70 (see FIGS. 2A-2F). The gantry assembly 70 comprises an overhead gantry 72 (see FIGS. 2A-2F) coupled, or attached, to a pair of side supports 74 (see FIG. 2A), including a first side support 74a (see FIG. 2A) and a second side support 74b (see FIG. 2A). The gantry assembly 70 further comprises a main trolley 100 (see FIGS. 2A-2F), or movable carriage, movably coupled to, and positioned under, the overhead gantry 72. The main trolley 100 is moved, or driven, back and forth with an x-axis motion system 116 (see FIGS. 2B, 2C, 2D, 2E) coupled to the overhead gantry 72. The main trolley 100 further comprises a pair of side beams 122 (see FIGS. 2A, 2E, 2F), each having a side track 124 (see FIGS. 2E, 2F) formed along a length 125 (see FIG. 2D) of the side beam 122. The gantry assembly 70 further comprises a pair of side trolleys 126 (see FIGS. 2A-2F), or movable carriages, coupled to the pair of side beams 122, respectively, of the main trolley 100. Each side trolley 126 is designed to ride within the side track 124 formed along the side beam 122 of the main trolley 100. Each side trolley 126 is moved, or driven, back and forth with a y-axis motion system 130 (see FIGS. 2A-2D) coupled to each side beam 122 of the main trolley 100.

The pick-and-place assembly 60 further comprises the main beam 135 (see FIGS. 2A-2F), such as the strongback 136 (see FIGS. 2A-2F), suspended from the gantry assembly 70. The main beam 135, such as the strongback 136, has a plurality of end effector assemblies 160 (see FIGS. 2A-2F), such as pogo assemblies 162 (see FIGS. 2A-2F), coupled to the main beam 135, such as the strongback 136, and has a pair of indexing assemblies 154 (see FIGS. 2A, 2F), such as a first indexing assembly 154a (see FIG. 2B) and a second indexing assembly 154b (see FIG. 2B), coupled to the main beam 135, such as the strongback 136. The pick-and-place assembly 60 further comprises a vacuum system 168 (see FIG. 14) coupled to the main beam 135, such as the strongback 136, and coupled to the plurality of end effector assemblies 160.

The pick-and-place assembly 60 further comprises a load balancer assembly 170 (see FIGS. 2A, 5A), such as the pulley assembly 172 (see FIG. 2A), discussed in detail above, coupling the main beam 135, such as the strongback 136, to the pair of side trolleys 126 of the gantry assembly 70. As shown in FIG. 2B, the load balancer assembly 170, such as the pulley assembly 172, comprises a pair of load balancer devices 174, such as a first load balancer device 174a and a second load balancer device 174b, coupling the main beam 135, such as the strongback 136, to the pair of side trolleys 126 of the gantry assembly 70. As shown in FIG. 2C, the load balancer device 174, such as the first load balancer device 174a, comprises a pair of pulleys 176, or spools, or yo-yos, coupled to one of the pair of side trolleys 126. The pair of pulleys 176 include a first pulley 176a (see FIG. 5A) and a second pulley 176b (see FIG. 5A). Each load balancer device 174 further comprises a pair of cables 178 (see FIGS. 2C, 5A), or belts. Each load balancer device 174 has the pair of cables 178 movably coupled between the pair of pulleys 176 and the attachment member 158.

As shown in FIG. 2C, the pair of pulleys 176 is oriented on the side trolley 126, so that the pair of cables 178 for each load balancer device 174 defines a trapezoidal configuration 182, when coupled to the attachment members 158, such as the first bearing member 158a and the second bearing member 158b, to minimize unwanted motion of the mandrel 52 and of the main beam 135, while still allowing the mandrel 52 and/or the main beam 135, to be rotated to a desired position and to be aligned for installation of the contoured composite structure 16, or stringer 24, onto the mandrel 52. When coupled to the contoured composite structure 16, such as the stringer 24, the pair of cables 178 from the load balancer devices 174 define the trapezoidal configuration 182, to minimize, or prevent, unwanted motion such as swinging, rocking, and other unwanted motion of the contoured composite structure 16, such as the stringer 24. The pair of pulleys 176, or spools, or yo-yos, are coupled to each of the side trolleys 126, and the pair of pulleys 176, or spools, or yo-yos, on each side trolley 126 are synchronized to one another, so as to supply the same amount of cable 178 from each of the pair of pulleys 176, or spools. However, the pair of pulleys 176, or spools, or yo-yos, on different side trolleys 126 and side beams 122 are not synchronized. The pair of pulleys 176, or spools, or yo-yos, on one side trolley 126 and side beam 122 are independent from the pair of pulleys 176, or spools, or yo-yos, on the other side trolley 126 and side beam 122.

The pick-and-place assembly 60 further comprises a control system 150 (see FIGS. 1, 2A) coupled to the pick-and-place assembly 60, to operably control the pick-and-place assembly 60, including during transfer and installation of the contoured composite structure 16, such as the high-contoured composite structure 18, for example, the stringer 24, onto and into the mandrel 52. The control system 150 may include one or more control cabinets 188 (see FIG. 2F) coupled to each side beam 122 of the main trolley 100 of the gantry assembly 70. Each control cabinet 188 may include one or more controllers 190 (see FIG. 2F), such as an electrical controller, a pneumatic controller, or another suitable controller, for operably controlling various components of the pick-and-place assembly 60. As shown in FIG. 2A, the control system 150 further comprises the human machine interface (HMI) device 148 coupled to the main beam 135, such as the strongback 136, where an operator 147 (see FIG. 11A) interfaces with the control panel 152 of the HMI device 148. The control system 150 further comprises a control element 192 (see FIG. 15A), such as a control button 192a (see FIG. 15A), or validation button, coupled to a second portion 76b (see FIG. 15A) of the side support 74 (see FIG. 15A). The control system 150 may further comprise one or more computers (not shown), such as a portable computer (PC), or a programmable logic controller (PLC), that controls operations of the pick-and-place system 10. In one version, the one or more computers use a control program which may include a software program, or an algorithm, that determines how the pick-and-place assembly 60 should progress and the sequential operation of the pick-and-place assembly 60.

As shown in FIG. 9, the method 270 further comprises the step of positioning 274 the main beam 135, such as the strongback 136, above the contoured composite structure 16, such as the high-contoured composite structure 18, for example, the stringer 24, disposed on the top side 37 of the tray assembly 36, such as the kitting tray 38. The method 270 may further comprise, prior to the step of positioning 274 the main beam 135, such as the strongback 136, above the contoured composite structure 16, such as the high-contoured composite structure 18, for example, the stringer 24, disposed on the tray assembly 36, such as the kitting tray 38, the step of receiving the contoured composite structure 16, such as the high-contoured composite structure 18, for example, the stringer 24, from a forming apparatus 48 (see FIG. 1) at a forming station 46 (see FIG. 1), and placing the contoured composite structure 16, such as the high-contoured composite structure 18, for example, the stringer 24, on the top side 37 (see FIGS. 2A, 10) of the tray assembly 36, such as the kitting tray 38.

As shown in FIG. 9, the method 270 further comprises the step of indexing 276 the main beam 135, such as the strongback 136, to the tray assembly 36, such as the kitting tray 38, using one or both of the pair of indexing assemblies 154, such as the first indexing assembly 154a (see FIG. 2F) and the second indexing assembly 154b (see FIG. 2F), both coupled to the main beam 135, such as the strongback 136. The index between the main beam 135, such as the strongback 136, and the tray assembly 36, such as the kitting tray 38, uses the same positions as the index between the main beam 135, such as the strongback 136, and the mandrel 52.

The step of indexing 276 the main beam 135, such as the strongback 136, to the tray assembly 36, such as the kitting tray 38, using one or both of the pair of indexing assemblies 154, further comprises, indexing the main beam 135, such as the strongback 136, to the tray assembly 36, such as the kitting tray 38, using a cup-and-cone locating feature 294 (see FIG. 11B), discussed in further detail below with respect to FIG. 11B, of one or both of the indexing assemblies 154.

The method 270 may further comprise, after the step of indexing 276 the main beam 135, such as the strongback 136, to the tray assembly 36, such as the kitting tray 38, the step of determining which of the plurality of end effector assemblies 160, such as the pogo assemblies 162, are to be used to contact, secure, and transfer the contoured composite structure 16, such as the high-contoured composite structure 18, for example, the stringer 24, by using a radio-frequency identification (RFID) system 295 (see FIG. 12A) comprising a radio-frequency identification (RFID) reader 296 (see FIG. 12A) coupled to the main beam 135, such as the strongback 136, and a radio-frequency identification (RFID) tag 298 (see FIGS. 12A-12B) coupled to the tray assembly 36, such as the kitting tray 38. The RFID reader 296 is designed to read the RFID tag 298, to determine which, and how many, of the plurality of end effector assemblies 160, such as the pogo assemblies 162, are to be used to pick up the contoured composite structure 16, such as the high-contoured composite structure 18, for example, the stringer 24, from the tray assembly 36, such as the kitting tray 38. The pick-and-place assembly 60 gathers configuration information from the RFID tag 298 coupled, or connected, to the tray assembly 36, such as the kitting tray 38. The configuration information informs the pick-and-place assembly 60 which of the plurality of end effector assemblies 160, such as the pogo assemblies 162, and sensors are to be used to pick up a particular contoured composite structure 16, such as the high-contoured composite structure 18, for example, the stringer 24.

As shown in FIG. 9, the method 270 further comprises the step of contacting 278 the contoured composite structure 16, such as the high-contoured composite structure 18, for example, the stringer 24, with one or more of the plurality of end effector assemblies 160, such as the pogo assemblies 162, and using the one or more plurality of end effector assemblies 160, such as the pogo assemblies 162, to copy a geometry 300 (see FIGS. 1, 13A, 13B) of a top surface 19 (see FIGS. 1, 13A-13B) of the contoured composite structure 16, such as the high-contoured composite structure 18, for example, the stringer 24.

Figure 14:
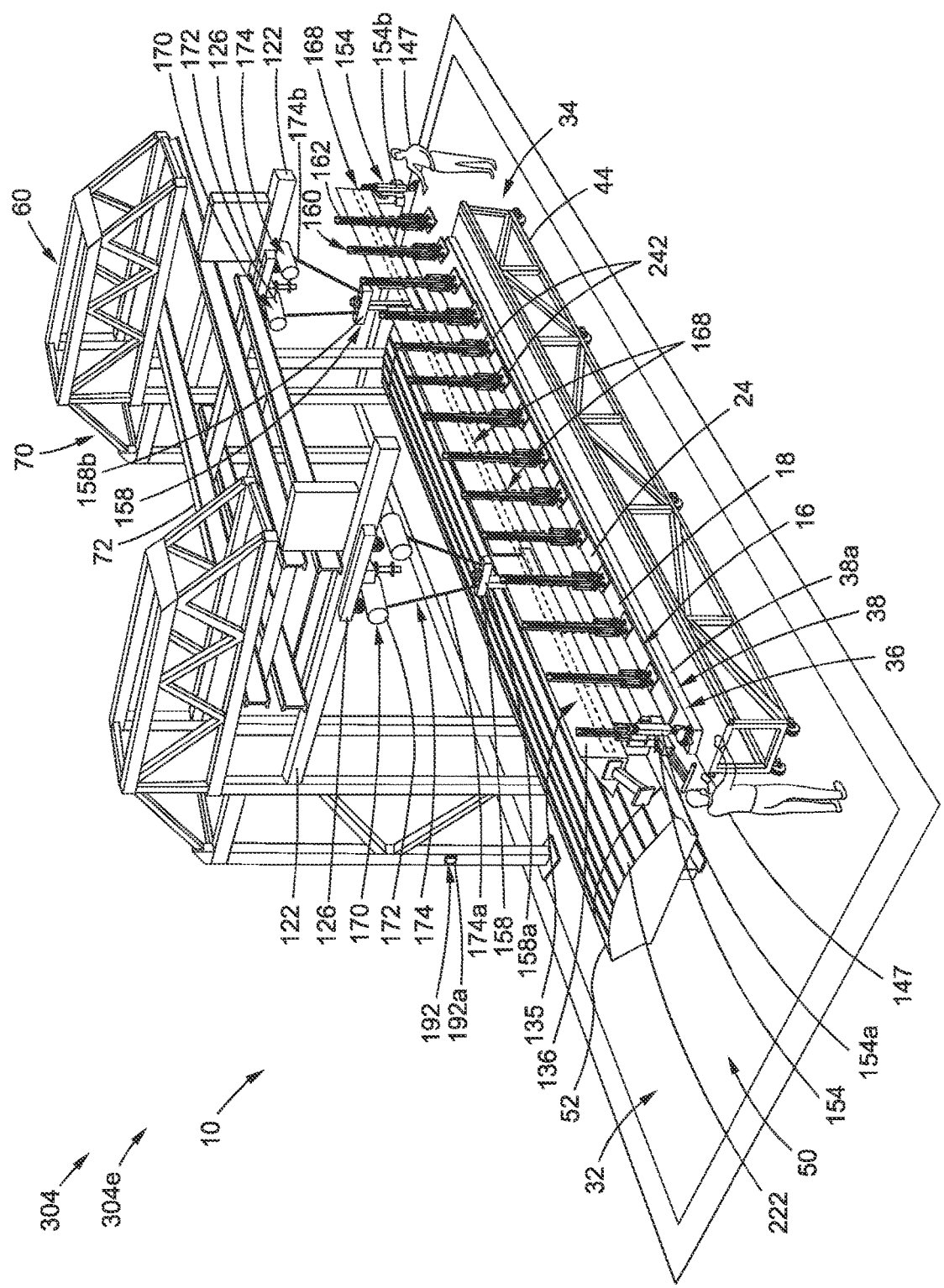
FIG. 14 is an illustration of a left front perspective view of a version of a pick-and-place system of the disclosure, showing a plurality of end effector assemblies using a vacuum system to pick up a contoured composite structure from a tray assembly.

As shown in FIG. 9, the method 270 further comprises the step of securing 280 the contoured composite structure 16, such as the high-contoured composite structure 18, for example, the stringer 24, to the one or more plurality of end effector assemblies 160, such as the pogo assemblies 162, by activating the vacuum system 168 (see FIG. 14).

As shown in FIG. 9, the method 270 further comprises the step of transferring 282, from the tray assembly 36, such as the kitting tray 38, to the mandrel 52, the contoured composite structure 16, such as the high-contoured composite structure 18, for example, the stringer 24, secured to the one or more plurality of end effector assemblies 160, such as the pogo assemblies 162, by moving the main beam 135, such as the strongback 136, away from the tray assembly 36, such as the kitting tray 38, and to above the mandrel 52.

As shown in FIG. 9, the method 270 further comprises the step of using 284 the load balancer assembly 170 (see FIGS. 2A, 5A) to align the main beam 135, such as the strongback 136, and the contoured composite structure 16, such as the high-contoured composite structure 18, for example, the stringer 24, onto and into the mandrel 52. The step of using 284 the load balancer assembly 170 to align the main beam 135, such as the strongback 136, and the contoured composite structure 16, such as the high-contoured composite structure 18, for example, the stringer 24, onto and into the mandrel 52, further comprises, using the load balancer assembly 170 comprising the pair of load balancer devices 174 (see FIGS. 2B, 5A) coupling the main beam 135, such as the strongback 136, to the pair of side trolleys 126 (see FIGS. 2B, 5A) of the gantry assembly 70. The pair of load balancer devices 174 comprising the first load balancer device 174a (see FIGS. 2B, 5A) and the second load balancer device 174b (see FIGS. 2B, 5A). Each of the first load balancer device 174a and the second load balancer device 174b comprises the pair of pulleys 176 (see FIGS. 2C, 5A) coupled to one of the pair of side trolleys 126 (see FIGS. 2C, 5A), the attachment member 158 (see FIGS. 2C, 5A) coupled to the main beam 135, such as the strongback 136, and the pair of cables 178 (see FIGS. 2C, 5A) movably coupled between the pair of pulleys 176 and the attachment member 158. The pair of cables 178 of the first load balancer device 174a work independently from the pair of cables 178 of the second load balancer device 174b. Moreover, for each of the first load balancer device 174a and the second load balancer device 174b, the pair of pulleys 176 is oriented on the side trolley 126, so that the pair of cables 178 defines a trapezoidal configuration 182 (see FIG. 5A), when coupled to the attachment member 158, to minimize unwanted motion of the mandrel 52, such as unwanted rocking or swaying.

As shown in FIG. 9, the method 270 further comprises the step of indexing 286 the main beam 135, such as the strongback 136, to the mandrel 52, using one or both of the pair of indexing assemblies 154. The step of indexing 286 the main beam 135, such as the strongback 136, to the mandrel 52, using one or both of the pair of indexing assemblies 154, further comprises, rough indexing the main beam 135, such as the strongback 136, to the mandrel 52 using the cup-and-cone locating feature 294 (see FIG. 16B) of one or both of the indexing assemblies 154, and fine indexing the main beam 135, such as the strongback 136, to the mandrel 52 using a camera system 302 (see FIG. 16A), such as a closed-circuit television camera (CCTV) system 302a (see FIG. 16A), to allow an operator 147 to view a location of one or more scribe lines on the mandrel 52, to determine a distance to move the contoured composite structure 16, such as the high-contoured composite structure 18, for example, the stringer 24, so that a placement tolerance is achieved. As used herein, a "scribe line" means a line or groove that is physically scribed into a surface of a mandrel or tool. Scribe lines may be placed around the full periphery of the contoured composite structure 16, such as the high-contoured composite structure 18, for example, the stringer 24, to help ensure proper placement.

As shown in FIG. 9, the method 270 further comprises the step of installing 288 the contoured composite structure 16, such as the high-contoured composite structure 18, for example, the stringer 24, onto and into the mandrel 52, using the one or more plurality of end effector assemblies 160, such as the pogo assemblies 162, to push the contoured composite structure 16, such as the high-contoured composite structure 18, for example, the stringer 24, onto and into the mandrel 52.

As shown in FIG. 9, the method 270 further comprises the step of releasing 290 the contoured composite structure 16, such as the high-contoured composite structure 18, for example, the stringer 24, from the one or more plurality of end effector assemblies 160, such as the pogo assemblies 162, by deactivating the vacuum system 168 (see FIG. 14).

As shown in FIG. 9, the method 270 further comprises the step of retracting 292 the main beam 135, such as the strongback 136, from the mandrel 52. The method 270 may further comprise, after the step of retracting 292 the main beam 135, such as the strongback 136, from the mandrel 52, the step of resetting the main beam 135, such as the strongback 136, for installation of one or more subsequent contoured composite structures 16, such as the high-contoured composite structure 18, for example, the stringer 24, transferred from the tray assembly 36, such as the kitting tray 38, to the mandrel 52.

The method 270 may further optionally comprise, after the step of retracting 292 the main beam 135, such as the strongback 136, from the mandrel 52, the step of moving the mandrel 52 with one or more contoured composite structures 16, such as one or more high-contoured composite structures 18, for example, one or more stringers 24, installed in the mandrel 52, to a processing station 68 (see FIG. 1), for processing of the one or more contoured composite structures 16, such as one or more high-contoured composite structures 18, for example, one or more stringers 24, with one or more processes, for example, compaction, tooling, trimming, or other suitable processes.

Now referring to FIGS. 10-18, FIGS. 10-18 show various steps of an exemplary version of a pick-and-place process 304 from a tray assembly 36, such as a kitting tray 38, onto a mandrel 52. In this version, the pick-and-place process 304 is semi-automated. However, in another version, the pick-and-place process may be fully automated. The control system 150 (see FIG. 1) operably controls the pick-and-place assembly 60 during transfer and installation of the contoured composite structure 16, such as the high-contoured composite structure 18, for example, the stringer 24, from the kitting tray 38 onto the mandrel 52.

Figure 10:
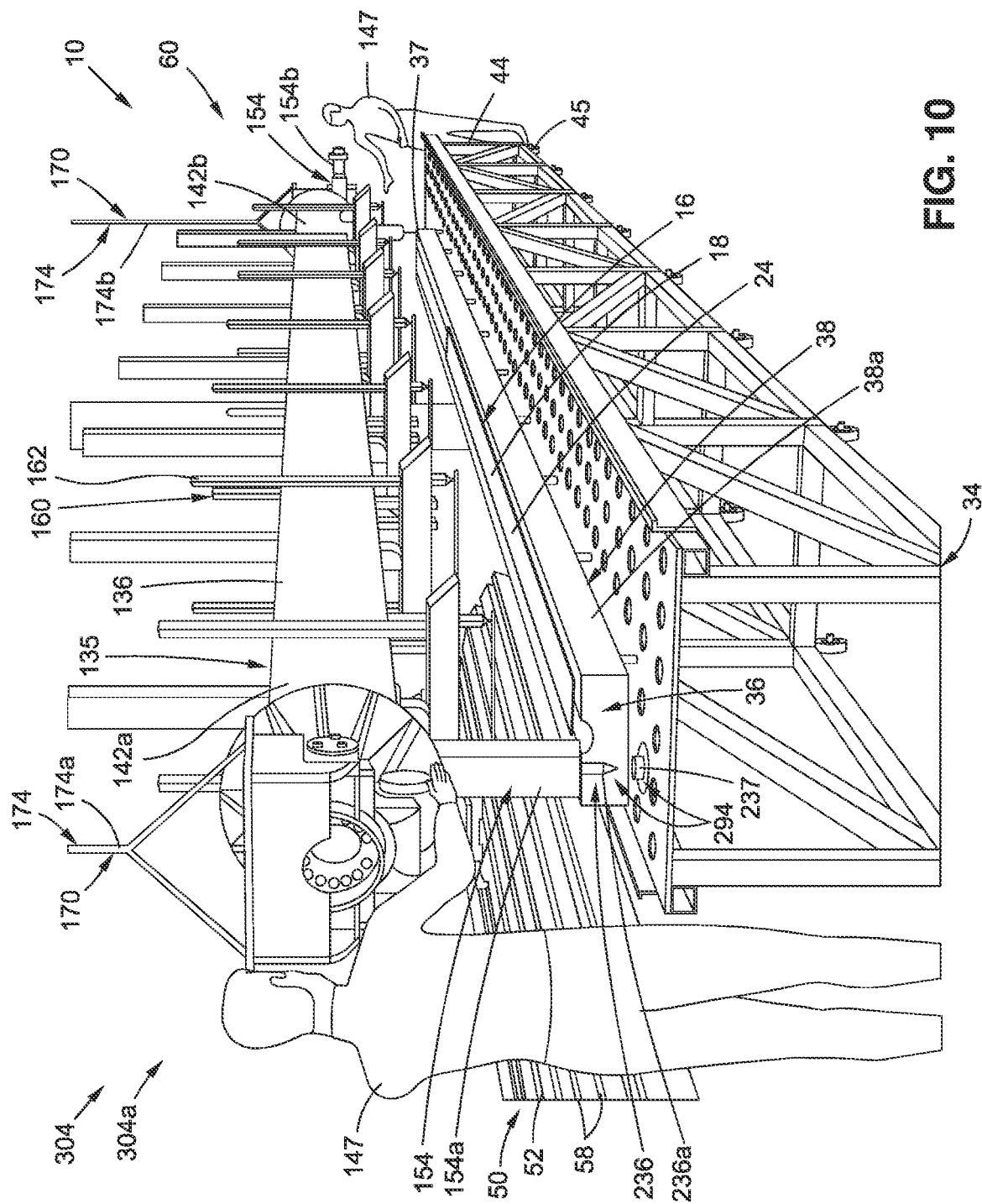
FIG. 10 is an illustration of a left side perspective view of a main beam positioned over a tray assembly of a version of a pick-and-place system of the disclosure.

Now referring to FIG. 10, FIG. 10 is an illustration of a left side perspective view of a main beam 135, such as a strongback 136, moved and positioned by operators 147, above the tray assembly 36, such as the kitting tray 38, for example, a straight flat kitting tray 38a, of a version of the pick-and-place system 10 of the disclosure. Prior to moving the main beam 135, such as the strongback 136, over the kitting tray 38, the pick-and-place process 304 begins with a manual check that the pick-and-place system 10 is ready to have the contoured composite structure 16 (see FIG. 10), such as the high-contoured composite structure 18 (see FIG. 10), for example, the stringer 24 (see FIG. 10), transferred from the kitting tray 38 to the mandrel 52, and that the pick-and-place system 10 is in a safe state, such that the operators 147 can approach the pick-and-place assembly 60 and the kitting tray 38. A y-axis movement to place and position the main beam 135, such as the strongback 136, above the tray assembly 36, such as the kitting tray 38, is preferably performed automatically, by two operators 147 (see FIG. 10), both holding the control element 192 (see FIG. 11A), such as the control button 192a (see FIG. 11A), or validation button, on the second portion 76b (see FIG. 11A) of the side support 74 (see FIG. 11A), such as the first side support 74a (see FIG. 11A), while the y-axis movement is in motion.

As shown in FIG. 10, the pick-and-place process 304 includes a position main beam above tray assembly step 304a. In one version, the two operators 147 move and guide the main beam 135, such as the strongback 136, over to the tray assembly 36, such as the kitting tray 38, at the tray station 34 (see FIG. 10). FIG. 10 shows the contoured composite structure 16, such as the high-contoured composite structure 18, for example, the stringer 24, positioned on the top side 37 of the tray assembly 36, such as the kitting tray 38, and the tray assembly 36, such as the kitting tray 38, is positioned on the movable table 44, movable via wheels 45.

In another version, the movement and guidance of the main beam 135, such as the strongback 136, is automatic and uses a guidance system 61 (see FIG. 1), such as a laser guidance system 61a (see FIG. 1), an optical camera system 61b (see FIG. 1), or another suitable guidance system. The laser guidance system 61a (not shown), or the optical camera system 61b (not shown), may preferably be located at the first end 142a (see FIG. 10) and at the second end 142b (see FIG. 10) of the main beam 135, such as the strongback 136. In addition, the laser guidance system 61a (not shown), or the optical camera system 61b (not shown), may preferably be located at the ends of the mandrel 52 (see FIG. 10). If the pick-and-place system 10 has the guidance system 61, such as the laser guidance system 61a, or the optical camera system 61b, to automatically move, guide, and align the main beam 135, such as the strongback 136, the operators 147 are not needed to manually move, guide, and align the main beam 135, such as the strongback 136.

FIG. 10 further shows the plurality of end effector assemblies 160, such as the pogo assemblies 162, attached to the main beam 135, such as the strongback 136, and shows the pair of indexing assemblies 154, such as the first indexing assembly 154a, at the first end 142a, and the second indexing assembly 154b, at the second end 142b. FIG. 10 further shows the cup-and-cone locating feature 294 comprising the indexing linear actuator 236, such as the pogo pin 236a, of the first indexing assembly 154a, which functions as a male element, and comprising the cup-and-cone element 237, which functions as a female element.

FIG. 10 further shows the load balancer assembly 170, including the pair of load balancer devices 174, such as the first load balancer device 174a and the second load balancer device 174b. FIG. 10 further shows the installation station 50 with the mandrel 52 having the troughs 58.

Now referring to FIGS. 11A-11B, FIG. 11A is an illustration of a left front perspective view of the main beam 135, such as the strongback 136, indexed to the tray assembly 36, such as the kitting tray 38, for example, the straight flat kitting tray 38a, with the indexing assembly 154, and in particular, with the first indexing assembly 154a, of a version of a pick-and-place system 10 of the disclosure. FIG. 11B is an illustration of an enlarged cross-sectional view of a cup-and-cone locating feature 294. As shown in FIG. 11A, the pick-and-place process 304 includes an index main beam to tray assembly step 304b. The relationship and coupling of the main beam 135, such as the strongback 136, to the contoured composite structure 16 (see FIG. 11A), such as the high-contoured composite structure 18 (see FIG. 11A), for example, the stringer 24 (see FIG. 11A), is established through the tray assembly 36, such as the kitting tray 38, for example, the straight flat kitting tray 38a (see FIG. 11A). The operators 147 (see FIG. 11A) guide the main beam 135, such as the strongback 136, onto the tray assembly 36, such as the kitting tray 38. The index between the main beam 135, such as the strongback 136, and the tray assembly 36, such as the kitting tray 38, uses the same positions as the index between the main beam 135, such as the strongback 136, and the mandrel 52.

As shown in FIG. 11A, the main beam 135, such as the strongback 136, is indexed to the tray assembly 36, such as the kitting tray 38, with the first indexing assembly 154a, using the cup-and-cone locating feature 294 (see also FIG. 11B). In one version, as shown in FIG. 11B, the cup-and-cone locating feature 294 comprises the indexing linear actuator 236, such as the pogo pin 236a, of the first indexing assembly 154a, which functions as a male element, and comprises the cup-and-cone element 237, which functions as a female element. The main beam 135, such as the strongback 136, has the indexing linear actuator 236, such as the pogo pin 236a, of the first indexing assembly 154a, and cup-and-cone element 237 may be positioned on the tray assembly 36, such as the kitting tray 38. The cup-and-cone locating feature 294 (see FIG. 11B) is positioned between a pair of suction cups 235 (see FIGS. 11A-11B) of the first indexing assembly 154a (see FIG. 11A). A hard stop may be added into the top side 37 (see FIG. 10) of the tray assembly 36 (see FIGS. 10, 11A), such as the kitting tray 38, at the end used for indexing. This hard stop may not be on the same end on every tray assembly 36, such as the kitting tray 38, and it may depend on whether the forward side or the aft side of the tray assembly 36, such as the kitting tray 38, is used for indexing.

FIG. 11A further shows the plurality of end effector assemblies 160, such as the pogo assemblies 162, attached to the main beam 135, such as the strongback 136, and shows the pair of indexing assemblies 154, such as the first indexing assembly 154a, and the second indexing assembly 154b. FIG. 11A further shows the load balancer assembly 170, with the pulley assembly 172, including the first load balancer device 174a and the second load balancer device 174b, coupled between the pair of side trolleys 126, such as the first side trolley 126a and the second side trolley 126b, respectively, and the attachment members 158, such as the first bearing member 158a and the second bearing member 158b, respectively.

FIG. 11A further shows the tray station 34 and the installation station 50 in the installation cell 32. The mandrel 52 with the top surface 222 is positioned on the conveyor assembly 56 and the moving manufacturing line 54, which are positioned on the floor 80 of the installation cell 32.

FIG. 11A further shows the pick-and-place assembly 60 with the gantry assembly 70 having the overhead gantry 72 with the pair of side supports 74 comprising the first side support 74a and the second side support 74b. FIG. 11A further shows the main trolley 100 and the pair of side beams 122 comprising the first side beam 122a and the second side beam 122b. FIG. 11A further shows the control element 192, such as the control button 192a, or validation button, coupled to the second portion 76b of the side support 74, such as the first side support 74a.

Now referring to FIGS. 12A-12B, FIG. 12A is an illustration of an enlarged front perspective view of a radio-frequency identification (RFID) system 295 connected to the main beam 135, such as the strongback 136, and connected to the tray assembly 36, such as the kitting tray 38, for example, the straight flat kitting tray 38*a*, of the pick-and-place system 10 of the disclosure. FIG. 12B is an illustration of an enlarged front view of a version of a radio-frequency identification (RFID) tag 298 of the RFID system 295 of FIG. 12A.

As shown in FIG. 12A, the pick-and-place process 304 includes a determine end effector assemblies step 304*c*. The pick and place system 10 (see FIG. 11A) gathers configuration information with the RFID system 295 and from the RFID tag 298 connected to the kitting tray 38. This information tells the pick and place system 10 which, and how many, end effector assemblies 160 (see FIG. 12A), such as the pogo assemblies 162 (see FIG. 12A), are to be used to pick up the contoured composite structure 16 (see FIG. 12A), such as the high-contoured composite structure 18 (see FIG. 12A), for example, the stringer 24 (see FIG. 12A). The main beam 135, such as the strongback 136, determines which, and how many, end effector assemblies 160, such as the pogo assemblies 162, to use based on the information in the RFID tag 298.

As shown in FIG. 12A, the RFID system 295 comprises a radio-frequency identification (RFID) reader 296 connected, or coupled, to the first end 142*a* of the main beam 135, such as the strongback 136. As shown in FIG. 12A, the RFID system 295 further comprises the RFID tag 298 connected, or coupled, to the tray assembly 36, such as the kitting tray 38, for example, the straight flat kitting tray 38*a* having the trough 200, and positioned on the movable table 44 at the tray station 34. As used herein, "radio-frequency identification (RFID)" means the use of radio waves to read with a reader, capture, and interact with information stored on a tag. The RFID reader 296 features a two-way radio transmitted-receiver (transceiver), sometimes referred to as an interrogator. The transceiver transmits a radio signal 297 (see FIG. 12A) to interrogate the RFID tag 298. The RFID tag 298 converts the radio signal 297 into usable power, and responds to the RFID reader 296. The RFID reader 296 detects and interprets the information received from the RFID tag 298.

As shown in FIG. 12B, in one version, the RFID tag 298 comprises a passive RFID tag 298*a* having an antenna 299*a* and an integrated circuit (IC) 299*b*, or microchip. The RFID tag 298, such as the passive RFID tag 298*a*, has no internal power source, for example, does not contain a battery, and waits to receive the radio signal 297 from the RFID reader 296. The RFID reader 296 sends the radio signal 297 to the antenna 299*a* of the RFID tag 298, which converts the radio signal 297 into a radio frequency wave and draws in energy from the radio frequency wave. The energy moves from the antenna 299*a* to the IC 299*b* and powers the IC 299*b*, which generates a radio signal back to the RFID reader 296, which detects and interprets the information in the radio signal. In another version, the RFID tag 298 may comprise an active RFID tag (not shown), which is battery powered and continuously broadcasts its own signal to accurately track a real-time location.

FIG. 12A shows the indexing assembly 154, such as the first indexing assembly 154*a*, having the pair of suction cups 235, the housing 238, and the drive mechanism 240, such as the electric motor 240*a*. FIG. 12A further shows the end effector assembly 160, such as the pogo assembly 162, having the vacuum plate 242, the linear actuators 246, including the first linear actuators 246*a* and the second linear actuator 246*b*, the swivel devices 260, and the main support structure 269. FIG. 12A further shows the installation station 50 with the mandrel 52 having the troughs 58 on the top surface 222, and shows the handle 146, and the control system 150 with the human machine interface (HMI) device 148.

Now referring to FIGS. 13A-13D, FIGS. 13A-13D show various positions of the end effector assembly 160, such as the pogo assembly 162, in the process of copying the geometry 300 (see FIGS. 13A-13B) of the top surface 19 (see FIGS. 13A-13B) of the contoured composite structure 16, such as the high-contoured composite structure 18, for example, the stringer 24, positioned on the tray assembly 36, such as the kitting tray 38, for example, the straight flat kitting tray 38*a*, on the movable table 44.

Figure 13B:
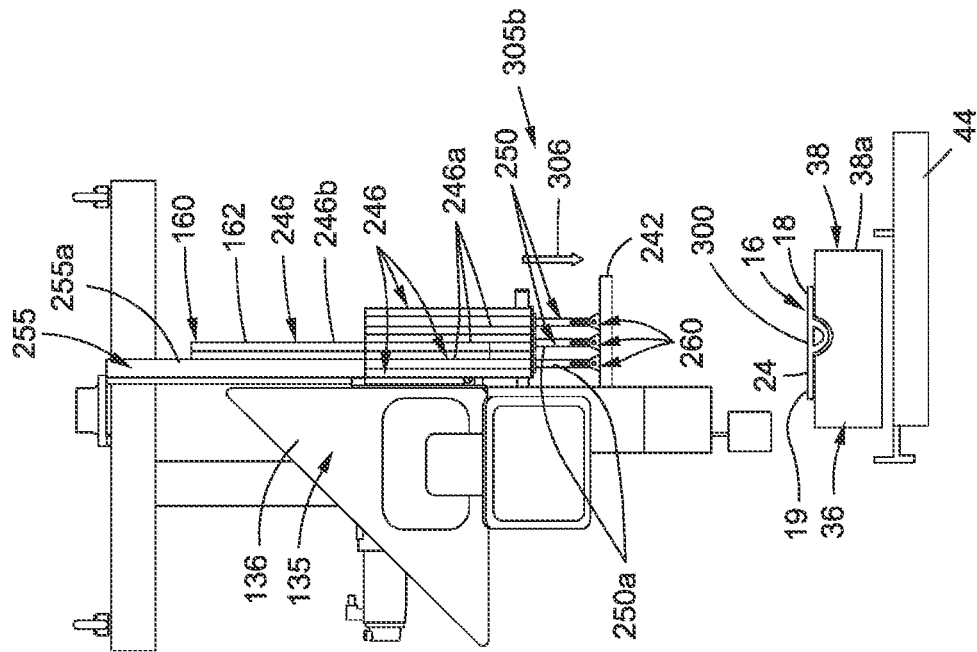
FIG. 13B is an illustration of a left side view of the end effector assembly, the main beam, and the tray assembly of FIG. 13A, where the end effector assembly is in a second position.
Figure 13A:
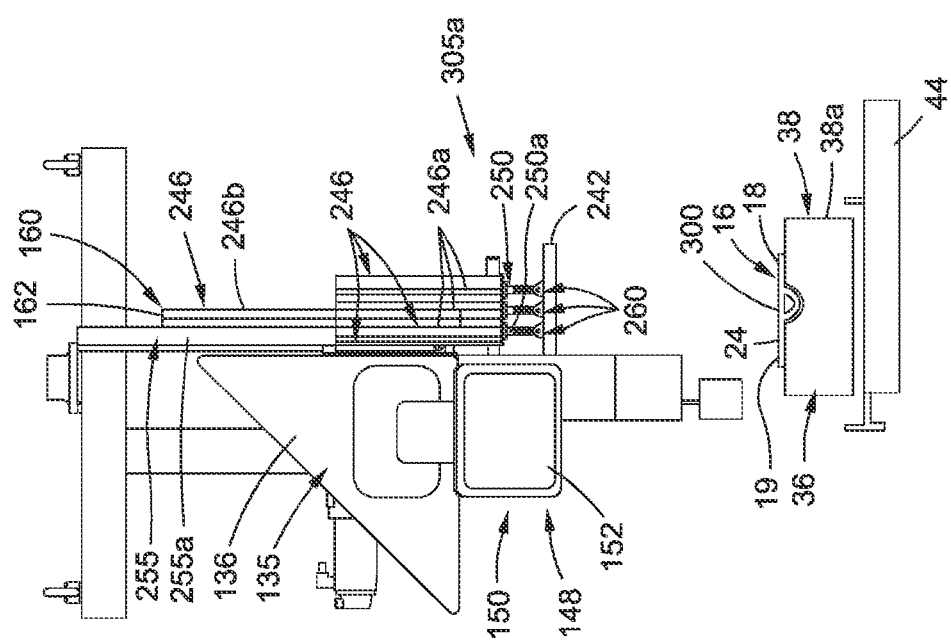
FIG. 13A is an illustration of a left side view of an end effector assembly, a main beam, and a tray assembly of a pick-and-place system of the disclosure, where the end effector assembly is in a first position.

FIGS. 13A-13D show the end effector assembly 160, such as the pogo assembly 162, with the linear actuators 246, such as the first linear actuators 246*a* and the second linear actuator 246*b*, the vacuum plate 242, the actuating elements 250, such as the piston rods 250*a*, the actuating element 255, such as the slotted actuating element 255*a*, and the swivel devices 260. FIGS. 13A-13D further show the main beam 135, such as the strongback 136, Now referring to FIG. 13A, FIG. 13A is an illustration of a left side view of the end effector assembly 160, such as the pogo assembly 162, the main beam 135, such as the strongback 136, and the tray assembly 36, such as the kitting tray 38, of the pick-and-place system 10 (see FIGS. 1, 2F, 11A) of the disclosure, where the end effector assembly 160, such as the pogo assembly 162, is in a first position 305*a*, or an initial position, positioned above the high-contoured composite structure 18, for example, the stringer 24, positioned on the tray assembly 36, such as the kitting tray 38, for example, the straight flat kitting tray 38*a*, on the movable table 44. The actuating elements 250, such as the piston rods 250*a*, are retracted in a retracted position. FIG. 13A further shows the control system 150 with the human machine interface (HMI) device 148 and the control panel 152.

Now referring to FIG. 13B, FIG. 13B is an illustration of a left side view of the end effector assembly 160, such as the pogo assembly 162, the main beam 135, such as the strongback 136, and the tray assembly 36, such as the kitting tray 38, of FIG. 13A, where the end effector assembly 160, such as the pogo assembly 162, is in a second position 305*b* above the contoured composite structure 16, such as the high-contoured composite structure 18, for example, the stringer 24, positioned on the tray assembly 36, such as the kitting tray 38, for example, the straight flat kitting tray 38*a*, on the movable table 44. In the second position 305*b*, the actuating elements 250, such as the piston rods 250*a*, are extended downwardly, or deployed, in a downward direction 306 (see FIG. 13B) to an extended position or deployed position. FIG. 13B shows three actuating elements 250, such as three piston rods 250*a*, where each of the three first linear actuators 246*a* deploys an actuating element 250, or piston rod 250*a*. The deployment of the actuating elements 250, such as the piston rods 250*a*, prepares the end effector assembly 160, such as the pogo assembly 162, to copy the geometry 300 (see FIG. 13B) of the top surface 19 (see FIG. 13B) of the contoured composite structure 16, such as the high-contoured composite structure 18, for example, the stringer 24. The extended or deployed actuating elements 250, such as the piston rods 250*a*, allow the vacuum plate 242 to rotate to match the top surface 19 of the contoured composite structure 16, such as the high-contoured composite structure 18, for example, the stringer 24.

Now referring to FIG. 13C, FIG. 13C is an illustration of a left side view of the end effector assembly 160, such as the pogo assembly 162, the main beam 135, such as the strongback 136, and the tray assembly 36, such as the kitting tray 38, of FIG. 13A, where the end effector assembly 160, such as the pogo assembly 162, is in a third position 305c in contact with the top surface 19 (see FIG. 13B) of the contoured composite structure 16, such as the high-contoured composite structure 18, for example, the stringer 24, positioned on the tray assembly 36, such as the kitting tray 38, to begin the process of copying the geometry 300 (see FIG. 13B) of the top surface 19 (see FIG. 13B) of the contoured composite structure 16, such as the high-contoured composite structure 18, for example, the stringer 24.

In the third position 305c, the actuating element 255, such as the slotted actuating element 255a, is extended downwardly, or deployed, in a downward direction 308 (see FIG. 13C) to an extended position or deployed position. FIG. 13C shows one actuating element 255, such as one slotted actuating element 255a, where the second linear actuator 246b remains in place as the actuating element 255, such as the slotted actuating element 255a, coupled to the second linear actuator 246b, extends or deploys downwardly. When the pick-and-place system 10 (see FIGS. 1, 2F, 11A) detects that all three actuating elements 250, such as the piston rods 250a, are no longer fully extended or deployed, the actuating element 255, such as the slotted actuating element 255a, stops extending since this means that vacuum plate 242 with the vacuum cups 245 (see FIG. 8B) are fully adapted to the geometry 300 of the contoured composite structure 16, such as the high-contoured composite structure 18, for example, the stringer.

Now referring to FIG. 13D, FIG. 13D is an illustration of a left side view of the end effector assembly 160, such as the pogo assembly 162, the main beam 135, such as the strongback 136, and the tray assembly 36, such as the kitting tray 38, of FIG. 13A, where the end effector assembly 160, such as the pogo assembly 162, is in a fourth position 305d. As shown in FIG. 13D, the pick-and-place process 304 includes an end effector assemblies copy geometry step 304d, where the geometry 300 of the top surface 19 of the contoured composite structure 16, such as the high-contoured composite structure 18, for example, the stringer 24, is fully copied.

In the fourth position 305d, as shown in FIG. 13D, the end effector assembly 160, such as the pogo assembly 162, is still in contact with the top surface 19 (see FIG. 13B) of the contoured composite structure 16, such as the high-contoured composite structure 18, for example, the stringer 24, positioned on the tray assembly 36, such as the kitting tray 38, the tray assembly 36, such as the kitting tray 38, and the vacuum plate 242 rotates in a rotation direction 310 to match the geometry 300 (see FIG. 13B) of the top surface 19 (see FIG. 13B) of the contoured composite structure 16, such as the high-contoured composite structure 18, for example, the stringer 24. Once the vacuum plate 242 rotates in the rotation direction 310 to match the geometry 300 (see FIG. 13B) of the top surface 19 (see FIG. 13B) of the contoured composite structure 16, such as the high-contoured composite structure 18, for example, the stringer 24, rod locks are engaged to hold the position of the vacuum plate 242. The vacuum plate 242 with the vacuum cups 245 (see FIG. 8B) is wide enough to accommodate movement of the contoured composite structure 16, such as the high-contoured composite structure 18, for example, the stringer 24, in a y-axis direction.

Figure 13E:
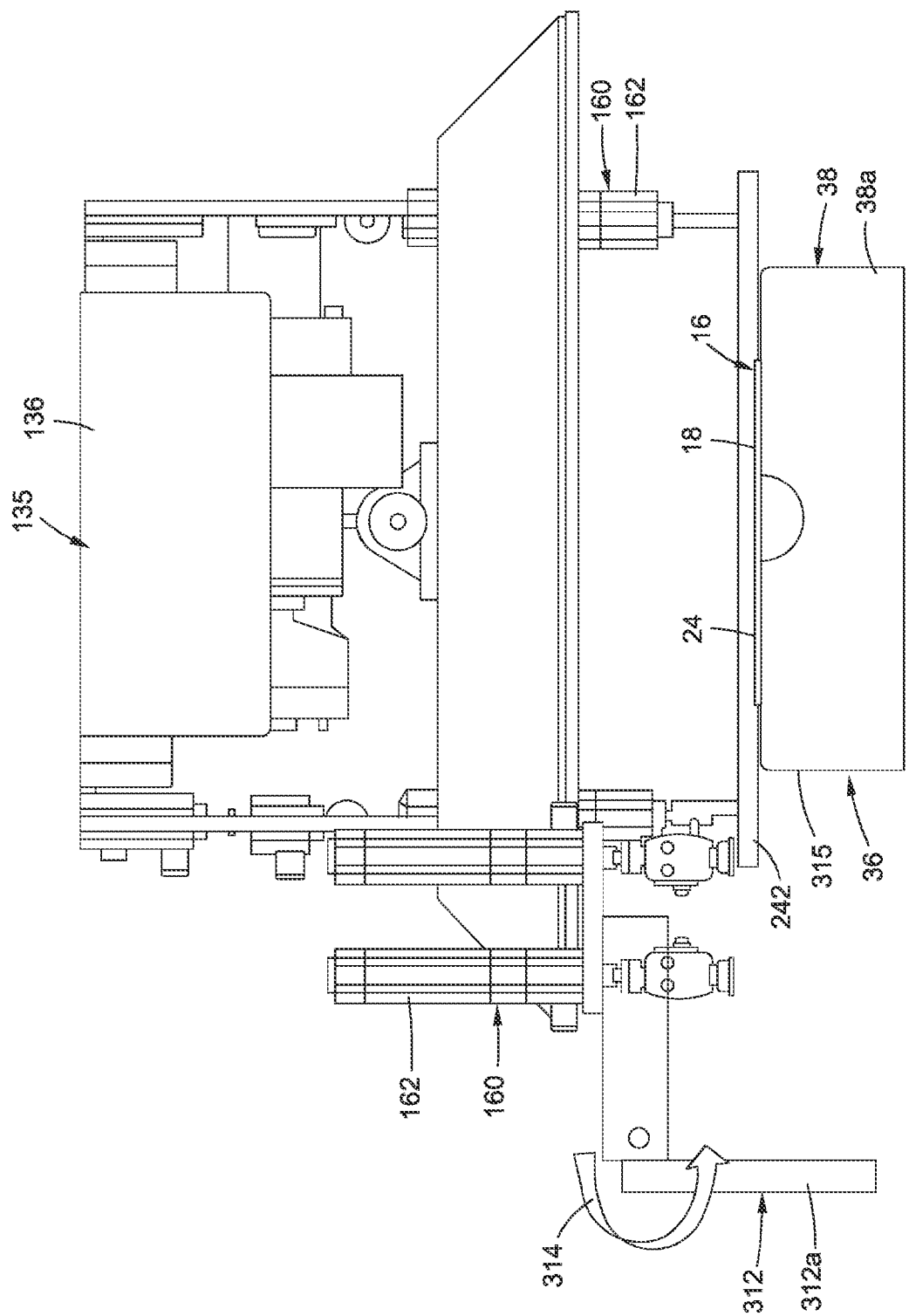
FIG. 13E is an illustration of left side view of an end effector assembly of a pick-and-place system of the disclosure, having a stop device.

Now referring to FIG. 13E, FIG. 13E is an illustration of left side view of another version of an end effector assembly 160, such as a pogo assembly 162, of a pick-and-place system 10 (see FIGS. 1, 2F, 11A) of the disclosure, having a stop device 312, such as a Y-stop device 312a, coupled to each end effector assembly 160, such as the pogo assembly 162. When the vacuum plate 242 (see FIG. 11E) of the end effector assemblies 160 (see FIG. 11E), such as the pogo assemblies 162 (see FIG. 11E), copy the geometry 300 (see FIG. 13B) of the top surface 19 (see FIG. 13B) of the contoured composite structure 16 (see FIG. 13E), such as the high-contoured composite structure 18 (see FIG. 13E), for example, the stringer 24 (see FIG. 13E), they may also copy a geometry of the tray assembly 36 (see FIG. 13E), such as the kitting tray 38 (see FIG. 13E), for example, the straight flat kitting tray 38a (see FIG. 13E), with the stop device 312, such as the Y-stop device 312a. In one version, each of the end effector assemblies 160, such as each of the pogo assemblies 162, deploys the stop device 312, such as the Y-stop device 312a, in a rotation direction 314 (see FIG. 13E), to contact a side 315 (see FIG. 13E) of the tray assembly 36, such as the kitting tray 38. The stop device 312, such as the Y-stop device 312a, allows the pick-and-place system 10 (see FIG. 1) to match the lateral contour of the side 315 of the tray assembly 36, such as the kitting tray 38. FIG. 13E further shows the main beam 135, such as the strongback 136, with the attached end effector assembly 160, such as a pogo assembly 162, and the vacuum plate 242 of the end effector assembly 160, such as a pogo assembly 162, in contact with the contoured composite structure 16, such as the high-contoured composite structure 18, for example, the stringer 24.

Now referring to FIG. 14, FIG. 14 is an illustration of a left front perspective view of a version of a pick-and-place system 10 of the disclosure, showing a plurality of end effector assemblies 160, such as pogo assemblies 162, using a vacuum system 168 to pick up and secure a contoured composite structure 16, such as a high-contoured composite structure 18, for example, a stringer 24, from a tray assembly 36, such as a kitting tray 38, for example, a straight flat kitting tray 38a, positioned on a movable table 44, at the tray station 34.

As shown in FIG. 14, the pick-and-place process 304 includes a secure contoured composite structure to end effector assemblies step 304e. In the secure contoured composite structure to end effector assemblies step 304e, the vacuum system 168 (see FIG. 14) is turned on and given a short dwell time, e.g., 10 seconds, to confirm that each selected end effector assembly 160, such as the pogo assembly 162, has achieved adequate vacuum suction to the top surface 19 (see FIG. 13A) of the contoured composite structure 16, such as the high-contoured composite structure 18, for example, the stringer 24. Any issues or faults are displayed on the human machine interface (HMI) device 148 (see FIG. 12A) to the operators 147 (see FIG. 144), so the operators 147 can determine the best course of action.

The vacuum system 168 (see FIG. 14) includes dedicated vacuum tubes, or vacuum lines, positioned through the main beam 135 (see FIG. 14), such as the strongback 136 (see FIG. 14), positioned through the plurality of end effector assemblies 160 (see FIG. 14), such as the pogo assemblies 162 (see FIG. 14), and coupled to the vacuum cups 245 (see FIG. 8B) on the vacuum plates 242 (see FIG. 14) that are in contact with, and secured to, the contoured composite structure 16, such as the high-contoured composite structure 18, for example, the stringer 24, when the vacuum is turned on. The vacuum system 168 may further comprise a vacuum, a vacuum source, a vacuum power supply, and other suitable vacuum system components.

After the contoured composite structure 16, such as a high-contoured composite structure 18, for example, a stringer 24, is secured to the vacuum plates 242 of the plurality of end effector assemblies 160, such as pogo assemblies 162, using the vacuum system 168, the main beam 135, such as the strongback 136, is manually removed from the tray assembly 36, such as the kitting tray 38, by the two operators 147. The tray assembly 36, such as the kitting tray 38, may then be exchanged with the next contoured composite structure 16, such as the high-contoured composite structure 18, for example, the stringer 24, in the firing order.

FIG. 14 further shows the indexing assemblies 154, such as the first indexing assembly 154a and the second indexing assembly 154b, the load balancer assembly 170, such as the pulley assembly 172, including the pair of load balancer devices 174 comprising the first load balancer device 174a and the second load balancer device 174b, coupled between the pair of side trolleys 126, respectively, and the attachment members 158, such as the first bearing member 158a and the second bearing member 158b, respectively. FIG. 14 further shows the installation station 50 in the installation cell 32, and the mandrel 52 with the top surface 222. FIG. 14 further shows the pick-and-place assembly 60 with the gantry assembly 70 having the overhead gantry 72, the pair of side beams 122, and the control element 192, such as the control button 192a, or validation button.

Now referring to FIG. 15A, FIG. 15A is an illustration of a left front perspective view of a version of a pick-and-place system 10 of the disclosure showing an operator 147 automatically rotating a main beam 135, such as a strongback 136, in a rotation direction 316, to match an angle of a mandrel 52. As shown in FIG. 15A, the pick-and-place process 304 includes a rotate main beam to match angle of mandrel step 304f. In the rotate main beam to match angle of mandrel step 304f, as shown in FIG. 15A, the operator 147 presses the control element 192, such as the control button 192a, or validation button, located on the second portion 76b of the side support 74, such as the first side support 74a, to automatically rotate the main beam 135, such as the strongback 136, having the plurality of end effector assemblies 160, such as the pogo assemblies 162, with the vacuum plates 242 holding and moving the contoured composite structure 16, such as the high-contoured composite structure 18, for example, the stringer 24, from the top side 37 of the tray assembly 36 on the movable table 44 at the tray station 34, to the top surface 222 of the mandrel 52 at the installation station 50 of the installation cell 32.

To aid with installation of the contoured composite structure 16, such as the high-contoured composite structure 18, for example, the stringer 24, onto and into the mandrel 52, the main beam 135, such as the strongback 136, rotates to the angle that best helps install the contoured composite structure 16, such as the high-contoured composite structure 18, for example, the stringer 24, onto and into the mandrel. The angle may be read from the RFID tag 298 (see FIGS. 12A-12B) positioned on the tray assembly 36, such as the kitting tray 38, for example, the straight flat kitting tray 38a.

FIG. 15A shows the indexing assemblies 154, such as the first indexing assembly 154a and the second indexing assembly 154b, the load balancer assembly 170, such as the pulley assembly 172, coupled between the pair of side trolleys 126, respectively, and the attachment members 158, such as the first bearing member 158a and the second bearing member 158b, respectively. FIG. 15A further shows the pick-and-place assembly 60 with the gantry assembly 70 having the overhead gantry 72 with the pair of side supports 74 comprising the first side support 74a and the second side support 74b, and the first side support 74a having the first portion 76a and the second portion 76b. FIG. 15A further shows the main trolley 100 and the pair of side beams 122.

Once the main beam 135, such as the strongback 136, has completed its rotation, the main beam 135, such as the strongback 136, is automatically placed above the mandrel 52 in a y-axis position. The operators 147 may adjust the y-axis position using the human machine interface (HMI) device 148. The operators 147 may manually guide the main beam 135, such as the strongback 136, onto the mandrel 52 to avoid any possible harm to the main beam 135, such as the strongback 136.

Now referring to FIG. 15B, FIG. 15B is an illustration of an enlarged view of the indexing assembly 154, such as the first indexing assembly 154a, coupled to the main beam 135, such as the strongback 136, of FIG. 15A. As shown in FIG. 15B, the indexing assembly 154, such as the first indexing assembly 154a, comprises the pair of suction cups 235, the indexing linear actuator 236, such as the pogo pin 236a, the housing 238, and the drive mechanism 240, such as the electric motor 240a. FIG. 15B further shows the handle 146 and the human machine interface (HMI) device 148. During rotation, the z-axis of the indexing assembly 154, such as the first indexing assembly 154a, extends to full extension to ensure the contoured composite structure 16, such as the high-contoured composite structure 18, for example, the stringer 24, clears the mandrel 52 for indexing.

Figure 15C:
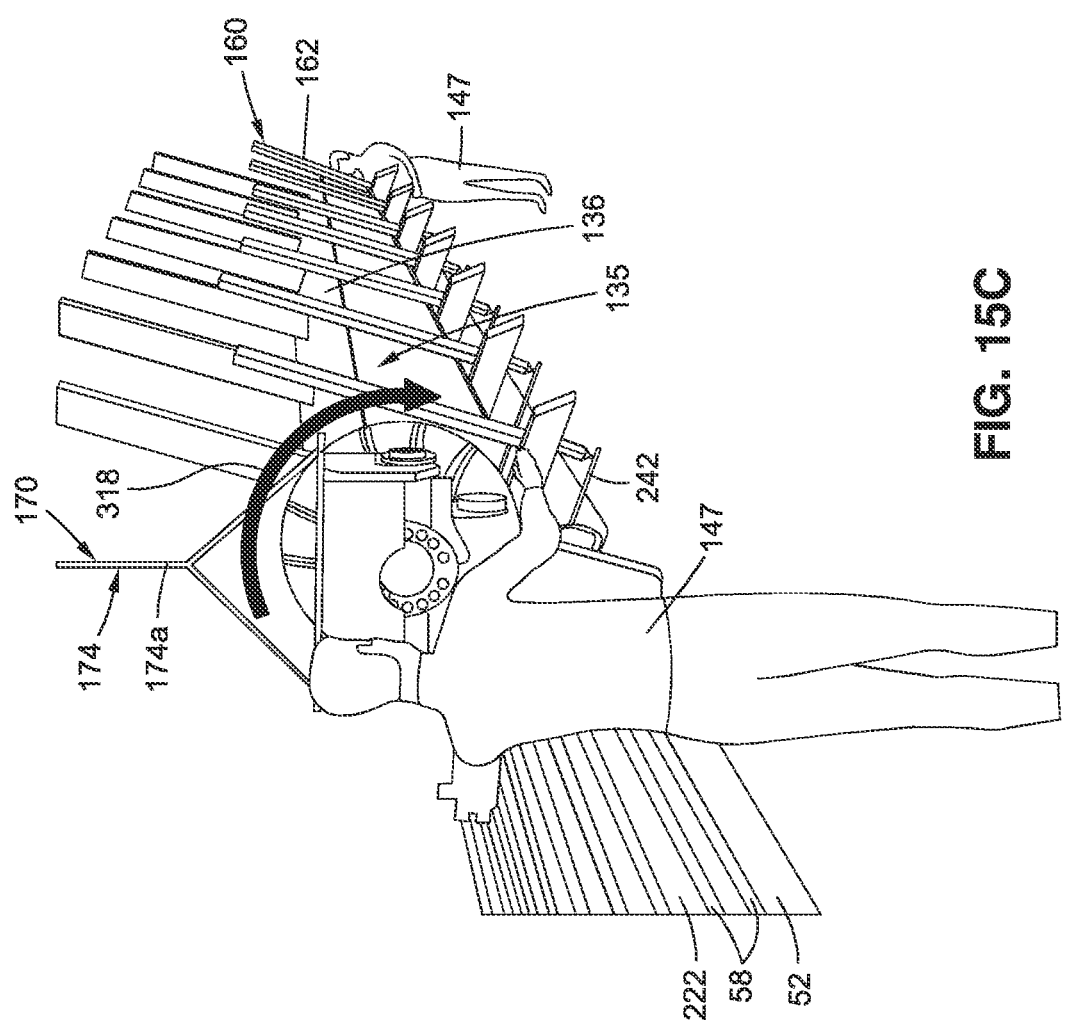
FIG. 15C is an illustration of a left side perspective view of another version of a pick-and-place system of the disclosure showing operators moving and rotating a main beam to match an angle of a mandrel.

Now referring to FIG. 15C, FIG. 15C is an illustration of a left side perspective view of another version of a pick-and-place system 10 of the disclosure showing operators 147 moving and rotating the main beam 135, such as the strongback 136, in a rotation direction 318, to match an angle of the mandrel 52. To aid with installation of the contoured composite structure 16, such as the high-contoured composite structure 18, for example, the stringer 24, onto and into the troughs 58 (see FIG. 15C) formed in the top surface 222 (see FIG. 15C) of the mandrel 52 (see FIG. 15C), the main beam 135, such as the strongback 136, rotates to the angle that best helps install the contoured composite structure 16, such as the high-contoured composite structure 18, for example, the stringer 24, onto and into the mandrel. The angle may be read from the RFID tag 298 (see FIGS. 12A-12B) positioned on the tray assembly 36, such as the kitting tray 38, for example, the straight flat kitting tray 38a. FIG. 15C further shows vacuum plates 242 of the end effector assemblies 160, such as the pogo assemblies 162, and the load balancer assembly 170 with the load balancer device 174, such as the first load balancer device 174a.

Now referring to FIG. 16A, FIG. 16A is an illustration of a left side close-up perspective view of an operator 147 rough indexing a main beam 135, such as a strongback 136, to a mandrel 52, with an indexing assembly 154, such as a first indexing assembly 154a, of a pick-and-place system 10 (see FIGS. 1, 11A) of the disclosure. The index between the main beam 135, such as the strongback 136, and the mandrel 52 uses the same positions as the index between the main beam 135, such as the strongback 136, and the tray assembly 36 (see FIG. 16A), such as the kitting tray 38 (see FIG. 16A), positioned on the movable table 44 (see FIG. 16A).

As shown in FIG. 16A, the pick-and-place process 304 includes an index main beam to mandrel step 304g. In the index main beam to mandrel step 304g, as shown in FIG. 16A, the operator 147 first rough indexes the main beam 135, such as the strongback 136, to the top surface 222 of the mandrel 52, with the indexing assembly 154, such as the first indexing assembly 154a, and in particular, with the cup-and-cone locating feature 294 and the pair of suction cups 235. The interface of the main beam 135, such as the strongback 136, to the mandrel 52 is the cup-and-cone locating feature 294 with the pair of suction cups 235 to allow the main beam 135, such as the strongback 136, to push the contoured composite structure 16 (see FIG. 16A), such as the high-contoured composite structure 18 (see FIG. 16A), for example, the stringer 24 (see FIG. 16A), into place in the troughs 58 (see FIG. 16A) without lifting off the mandrel 52 (see FIG. 16A).

While the main beam 135, such as the strongback 136, is indexed to the mandrel 52, the x-axis motion system 116 (see FIGS. 2B, 2C) and the conveyor assembly 56 (see FIG. 16A) on the moving manufacturing line 54 (see FIG. 16A) work together to assure that there is no relative movement between the main beam 135, such as the strongback 136, and the mandrel 52.

In the index main beam to mandrel step 304g, the operator 147 next fine indexes the main beam 135, such as the strongback 136, to the top surface 222 of the mandrel 52, with the indexing assembly 154, such as the first indexing assembly 154a. The main beam 135, such as the strongback 136, uses a camera system 302 (see FIG. 16A), such as a closed-circuit television camera (CCTV) system 302a (see FIG. 16A), to allow the operator 147 to view the location of a scribe line on the mandrel 52, in order to determine how far to shift the contoured composite structure 16, such as the high-contoured composite structure 18, for example, the stringer 24, in an x-axis direction, so that the placement tolerance is achieved. As shown in FIG. 16A, camera system 302, such as the closed-circuit television camera (CCTV) system 302a, is located at the first end 142a of the main beam 135, such as the strongback 136. The main beam 135 fine indexes itself to the mandrel 52 using the drive mechanism 240, such as the electric motor 240a, for example, a fine X adjustment motor.

As shown in FIG. 16A, the indexing assembly 154, such as the first indexing assembly 154a, comprises the pair of suction cups 235, the housing 238, the drive mechanism 240, such as the electric motor 240a, and the cup-and-cone locating feature 294. The drive mechanism 240, such as the electric motor 240a, for example, the fine X adjustment motor, moves the main beam 135, such as the strongback 136, into the proper position and orientation during transfer and installation of the contoured composite structure 16, such as the high-contoured composite structure 18, for example, the stringer 24, onto and into the mandrel 52. One or more of the indexing assemblies 154 act, or function, as locating features, to allow the main beam 135, such as the strongback 136, to push the contoured composite structure 16, such as the high-contoured composite structure 18, for example, the stringer 24, into place on and in the mandrel 52, without lifting off of the mandrel 52. The main beam 135, such as the strongback 136, is rough indexed to the mandrel 52 by using the suction cups 235 (see FIGS. 16A-16B) and the indexing linear actuator 236, or pogo pin 236a, that comprise the cup-and-cone locating feature 294 (see FIGS. 16A-16B). FIG. 16A further shows the operator 147 holding the handle 146, and shows the human machine interface (HMI) device 148.

Now referring to FIG. 16B, FIG. 16B is an illustration of an enlarged cross-sectional view of the cup-and-cone locating feature 294 and the pair of suction cups 235 of the indexing assembly 154, such as the first indexing assembly 154a, of FIG. 16A. FIG. 16B further shows the cup-and-cone locating feature 294 comprising the indexing linear actuator 236, such as the pogo pin 236a, of the first indexing assembly 154a (see FIG. 16A), which functions as the male element, and comprising the cup-and-cone element 237, which functions as the female element. As shown in FIG. 16B, the indexing linear actuator 236, such as the pogo pin 236a, is inserted into the cup-and-cone element 237, and is designed for insertion into each trough 58 (see FIG. 16A) of the mandrel 52 (see FIG. 16A) during indexing and installation of the contoured composite structure 16, such as the high-contoured composite structure 18, for example, the stringer 24, onto and into the mandrel 52.

Figure 17:
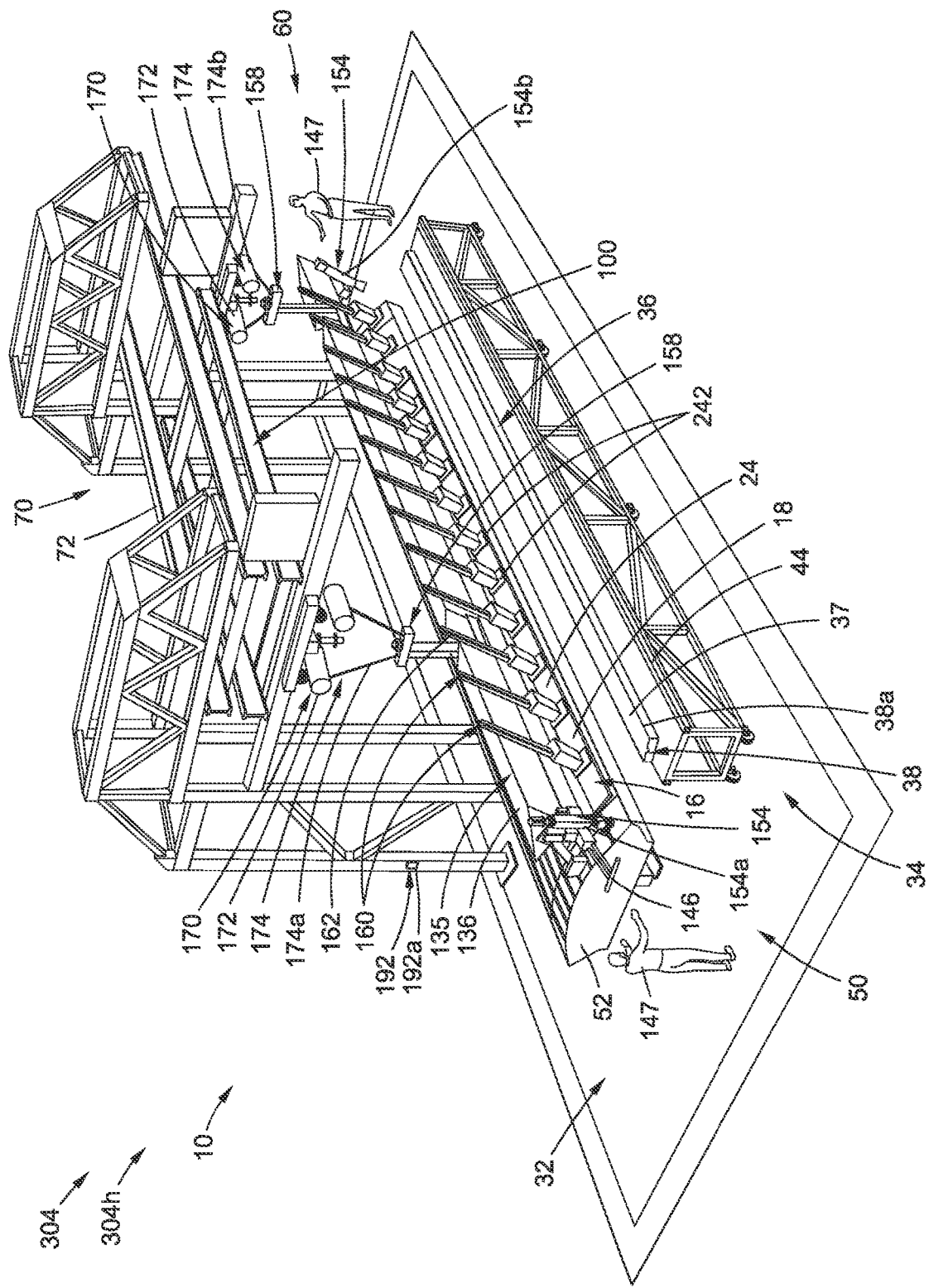
FIG. 17 is an illustration of a left front perspective view of a version of a pick-and-place system of the disclosure showing operators having lowered a plurality of end effector assemblies to push the contoured composite structure into a mandrel.

Now referring to FIG. 17, FIG. 17 is an illustration of a left front perspective view of a version of a pick-and-place system 10 of the disclosure showing operators 147 having lowered the plurality of end effector assemblies 160, such as the pogo assemblies 162, using the handle 146, to push the contoured composite structure 16, such as the high-contoured composite structure 18, for example, the stringer 24, into the mandrel 52 (see FIG. 16A). As shown in FIG. 17, the pick-and-place process 304 includes a push contoured composite structure into mandrel step 304h. In the push contoured composite structure into mandrel step 304h, as shown in FIG. 17, the pair of indexing assemblies 154, such as the first indexing assembly 154a and the second indexing assembly 154b, retract to push the contoured composite structure 16, such as the high-contoured composite structure 18, for example, the stringer 24, into the mandrel 52. This allows the pick-and-place system 10 to be fully synchronized to prevent harm to the contoured composite structure 16, such as the high-contoured composite structure 18, for example, the stringer 24.

With the contoured composite structure 16, such as the high-contoured composite structure 18, for example, the stringer 24, properly placed into the mandrel 52, the vacuum plates 242 (see FIG. 17) of the plurality of end effector assemblies 160 (see FIG. 17), such as the pogo assemblies 162 (see FIG. 17), release the vacuum and turn off the vacuum system 168 (see FIG. 14), and blow to ensure the contoured composite structure 16, such as the high-contoured composite structure 18, for example, the stringer 24, is no longer attached to the main beam 135, such as the strongback 136. The plurality of end effector assemblies 160, such as the pogo assemblies 162, then retract away from the mandrel 52 to release the contoured composite structure 16, such as the high-contoured composite structure 18, for example, the stringer 24.

FIG. 17 further shows the load balancer assembly 170, such as the pulley assembly 172, including the pair of load balancer devices 174 comprising the first load balancer device 174a and the second load balancer device 174b, coupled to the attachment members 158. FIG. 17 further shows the installation station 50 in the installation cell 32, and the tray assembly 36, such as the kitting tray 38, for example, the straight flat kitting tray 38a, with the top side 37 empty and positioned on the movable table 44 at the tray station 34. FIG. 17 further shows the pick-and-place assembly 60 with the gantry assembly 70 having the overhead gantry 72, the main trolley 100, and the control element 192, such as the control button 192a, or validation button.

Figure 18:
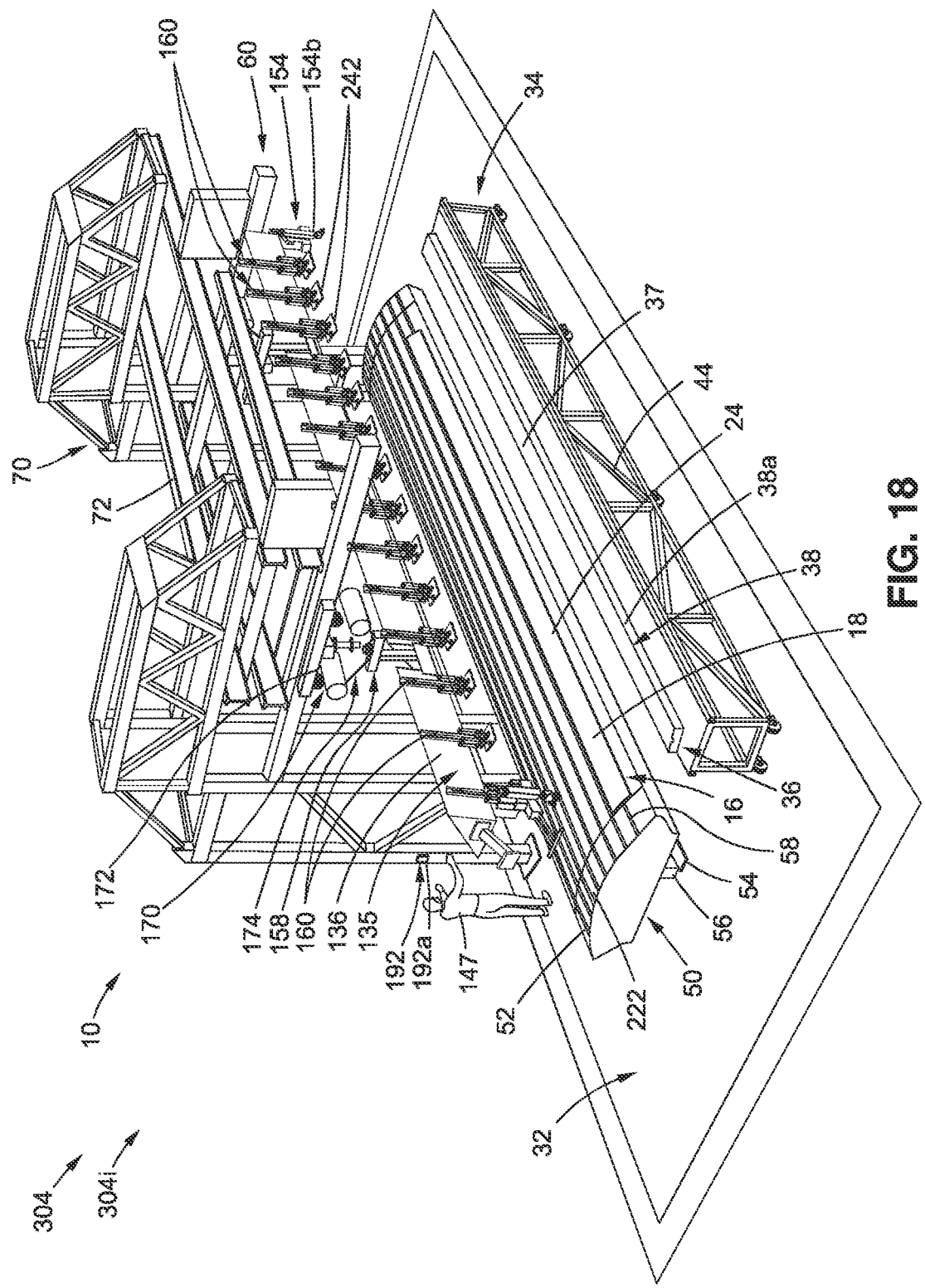
FIG. 18 is an illustration of left front perspective view of a version of a pick-and-place system of the disclosure showing a main beam and a plurality of end effector assemblies removed from a mandrel.

Now referring to FIG. 18, FIG. 18 is an illustration of left front perspective view of a version of a pick-and-place system 10 of the disclosure showing the main beam 135, such as the strongback 136, and the vacuum plates 242 of the plurality of end effector assemblies 160, such as the pogo assemblies 162 (see FIG. 17), removed from the mandrel 52. FIG. 18 further shows the operator 147 using the control element 192, such as the control button 192a, or validation button, to reset the main beam 135, such as the strongback 136, to receive the next contoured composite structure 16, such as the high-contoured composite structure 18, for example, the stringer 24.

As shown in FIG. 18, the pick-and-place process 304 includes a remove main beam from mandrel step 304i. In the remove main beam from mandrel step 304i, the operators 147 carefully lift the main beam 135, such as the strongback 136 off of the mandrel 52, and the operators 147 check that the contoured composite structure 16 (see FIG. 17), such as the high-contoured composite structure 18 (see FIG. 17), for example, the stringer 24 (see FIG. 17), is fully released. The rotation angle is returned to a home position, or initial position, and the plurality of end effector assemblies 160, such as the pogo assemblies 162, are all reset to their nominal positions. The load balancer assembly 170 (see FIG. 18) may be placed back in a home position to be aligned with the next tray assembly 36, such as the kitting tray 38. The process may be started again for the next contoured composite structure 16, such as the high-contoured composite structure 18, for example, the stringer 24.

FIG. 18 shows the load balancer assembly 170, such as the pulley assembly 172, including the pair of load balancer devices 174, coupled to the attachment members 158. FIG. 18 further shows the installation station 50 in the installation cell 32 with the mandrel 52 having the contoured composite structure 16, such as the high-contoured composite structure 18, for example, the stringer 24, installed in the trough 58 on the top surface 222. FIG. 18 shows the conveyor assembly 56 and the moving manufacturing line 54 under the mandrel 52, and shows the tray assembly 36, such as the kitting tray 38, for example, the straight flat kitting tray 38a, with the top side 37 empty and positioned on the movable table 44 at the tray station 34. FIG. 18 further shows the pick-and-place assembly 60 with the gantry assembly 70 having the overhead gantry 72, and shows the indexing assembly 154, such as the second indexing assembly 154b.

Figure 19:
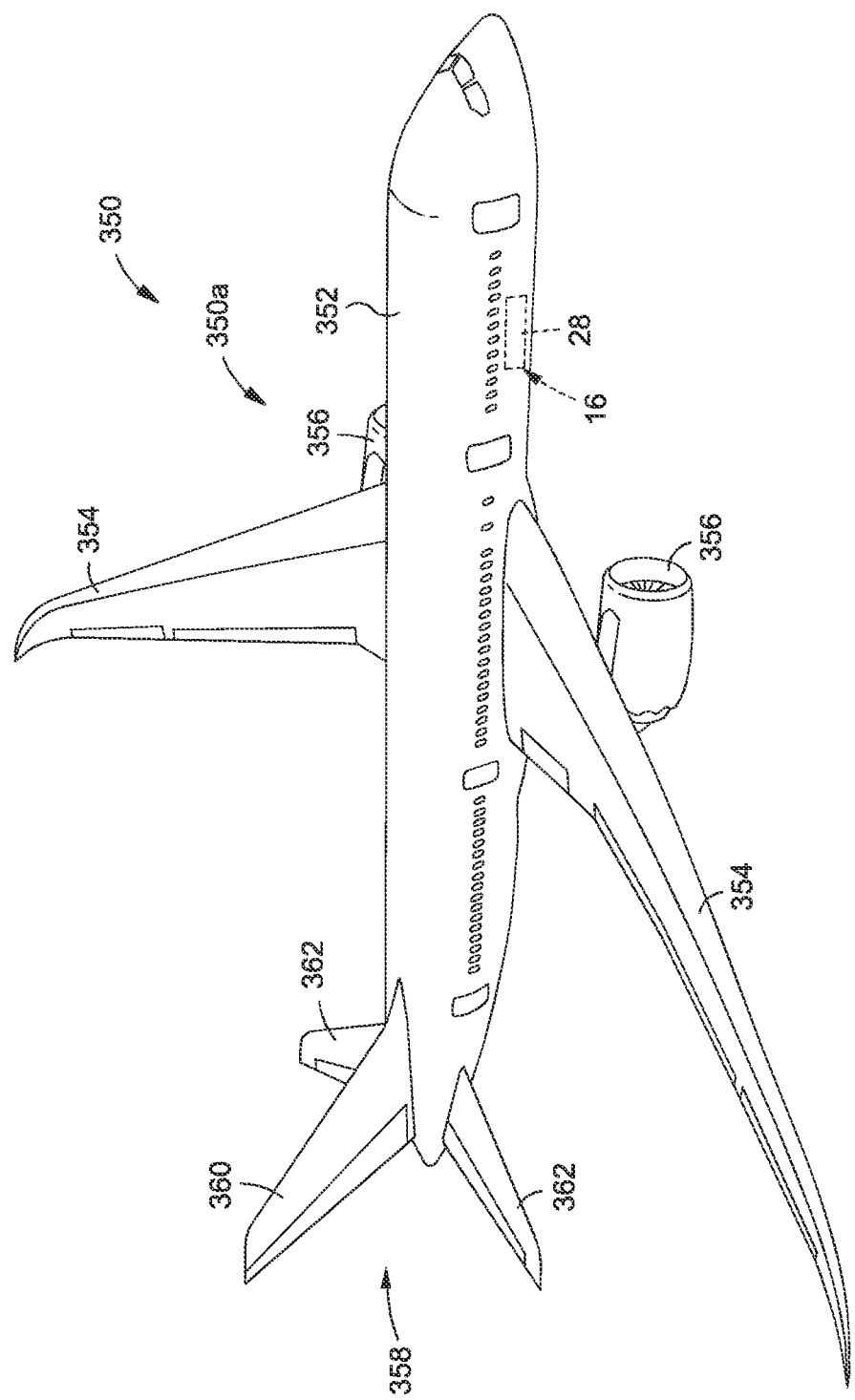
FIG. 19 is an illustration of a perspective view of an aircraft incorporating an aircraft stringer manufactured with a manufacturing system having an exemplary version of a pick-and-place system and method of the disclosure.

FIG. 19 is an illustration of a perspective view of an air vehicle 350, such as an aircraft 350a, incorporating a contoured composite structure 16, such as an aircraft stringer 28, manufactured with a manufacturing system 12 (see FIG. 1) having an exemplary version of a pick-and-place system 10 (see FIGS. 1, 2F) and a method 270 (see FIG. 9), of the disclosure. As shown in FIG. 19, the air vehicle 350, such as the aircraft 350a, includes a fuselage 352, wings 354 coupled to the fuselage 352, engines 356 coupled to the wings 354, and an empennage 358. As shown in FIG. 19, the empennage 358 comprises a vertical stabilizer 360 and horizontal stabilizers 362.

The contoured composite structure 16 (see FIGS. 1, 13A-13D, 19), such as the aircraft stringer 28 (see FIGS. 1, 19), can be used individually, or in combination with other structures and devices. As shown in FIG. 19, in one version, after the contoured composite structure 16 comprising the aircraft stringer 28 has been processed, it can be used in a section of the fuselage 352 of the aircraft 350a. For example, before or after each contoured composite structure 16 comprising the aircraft stringer 28 is cured, it can be loaded onto the mandrel 52 moved to a machine for making a section of fuselage 352. Fiber-reinforced resin can be disposed over the contoured composite structure 16 comprising the aircraft stringer 28, and the fiber-reinforced resin can then be cured (or co-cured with the another structure) to produce a finished assembly for the fuselage 352 of the aircraft 350a. After the contoured composite structure 16, such as in the form of an aircraft stringer 28, has been formed, it may also be used in sections of the wings 354, the vertical stabilizer 360, the horizontal stabilizers 362, or other suitable parts of the aircraft 350a. The contoured composite structure 16 can be used in a variety of industries and applications including, but not limited to, in connection with the manufacture of aircraft 350a and other aerospace structures and vehicles, including spacecraft, and rotorcraft, as well as vehicles such as watercraft, trains, or other suitable vehicles or structures.

In another version of the disclosure, there is a pick-and-place system 10 for transferring and installing an aircraft stringer 28 (see FIGS. 1, 19) having a complex curved configuration 22a (see FIG. 1), onto a mandrel 52 (see FIGS. 1, 2F), in a composite manufacturing system 12a (see FIG. 1). The pick-and-place system 10 comprises a tray station 34 (see FIGS. 1, 2A) having a kitting tray 38 (see FIGS. 1, 2A) designed to hold the aircraft stringer 28, prior to transfer and installation onto the mandrel 52. The aircraft stringer 28 is received from a forming apparatus 48 (see FIG. 1) at a forming station 46 (see FIG. 1) in the composite manufacturing system 12a.

The pick-and-place system 10 further comprises an installation station 50 (see FIG. 1). The installation station 50 comprises the mandrel 52 designed to receive the aircraft stringer 28, and designed to move along a moving manufacturing line 54 (see FIG. 1), via a conveyor assembly 56 (see FIG. 1).

The installation station 50 further comprises a pick-and-place assembly 60 (see FIGS. 1, 2A). The pick-and-place assembly 60 comprises a gantry assembly 70. The gantry assembly 70 comprises an overhead gantry 72 (see FIGS. 2A-2F) coupled to a pair of side supports 74 (see FIGS. 2A-2F). The gantry assembly 70 further comprises a main trolley 100 (see FIG. 2A) movably coupled to, and positioned under, the overhead gantry 72. The main trolley 100 is designed to ride, via an x-axis motion system 116 (see FIG. 2B), within a pair of main tracks 96 (see FIGS. 2A-2B) formed along a pair of longitudinal beams 86 (see FIGS. 2A-3B) of the overhead gantry 72. The gantry assembly 70 further comprises a pair of side trolleys 126 (see FIG. 2A). Each side trolley 126 is designed to ride, via a y-axis motion system 130 (see FIG. 2B), within one of a pair of side tracks 124 (see FIG. 2E) formed along each of a pair of side beams 122 (see FIG. 2E) of the main trolley 100.

The pick-and-place assembly 60 further comprises a main beam 135 (see FIG. 2A), such as a strongback 136 (see FIG. 2A), suspended from the gantry assembly 70. The main beam 135 has a plurality of end effector assemblies 160 (see FIG. 2A), such as pogo assemblies 162 (see FIG. 2A), coupled to the main beam 135. The plurality of end effector assemblies 160, such as the pogo assemblies 162, each comprises a vacuum plate 242 (see FIGS. 8A-8B) having a plurality of vacuum cups 245 (see FIG. 8B) on a bottom side 244b (see FIG. 8B) of the vacuum plate 242. The vacuum plate 242 is designed to contact and secure the contoured composite structure 16 (see FIG. 2A), such as the aircraft stringer 28, to each of the plurality of end effector assemblies 160 (see FIG. 2A), during transfer and installation of the contoured composite structure 16, such as the aircraft stringer 28.

The plurality of end effector assemblies 160, such as the pogo assemblies 162, each further comprises a plurality of linear actuators 246 (see FIGS. 8A-8B) comprising a plurality of first linear actuators 246a (see FIGS. 8A-8B) coupled to a top side 244a (see FIGS. 8A-8B) of the vacuum plate 242, via a plurality of swivel devices 260 (see FIGS. 8A-8B), discussed in detail above, and comprising a second linear actuator 246b (see FIGS. 8A-8B) positioned between the plurality of first linear actuators 246a, where the first linear actuators 246a preferably comprise 3 first linear actuators 246a of equal length, and the second linear actuator 246b is longer than the 3 first linear actuators 246a.

The plurality of end effector assemblies 160, such as the pogo assemblies 162, each further comprises a stop device 268 (see FIGS. 8A-8B) coupled to each of the plurality of first linear actuators 246a. The plurality of end effector assemblies 160, such as the pogo assemblies 162, each further comprises a main support structure 269 (see FIGS. 8A-8B) coupled to the plurality of linear actuators 246.

The main beam 135 further has a pair of indexing assemblies 154 coupled to the main beam 135. The pair of indexing assemblies 154 each comprises a pair of suction cups 235 (see FIGS. 2A, 7A, 7C) designed to contact the tray assembly 36, such as the kitting tray 38 (see FIG. 2A), during transfer of the contoured composite structure 16, such as the aircraft stringer 28, and designed to contact the mandrel 52 (see FIG. 2F) during installation of the contoured composite structure 16, such as the aircraft stringer 28, onto the mandrel 52. The pair of indexing assemblies 154 each further comprises an indexing linear actuator 236 (see FIG. 7C), such as in the form of a pogo pin 236a (see FIG. 7C), positioned between the pair of suction cups 235 (see FIG. 7C). The indexing linear actuator 236, such as in the form of a pogo pin 236a, is designed for insertion into a cup-and-cone element 237 (see FIGS. 11B, 16B), during transfer and installation of the contoured composite structure 16, such as the aircraft stringer 28. The pair of indexing assemblies 154 each further comprises a drive mechanism 240 (see FIG. 7C) for driving the indexing linear actuator 236, during transfer and installation of the contoured composite structure 16, such as the aircraft stringer 28. The pair of indexing assemblies 154 act as locating features, to allow the main beam 135 (see FIG. 7C), such as the strongback 136 (see FIG. 7C), to push the contoured composite structure 16, such as the aircraft stringer 28, into place on the mandrel 52, without lifting off of the mandrel 52.

The pick-and-place assembly 60 further comprises a vacuum system 168 (see FIG. 14) coupled to the main beam 135 and coupled to the plurality of end effector assemblies 160.

The pick-and-place assembly 60 further comprises a load balancer assembly 170 (see FIGS. 2F, 5A), such as a pulley assembly 172 (see FIGS. 2F, 5A), coupling the main beam 135 to the gantry assembly 70. The load balancer assembly 170 is designed to orient and stabilize the main beam 135 and the aircraft stringer 28, during transfer and installation of the contoured composite structure 16, such as the aircraft stringer 28, from the tray station 34, such as the kitting tray 38, onto the mandrel 52.

The load balancer assembly 170 comprises a pair of load balancer devices 174 coupling the main beam 135 to the pair of side trolleys 126 of the gantry assembly 70. Each load balancer device 174 comprises a pair of pulleys 176 (see FIGS. 2C, 5A) coupled to one of the pair of side trolleys 126. Each load balancer device 174 further comprises an attachment member 158 (see FIGS. 2C, 5A), such as the first bearing member 158a and the second bearing member 158b (see FIG. 5A), coupled to the main beam 135, such as the strongback 136. Each load balancer device 174 further comprises a pair of cables 178 (see FIGS. 2C, 5A) movably coupled between the pair of pulleys 176 and the attachment member 158. For each load balancer device 174, the pair of pulleys 176 is oriented on the side trolley 126, so that the pair of cables 178 defines a trapezoidal configuration 182 (see FIGS. 2C, 5A), when coupled to the attachment member 158, to minimize unwanted motion of the mandrel 52, such as unwanted rocking or swinging.

The pick-and-place assembly 60 further comprises a radio-frequency identification (RFID) system 295 (see FIG. 12A) comprising a radio-frequency identification (RFID) reader 296 (see FIG. 12A) coupled to the main beam 135, such as the strongback 136, and a radio-frequency identification (RFID) tag 298 (see FIG. 12A) coupled to the tray assembly 36, such as the kitting tray 38.

The pick-and-place assembly 60 further comprises a control system 150 (see FIGS. 2A, 2F) coupled to the pick-and-place assembly 60. The control system 150 is designed to operably control the pick-and-place assembly 60, including during transfer and installation of the contoured composite structure 16, such as the aircraft stringer 28 onto the mandrel 52.

Figure 20:
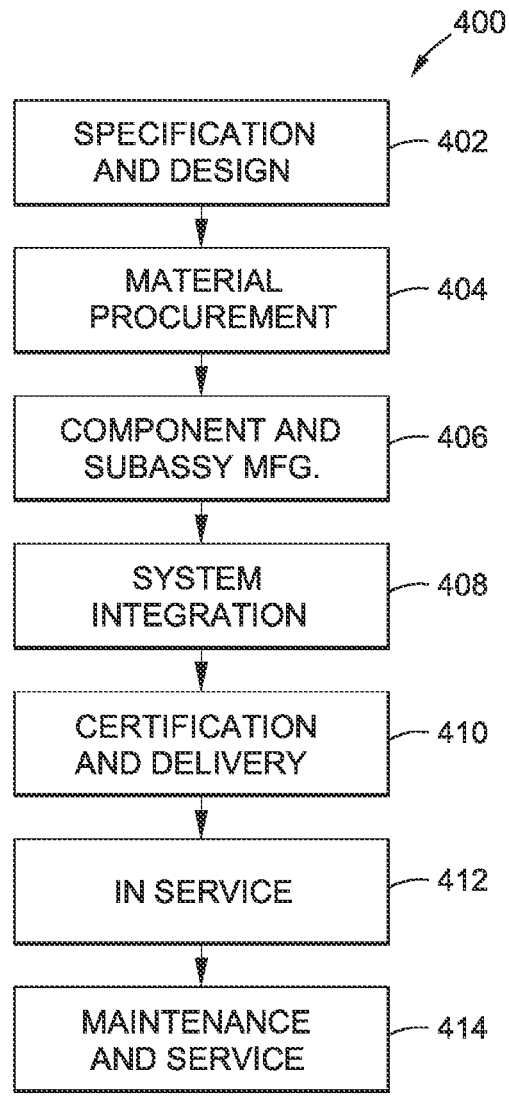
FIG. 20 is an illustration of a flow diagram of an exemplary aircraft manufacturing and service method.
Figure 21:
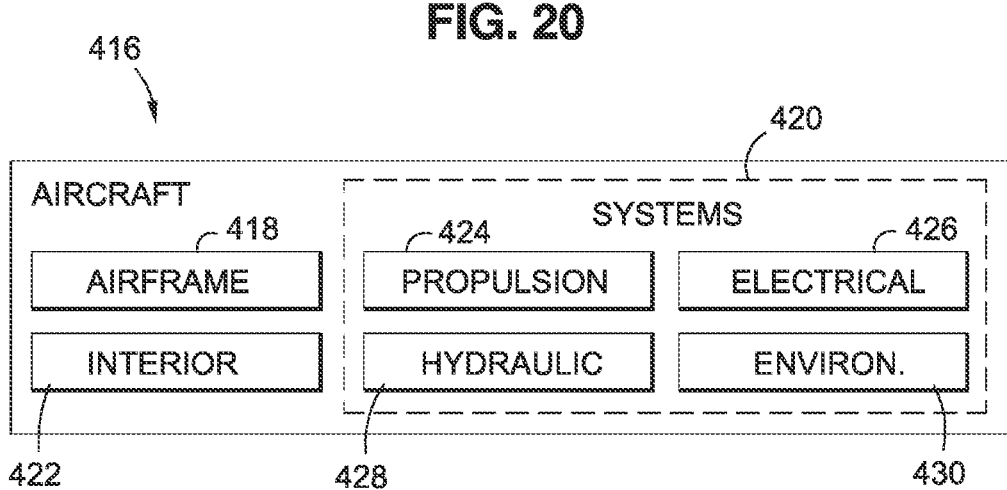
FIG. 21 is an illustration of an exemplary block diagram of an aircraft.

Now referring to FIGS. 20 and 21, FIG. 20 is an illustration of a flow diagram of an exemplary aircraft manufacturing and service method 400, and FIG. 21 is an illustration of an exemplary block diagram of an aircraft 416. Referring to FIGS. 20 and 21, versions of the disclosure may be described in the context of the aircraft manufacturing and service method 400 as shown in FIG. 20, and the aircraft 416 as shown in FIG. 21.

During pre-production, exemplary aircraft manufacturing and service method 400 may include specification and design 402 of the aircraft 416 and material procurement 404. During manufacturing, component and subassembly manufacturing 406 and system integration 408 of the aircraft 416 takes place. Thereafter, the aircraft 416 may go through certification and delivery 410 in order to be placed in service 412. While in service 412 by a customer, the aircraft 416 may be scheduled for routine maintenance and service 414 (which may also include modification, reconfiguration, refurbishment, and other suitable services).

Each of the processes of the aircraft manufacturing and service method 400 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 21, the aircraft 416 produced by the exemplary aircraft manufacturing and service method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 400. For example, components or subassemblies corresponding to component and subassembly manufacturing 406 may be fabricated or manufactured in a manner similar to components or subassemblies produced while the aircraft 416 is in service 412. Also, one or more apparatus embodiments, method embodiments, or a combination thereof, may be utilized during component and subassembly manufacturing 406 and system integration 408, for example, by substantially expediting assembly of or reducing the cost of the aircraft 416. Similarly, one or more of apparatus embodiments, method embodiments, or a combination thereof, may be utilized while the aircraft 416 is in service 412, for example and without limitation, to maintenance and service 414.

Disclosed versions of the pick-and-place system 10 (see FIGS. 1, 2F), with the pick-and-place assembly 60 (see FIGS. 1, 2A-2F), and the method 270 (see FIG. 9) provide for a semi-automated or fully automated pick-and-place system 10 for transferring high-contoured elongated components, for example, stringers 24 for an aircraft 350*a* (see FIG. 19), from a forming station 46 (see FIG. 1) to an installation station 50 (see FIG. 1) along a moving manufacturing line 54 (see FIG. 1). More specifically, the concept is directed to a pick-and-place system 10 for transferring a fully-kitted stringer, having complex curvature, from the forming station 46 to the installation station 50 and onto a mandrel 52 that is moving.

The pick-and-place system 10 includes load balancer devices 174 (see FIG. 5A) that are synchronized, with pulleys 176 (see FIG. 5A) and cables 178 (see FIG. 5A), coupled to a gantry assembly 70 (see FIG. 2F) with an overhead gantry 72 (see FIG. 2F). The pair of pulleys 176 on each side support 74 (see FIG. 5A) is oriented on the side trolley 126, so that the pair of cables 178 for each load balancer device 174 defines the trapezoidal configuration 182 (see FIG. 5B), when coupled to the attachment member 158, such as the first bearing member 158*a*, to minimize unwanted motion of the mandrel 52 and of the main beam 135, while still allowing the mandrel 52 and/or the main beam 135, to be rotated to a desired position and to be aligned for installation of the contoured composite structure 16, such as the high-contoured composite structure 18, for example, the stringer 24, onto the mandrel 52. When coupled to the contoured composite structure 16, such as high-contoured composite structure 18, for example, the stringer 24, the pair of cables 178 from the load balancer devices 174 define the trapezoidal configuration 182, to minimize, or prevent, unwanted motion such as swinging, rocking, and other unwanted motion of the contoured composite structure 16, such as the stringer 24. The trapezoidal configuration 182 is beneficial because it prevents the mandrel 52 (see FIG. 2F) from swinging and rocking, while still allowing the mandrel 52 to be rotated to a desired position and aligned for the installation of the contoured composite structure 16, such as the high-contoured composite structure 18, for example, the stringer 24, onto and into the mandrel 52. The cables 178 of each load balancer device 174 are preferably in a predetermined angle, not perpendicular, that creates the trapezoidal configuration 182 to orient the contoured composite structures 16, such as high-contoured composite structures 18, for example, the stringers 24, during installation. The pair of pulleys 176, or spools, or yo-yos on each side trolley 126 (see FIG. 5A) are synchronized to one another, so as to supply the same amount of cable 178 from each of the pair of pulleys 176, or spools, or yo-yos. However, the pair of pulleys 176, or spools, or yo-yos, on different side trolleys 126 and side beams 122 are not synchronized. The pair of pulleys 176, or spools, or yo-yos, on one side trolley 126 and side beam 122 are independent from the pair of pulleys 176, or spools, or yo-yos, on the other side trolley 126 and side beam 122. The pair of load balancer devices 174 of the load balancer assembly 170, or pulley assembly 172, helps stabilize the end effector assemblies 160, or pogo assemblies 162, and the main beam 135, and movement. The pair of pulleys 176, or spools, or yo-yos and the cables 178 may be coupled to side beams 122 (see FIG. 2F) via a side trolley 126, or carrier, for movement along the side beams 122, thereby providing additional ranges of motion for the pick-and-place system 10.

In addition, disclosed versions of the pick-and-place system 10 (see FIGS. 1, 2F), with the pick-and-place assembly 60 (see FIGS. 1, 2A-2F), and the method 270 (see FIG. 9) transfer and install contoured composite structures 16, such as high-contoured composite structures 18, for example, the stringers 24, that are used in a variety of industries and applications including, but not limited to, in connection with the manufacture of aircraft 350*a* (see FIG. 19) and other aerospace structures and vehicles, including spacecraft, and rotorcraft, as well as vehicles such as watercraft, trains, or other suitable vehicles or structures. The pick-and-place system 10 allows for accurate and efficient installation of contoured composite structures 16, such as high-contoured composite structures 18, for example, stringers 24, onto and into a mandrel 52 (see FIG. 2F) in an installation cell 32 (see FIG. 1). The pick-and-place assembly 60 (see FIGS. 1, 2A-2F), and the method 270 (see FIG. 9) are configured to maintain the curved configuration 22 (see FIG. 1) of the contoured composite structure 16, such as the high-contoured composite structure 18, for example, the stringer 24, throughout the movement, transfer, and installation into and onto the mandrel 52. Thus, the pick-and-place system 10 for transferring and installing the contoured composite structures 16, such as the stringers 24, from the forming station 46 to the installation station 50, and onto the moving mandrel 52 in the moving manufacturing line 54, maintains the complex curvatures of the contoured composite structures 16, such as the stringers 24, throughout transfer and installation onto and into the mandrel 52.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A pick-and-place system for transferring and installing a contoured composite structure onto a mandrel, in a composite manufacturing system, the pick-and-place system comprising:

a tray station having a tray assembly designed to hold the contoured composite structure, prior to transfer and installation onto the mandrel; and an installation station comprising:

the mandrel designed to receive the contoured composite structure, and designed to move along a moving manufacturing line, via a conveyor assembly; and a pick-and-place assembly comprising:

a gantry assembly;

a main beam suspended from the gantry assembly, the main beam having a plurality of end effector assemblies and a pair of indexing assemblies, coupled to the main beam;

a vacuum system coupled to the main beam and coupled to the plurality of end effector assemblies;
a load balancer assembly coupling the main beam to the gantry assembly; and
a control system coupled to the pick-and-place assembly, to operably control the pick-and-place assembly.

2. The pick-and-place system of claim 1, wherein the contoured composite structure comprises one of a stringer, a hat-shaped stringer, an aircraft stringer, and a spar.

3. The pick-and-place system of claim 1, wherein the tray assembly comprises one of a straight flat kitting tray, a contoured kitting tray, a tooling device, and a tray mandrel.

4. The pick-and-place system of claim 1, wherein the tray assembly receives the contoured composite structure from a forming apparatus at a forming station.

5. The pick-and-place system of claim 1, wherein the plurality of end effector assemblies each comprises:
a vacuum plate having a plurality of vacuum cups on a bottom side of the vacuum plate, the vacuum plate designed to contact and secure the contoured composite structure to each of the plurality of end effector assemblies, during transfer and installation of the contoured composite structure;
a plurality of linear actuators comprising a plurality of first linear actuators coupled to a top side of the vacuum plate, via a plurality of swivel devices, and comprising a second linear actuator positioned between the plurality of first linear actuators;
a stop device coupled to each of the plurality of first linear actuators; and
a main support structure coupled to the plurality of linear actuators.

6. The pick-and-place system of claim 1, wherein the pair of indexing assemblies each comprises:
a pair of suction cups designed to contact the tray assembly during transfer of the contoured composite structure, and designed to contact the mandrel during installation of the contoured composite structure onto the mandrel;
an indexing linear actuator designed for insertion into a cup-and-cone element during transfer and installation of the contoured composite structure; and
a drive mechanism for driving the indexing linear actuator during transfer and installation of the contoured composite structure,
wherein the pair of indexing assemblies act as locating features, to allow the main beam to push the contoured composite structure into place on the mandrel, without lifting off of the mandrel.

7. The pick-and-place system of claim 1, further comprising a radio-frequency identification (RFID) system comprising:
a radio-frequency identification (RFID) reader coupled to the main beam; and
a radio-frequency identification (RFID) tag coupled to the tray assembly,
wherein the RFID reader is designed to read the RFID tag, to determine which of the plurality of end effector assemblies are to be used to pick up the contoured composite structure from the tray assembly.

8. The pick-and-place system of claim 1, wherein the gantry assembly comprises:
an overhead gantry coupled to a pair of side supports;
a main trolley movably coupled to, and positioned under, the overhead gantry, the main trolley designed to ride, via an x-axis motion system, within a pair of main tracks formed along a pair of longitudinal beams of the overhead gantry; and
a pair of side trolleys, each designed to ride, via a y-axis motion system, within one of a pair of side tracks formed along each of a pair of side beams of the main trolley.

9. The pick-and-place system of claim 8, wherein the load balancer assembly comprises:
a pair of load balancer devices coupling the main beam to the pair of side trolleys of the gantry assembly, each load balancer device comprising:
a pair of pulleys coupled to one of the pair of side trolleys;
an attachment member coupled to the main beam; and
a pair of cables movably coupled between the pair of pulleys and the attachment member,
wherein for each load balancer device, the pair of pulleys is oriented on the side trolley, so that the pair of cables defines a trapezoidal configuration, when coupled to the attachment member, to minimize unwanted motion of the mandrel.

10. A pick-and-place system for transferring and installing an aircraft stringer having a curved configuration, onto a mandrel, in a composite manufacturing system, the pick-and-place system comprising:
a tray station having a kitting tray designed to hold the aircraft stringer, prior to transfer and installation onto the mandrel, the aircraft stringer received from a forming apparatus at a forming station in the composite manufacturing system; and
an installation station comprising:
the mandrel designed to receive the aircraft stringer, and designed to move along a moving manufacturing line, via a conveyor assembly; and
a pick-and-place assembly comprising:
a gantry assembly;
a main beam suspended from the gantry assembly, the main beam having a plurality of end effector assemblies and a pair of indexing assemblies, coupled to the main beam;
a vacuum system coupled to the main beam and coupled to the plurality of end effector assemblies;
a load balancer assembly coupling the main beam to the gantry assembly, the load balancer assembly designed to orient and stabilize the main beam and the aircraft stringer, during transfer and installation of the aircraft stringer from the kitting tray onto the mandrel;
a radio-frequency identification (RFID) system comprising a radio-frequency identification (RFID) reader coupled to the main beam, and a radio-frequency identification (RFID) tag coupled to the kitting tray; and
a control system coupled to the pick-and-place assembly, the control system designed to operably control the pick-and-place assembly, including during transfer and installation of the aircraft stringer onto the mandrel.

11. The pick-and-place system of claim 10, wherein the plurality of end effector assemblies each comprises:
a vacuum plate having a plurality of vacuum cups on a bottom side of the vacuum plate, the vacuum plate designed to contact and secure the aircraft stringer to each of the plurality of end effector assemblies, during transfer and installation of the aircraft stringer;

a plurality of linear actuators comprising a plurality of first linear actuators coupled to a top side of the vacuum plate, via a plurality of swivel devices, and comprising a second linear actuator positioned between the plurality of first linear actuators;

a stop device coupled to each of the plurality of first linear actuators; and a main support structure coupled to the plurality of linear actuators.

12. The pick-and-place system of claim 10, wherein the pair of indexing assemblies each comprises:

a pair of suction cups designed to contact the kitting tray during transfer of the aircraft stringer, and designed to contact the mandrel during installation of the aircraft stringer onto the mandrel;

an indexing linear actuator designed for insertion into a cup-and-cone element during transfer and installation of the aircraft stringer; and a drive mechanism for driving the indexing linear actuator during transfer and installation of the aircraft stringer, wherein the pair of indexing assemblies act as locating features, to allow the main beam to push the aircraft stringer into place on the mandrel, without lifting off of the mandrel.

13. The pick-and-place system of claim 10, wherein the gantry assembly comprises:

an overhead gantry coupled to a pair of side supports;

a main trolley movably coupled to, and positioned under, the overhead gantry, the main trolley designed to ride, via an x-axis motion system, within a pair of main tracks formed along a pair of longitudinal beams of the overhead gantry; and a pair of side trolleys, each designed to ride, via a y-axis motion system, within one of a pair of side tracks formed along each of a pair of side beams of the main trolley.

14. The pick-and-place system of claim 13, wherein the load balancer assembly comprises:

a pair of load balancer devices coupling the main beam to the pair of side trolleys of the gantry assembly, each load balancer device comprising:

a pair of pulleys coupled to one of the pair of side trolleys;

an attachment member coupled to the main beam; and a pair of cables movably coupled between the pair of pulleys and the attachment member, wherein for each load balancer device, the pair of pulleys is oriented on the one of the pair of side trolleys, so that the pair of cables defines a trapezoidal configuration, when coupled to the attachment member, to minimize unwanted motion of the mandrel.

15. A method for transferring and installing a contoured composite structure onto a mandrel, in a composite manufacturing system, the method comprising:

providing a pick-and-place system comprising:

a tray station having a tray assembly with the contoured composite structure disposed on the tray assembly; and an installation station comprising:

the mandrel moving along a moving manufacturing line, via a conveyor assembly; and a pick-and-place assembly comprising:

a gantry assembly;

a main beam suspended from the gantry assembly, the main beam having a plurality of end effector assemblies and a pair of indexing assemblies, coupled to the main beam;

a vacuum system coupled to the main beam and coupled to the plurality of end effector assemblies;

a load balancer assembly coupling the main beam to the gantry assembly; and a control system coupled to the pick-and-place assembly;

positioning the main beam above the contoured composite structure disposed on the tray assembly;

indexing the main beam to the tray assembly, using one or both of the pair of indexing assemblies coupled to the main beam;

contacting the contoured composite structure with one or more of the plurality of end effector assemblies, and using the one or more plurality of end effector assemblies to copy a geometry of a top surface of the contoured composite structure;

securing the contoured composite structure to the one or more plurality of end effector assemblies, by activating the vacuum system;

transferring, from the tray assembly to the mandrel, the contoured composite structure secured to the one or more plurality of end effector assemblies, by moving the main beam away from the tray assembly and to above the mandrel;

using the load balancer assembly to align the main beam and the contoured composite structure onto the mandrel;

indexing the main beam to the mandrel, using one or both of the pair of indexing assemblies;

installing the contoured composite structure into the mandrel, using the one or more plurality of end effector assemblies to push the contoured composite structure into the mandrel;

releasing the contoured composite structure from the one or more plurality of end effector assemblies, by deactivating the vacuum system; and retracting the main beam from the mandrel.

16. The method of claim 15, further comprising, prior to positioning the main beam above the contoured composite structure disposed on the tray assembly, receiving the contoured composite structure from a forming apparatus at a forming station, and placing the contoured composite structure on the tray assembly, wherein the contoured composite structure comprises one of a stringer, a hat-shaped stringer, an aircraft stringer, and a spar.

17. The method of claim 15, further comprising, after indexing the main beam to the tray assembly, determining which of the plurality of end effector assemblies are to be used to contact, secure, and transfer the contoured composite structure, by using a radio-frequency identification (RFID) system comprising a radio-frequency identification (RFID) reader coupled to the main beam, and a radio-frequency identification (RFID) tag coupled to the tray assembly.

18. The method of claim 15, wherein using the load balancer assembly to align the main beam and the contoured composite structure onto the mandrel, further comprises, using the load balancer assembly comprising a pair of load balancer devices coupling the main beam to a pair of side trolleys of the gantry assembly, the pair of load balancer devices comprising a first load balancer device and a second load balancer device, each comprising:

a pair of pulleys coupled to one of the pair of side trolleys;

an attachment member coupled to the main beam; and a pair of cables movably coupled between the pair of pulleys and the attachment member, wherein the pair of cables of the first load balancer device work independently from the pair of cables of the second load balancer device.

19. The method of claim 15, wherein indexing the main beam to the mandrel, using one or both of the pair of indexing assemblies, further comprises, rough indexing the main beam to the mandrel using a cup-and-cone locating feature, and fine indexing the main beam to the mandrel using a camera system, including a closed-circuit television camera (CCTV) system.

20. The method of claim 15, further comprising, after retracting the main beam from the mandrel, resetting the main beam for installation of a subsequent contoured composite structure transferred from the tray assembly to the mandrel.

* * * * *